(12) United States Patent
Chen et al.

(10) Patent No.: US 12,429,670 B2
(45) Date of Patent: Sep. 30, 2025

(54) IMAGE LENS ASSEMBLY, IMAGE CAPTURING UNIT AND ELECTRONIC DEVICE

(71) Applicant: LARGAN PRECISION CO., LTD., Taichung (TW)

(72) Inventors: Shih-Han Chen, Taichung (TW); Hsin-Hsuan Huang, Taichung (TW); I-Hsuan Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 555 days.

(21) Appl. No.: 17/886,352

(22) Filed: Aug. 11, 2022

(65) Prior Publication Data
US 2023/0375803 A1 Nov. 23, 2023

(30) Foreign Application Priority Data
May 20, 2022 (TW) .................................. 111118817

(51) Int. Cl.
*G02B 9/60* (2006.01)
*G02B 13/00* (2006.01)
*H04N 23/55* (2023.01)

(52) U.S. Cl.
CPC ........... *G02B 9/60* (2013.01); *G02B 13/0045* (2013.01); *H04N 23/55* (2023.01); *G02B 13/0065* (2013.01)

(58) Field of Classification Search
CPC ........................ G02B 13/0065; G02B 13/0045; G02B 13/18; G02B 13/16; G02B 13/0015; G02B 9/60; G02B 27/0172; G02B 27/0012; G02B 27/0025; G02B 15/146; H04N 23/55; H04N 5/2254; H04N 5/222

USPC ................ 359/770, 656–658, 708, 713, 749, 359/756–762

See application file for complete search history.

(56) References Cited

U.S. PATENT DOCUMENTS

| | | |
|---|---|---|
| 4,704,009 A | 11/1987 | Yamamoto |
| 8,736,980 B2 | 5/2014 | Tsai |
| 9,696,522 B2 | 7/2017 | Chen |
| 10,191,251 B2 | 1/2019 | Lai |
| 10,627,604 B2 | 4/2020 | Kubota |
| 10,690,883 B2 | 6/2020 | Chang |
| 11,194,126 B2 | 12/2021 | Kuo |

(Continued)

FOREIGN PATENT DOCUMENTS

| | | |
|---|---|---|
| CN | 204462505 U | 7/2015 |
| CN | 107179599 A | 9/2017 |

(Continued)

OTHER PUBLICATIONS

Extended European Search Report dated Sep. 15, 2023 as received in Application No. 22189272.2.

*Primary Examiner* — Travis S Fissel
(74) *Attorney, Agent, or Firm* — Maschoff Brennan

(57) ABSTRACT

An image lens assembly includes five lens elements which are, in order from an outer side to an inner side along an optical path: a first lens element, a second lens element, a third lens element, a fourth lens element and a fifth lens element. Each of the five lens elements has an outer-side surface facing toward the outer side and an inner-side surface facing toward the inner side. The outer-side surface of the first lens element is concave in a paraxial region thereof, and the outer-side surface of the first lens element has at least one inflection point.

29 Claims, 36 Drawing Sheets

(56) References Cited

U.S. PATENT DOCUMENTS

| | | | |
|---|---|---|---|
| 2020/0249441 A1 | 8/2020 | Xu | |
| 2022/0091392 A1* | 3/2022 | Chen | G02B 13/18 |
| 2023/0083945 A1* | 3/2023 | Lai | G02B 9/64 |
| | | | 359/708 |

FOREIGN PATENT DOCUMENTS

| | | |
|---|---|---|
| CN | 108196355 B | 6/2018 |
| CN | 207764465 U | 8/2018 |
| CN | 108761740 A | 11/2018 |
| CN | 109270661 A | 1/2019 |
| CN | 109782420 A | 5/2019 |
| CN | 112147763 A | 12/2020 |
| CN | 113296237 A | 8/2021 |
| CN | 113311571 A | 8/2021 |
| CN | 113311572 B | 8/2021 |
| CN | 113419334 A | 8/2021 |
| CN | 213934389 U | 8/2021 |
| CN | 113376804 A | 9/2021 |
| CN | 113552698 A | 10/2021 |
| CN | 113625419 A | 11/2021 |
| CN | 113721345 A | 11/2021 |
| CN | 114326020 A | 4/2022 |
| CN | 114442286 A | 5/2022 |
| TW | I717285 B | 1/2021 |
| WO | 2019019669 A1 | 1/2019 |

* cited by examiner

IMAGE LENS ASSEMBLY, IMAGE CAPTURING UNIT AND ELECTRONIC DEVICE

RELATED APPLICATIONS

This application claims priority to Taiwan Application 111118817, filed on May 20, 2022, which is incorporated by reference herein in its entirety.

BACKGROUND

Technical Field

The present disclosure relates to an image lens assembly, an image capturing unit and an electronic device, more particularly to an image lens assembly and an image capturing unit applicable to an electronic device.

Description of Related Art

Due to the rapid changes in technology, the infrared image capture technique has improved for various applications, and therefore the functionality requirements for an optical systems adopting the infrared image capture technique have been increasing. The infrared capture technique can be applied in diverse electronic devices such as somatosensory game consoles, augmented reality devices, driving assistance systems, various smart electronic products, multi-lens devices, wearable devices, digital cameras, identification systems, entertainment devices, sports devices, camera drones, monitors and home smart auxiliary systems. Among these electronic devices, a home smart electronic product, such as a robot vacuum, needs to recognize the distance of surrounding objects during movement for preventing collision or fall. Typically, the home smart electronic product can project light with specific characteristics (e.g., wavelength, pattern, or periodicity) onto the surrounding objects, then the projected light is reflected off the objects with different depths, and the home smart electronic product can receive the reflected light to analyze the changes of the characteristics of the reflected light so as to calculate the object distances. However, it is difficult for a conventional optical system to obtain a balance among the requirements such as high image quality, low sensitivity, a proper aperture size, miniaturization and a desirable field of view.

SUMMARY

According to one aspect of the present disclosure, an image lens assembly includes five lens elements. The five lens elements are, in order from an outer side to an inner side along an optical path, a first lens element, a second lens element, a third lens element, a fourth lens element and a fifth lens element. Each of the five lens elements has an outer-side surface facing toward the outer side and an inner-side surface facing toward the inner side.

The outer-side surface of the first lens element is concave in a paraxial region thereof, and the outer-side surface of the first lens element has at least one inflection point.

When an f-number of the image lens assembly is Fno, a focal length of the image lens assembly is f, a focal length of the first lens element is f1, a focal length of the second lens element is f2, a focal length of the fourth lens element is f4, an axial distance between the outer-side surface of the first lens element and an inner-side conjugate surface of the image lens assembly is TL, an Abbe number of the third lens element is V3, and an Abbe number of the fifth lens element is V5, the following conditions are satisfied:

$0.40 < Fno < 2.20;$ $1.20 < |f/f1|/(|f/f2|+|f/f4|) < 15.00;$ $3.00 < TL/f < 10.00;$ and $30.0 < V3+V5 < 70.0.$ According to another aspect of the present disclosure, an image lens assembly includes five lens elements. The five lens elements are, in order from an outer side to an inner side along an optical path, a first lens element, a second lens element, a third lens element, a fourth lens element and a fifth lens element. Each of the five lens elements has an outer-side surface facing toward the outer side and an inner-side surface facing toward the inner side.

The first lens element has negative refractive power, the outer-side surface of the first lens element is concave in a paraxial region thereof, and the outer-side surface of the first lens element has at least one inflection point. The outer-side surface of the third lens element is convex in a paraxial region thereof.

When an f-number of the image lens assembly is Fno, a focal length of the image lens assembly is f, a focal length of the second lens element is f2, a curvature radius of the outer-side surface of the first lens element is R1, an axial distance between the first lens element and the second lens element is T12, and a central thickness of the third lens element is CT3, the following conditions are satisfied:

$0.80 < Fno < 2.00;$ $-0.80 < f/f2 < 0.08;$ $-2.00 < f/R1 < -0.12;$ and $1.25 < (T12+CT3)/f < 3.00.$ According to another aspect of the present disclosure, an image lens assembly includes five lens elements. The five lens elements are, in order from an outer side to an inner side along an optical path, a first lens element, a second lens element, a third lens element, a fourth lens element and a fifth lens element. Each of the five lens elements has an outer-side surface facing toward the outer side and an inner-side surface facing toward the inner side.

The first lens element has negative refractive power, the outer-side surface of the first lens element is concave in a paraxial region thereof, and the outer-side surface of the first lens element has at least one inflection point. The outer-side surface of the fifth lens element is convex in a paraxial region thereof.

When an f-number of the image lens assembly is Fno, an axial distance between the outer-side surface of the first lens element and an inner-side conjugate surface of the image lens assembly is TL, and a maximum effective radius of the inner-side conjugate surface of the image lens assembly is YI, the following conditions are satisfied:

$0.40 < Fno < 2.20;$ and $3.20 < TL/YI < 6.50;$

When a focal length of the image lens assembly is f, a focal length of the first lens element is f1, a focal length of the second lens element is f2, a focal length of the third lens element is f3, a focal length of the fourth lens element is f4, a focal length of the fifth lens element is f5, and a focal length of the i-th lens element is fi, at least two lens elements of the image lens assembly satisfy the following condition:

|f/fi|<0.19, wherein i=1,2,3,4 or 5;

When an Abbe number of the first lens element is V1, an Abbe number of the second lens element is V2, an Abbe number of the third lens element is V3, an Abbe number of the fourth lens element is V4, an Abbe number of the fifth lens element is V5, and an Abbe number of the i-th lens element is Vi, at least three lens elements of the image lens assembly satisfy the following condition:

15.0<Vi<50.0, wherein i=1,2,3,4 or 5.

According to another aspect of the present disclosure, an image capturing unit includes one of the aforementioned image lens assemblies, wherein the image lens assembly is configured to receive light reflected off a detected object and to image the received light onto the inner-side conjugate surface.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An image lens assembly includes five lens elements. The five lens elements are, in order from an outer side to an inner side along an optical path, a first lens element, a second lens element, a third lens element, a fourth lens element and a fifth lens element. Each of the five lens elements has an outer-side surface facing toward the outer side and an inner-side surface facing toward the inner side.

Figure 33:
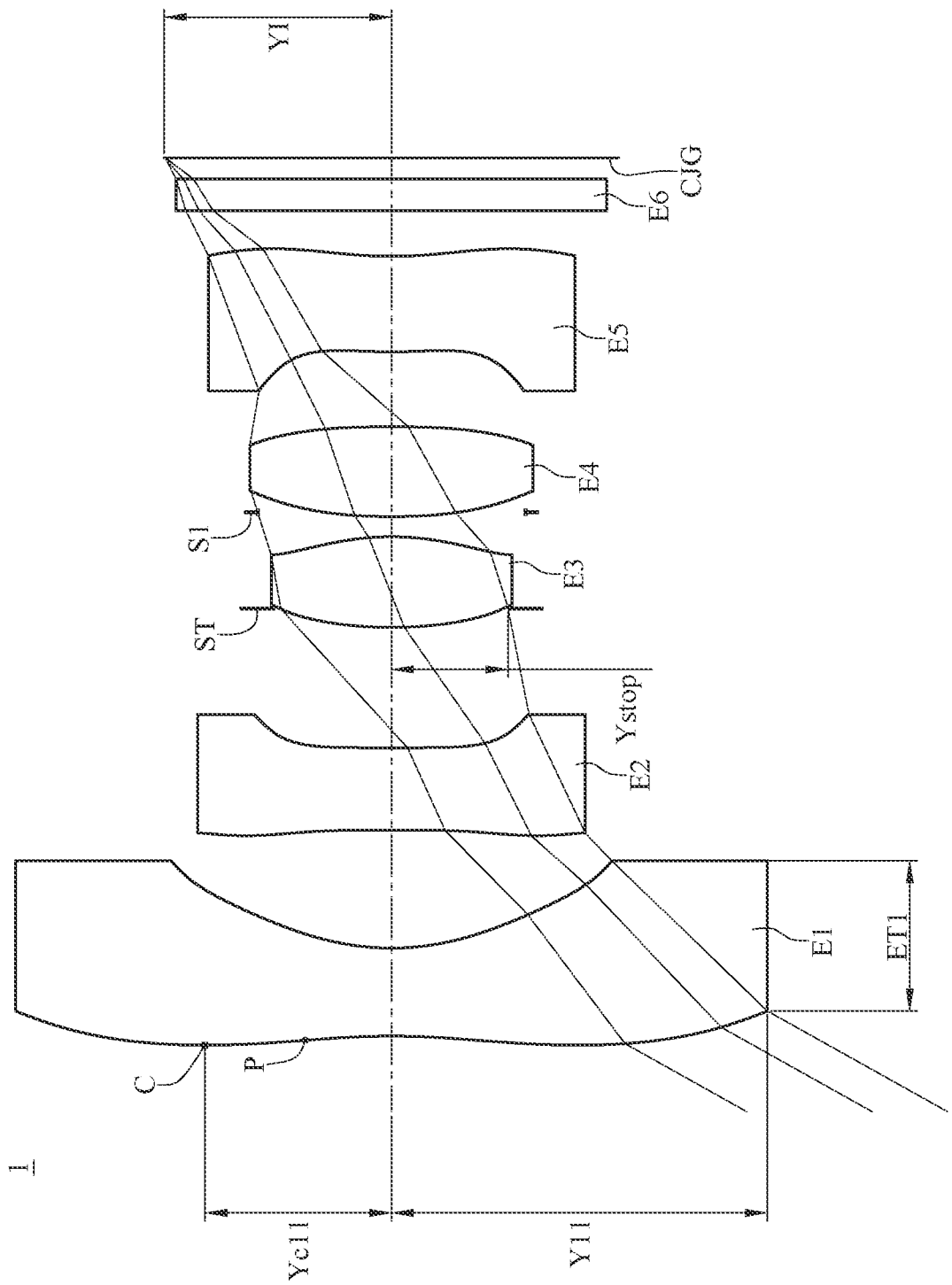
FIG. 33 shows a schematic view of ET1, Y11, Yc11, Ystop, YI and an inflection point and a critical point on the outer-side surface of the first lens element according to the 1st embodiment of the present disclosure.

The first lens element can have negative refractive power. Therefore, it is favorable for enlarging the field of view so as to obtain a relatively large range of image information. The outer-side surface of the first lens element is concave in a paraxial region thereof. Therefore, it is favorable for reducing possibility of scratch on the lens surface during assembly so as to increase assembly yield rate. The outer-side surface of the first lens element has at least one inflection point. Therefore, it is favorable for increasing design flexibility on the lens surface, thereby correcting aberrations and miniaturizing the lens element. Please refer to FIG. 33, which shows a schematic view of an inflection point P of the outer-side surface of the first lens element E1 according to the 1st embodiment of the present disclosure. The outer-side surface of the first lens element can have at least one critical point in an off-axis region thereof. Therefore, it is favorable for further increasing design flexibility of the lens surface so as to reduce the angle between the light beam and the lens surface, thereby preventing total reflection generated thereon. Please refer to FIG. 33, which shows a schematic view of a critical point C of the outer-side surface of the first lens element E1 according to the 1st embodiment of the present disclosure. The abovementioned inflection point and the critical point on the outer-side surface of the first lens element in FIG. 33 are only exemplary. Each of lens surfaces in various embodiments of the present disclosure may also have one or more inflection points or one or more critical points.

The outer-side surface of the third lens element can be convex in a paraxial region thereof. Therefore, it is favorable for adjusting the lens shape of the third lens element, thereby increasing the aperture size.

The outer-side surface of the fifth lens element can be convex in a paraxial region thereof. Therefore, it is favorable for adjusting the travelling direction of light, thereby increasing correction capability of the fifth lens element in field curvature.

According to the present disclosure, at least one lens element of the image lens assembly can include a plastic material. Therefore, it is favorable for effectively reducing manufacturing cost, thereby increasing image quality and mass production capability. Moreover, each of at least two lens elements of the image lens assembly can include a plastic material.

According to the present disclosure, the image lens assembly can further include an aperture stop that can be located between the first lens element and the third lens element. Therefore, it is favorable for adjusting the position of the aperture stop, thereby increasing the field of view and the aperture size.

According to the present disclosure, the image lens assembly can be operated within infrared light having a wavelength ranging from 750 nm (nanometers) to 1500 nm. Therefore, it is favorable for reducing interference of visible light so as to achieve various applications such as motion capture, augmented reality (AR), facial recognition and night photography.

When an f-number of the image lens assembly is Fno, the following condition is satisfied: $0.40<Fno<2.20$. Therefore, it is favorable for adjusting the aperture size so as to increase the amount of light incident into the image lens assembly and thereby to support various applications, such that the image lens assembly can have a good image capability when operated within infrared light. Moreover, the following condition can also be satisfied: $0.80<Fno<2.00$. Moreover, the following condition can also be satisfied: $1.00<Fno<1.75$. Moreover, the following condition can also be satisfied: $1.00<Fno<1.60$.

When a focal length of the image lens assembly is f, a focal length of the first lens element is f1, a focal length of the second lens element is f2, and a focal length of the fourth lens element is f4, the following condition can be satisfied: $1.20<|f/f1|/(|f/f2|+|f/f4|)<15.00$. Therefore, it is favorable for providing significant refractive power of the image lens assembly towards the first lens element, such that the remaining lens elements maintain lens shapes thereof while having correction capability in off-axis aberrations, thereby reducing molding difficulty and thus increasing yield rate. Moreover, the following condition can also be satisfied: $1.60<|f/f1|/(|f/f2|+|f/f4|)<12.00$. Moreover, the following condition can also be satisfied: $1.80<|f/f1|/(|f/f2|+|f/f4|)<9.00$.

When an axial distance between the outer-side surface of the first lens element and an inner-side conjugate surface of the image lens assembly is TL, and the focal length of the image lens assembly is f, the following condition can be satisfied: $3.00<TL/f<10.00$. Therefore, it is favorable for balancing the total track length of the image lens assembly and controlling the field of view so as to meet product application requirements. Moreover, the following condition can also be satisfied: $4.00<TL/f<9.00$. Moreover, the following condition can also be satisfied: $4.20<TL/f<8.50$.

When an Abbe number of the third lens element is V3, and an Abbe number of the fifth lens element is V5, the following condition can be satisfied: $30.0<V3+V5<70.0$. Therefore, it is favorable for adjusting the materials of the third lens element and the fifth lens element, thereby achieving a relatively strong light path control capability in a limited space. Moreover, the following condition can also be satisfied: $35.0<V3+V5<60.0$. According to the present disclosure, the Abbe number V of one lens element is obtained from the following equation: $V=(Nd-1)/(NF-NC)$, wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When the focal length of the image lens assembly is f, and the focal length of the second lens element is f2, the following condition can be satisfied: $-0.80<f/f2<0.08$. Therefore, it is favorable for adjusting the refractive power of the second lens element, thereby reducing the spot size at the central field of view. Moreover, the following condition can also be satisfied: $-0.50<f/f2<0.06$. Moreover, the following condition can also be satisfied: $-0.25<f/f2<0.00$.

When the focal length of the image lens assembly is f, and a curvature radius of the outer-side surface of the first lens element is R1, the following condition can be satisfied: $-2.00<f/R1<-0.12$. Therefore, it is favorable for adjusting the lens shape of the first lens element so as to obtain a proper balance between increasing in the field of view and reduction in the size of the image lens assembly.

When an axial distance between the first lens element and the second lens element is T12, a central thickness of the third lens element is CT3, and the focal length of the image lens assembly is f, the following condition can be satisfied: $1.25<(T12+CT3)/f<3.00$. Therefore, it is favorable for enhancing the structural strength at the middle portion of the image lens assembly so as to increase the stability and reduce the sensitivity of the image lens assembly.

When the axial distance between the outer-side surface of the first lens element and the inner-side conjugate surface of the image lens assembly is TL, and a maximum effective radius of the inner-side conjugate surface of the image lens assembly is YI, the following condition can be satisfied: $3.20<TL/YI<7.00$. Therefore, it is favorable for adjusting the ratio of the total track length of the image lens assembly to the size of the inner-side conjugate surface, thereby miniaturizing the image lens assembly while increasing the light absorption area or light source area of the inner-side conjugate surface. Moreover, the following condition can also be satisfied: $3.20<TL/YI<6.50$. Moreover, the following condition can also be satisfied: $3.20<TL/YI<5.00$. When the image lens assembly is applied to an image capturing unit or a receiving unit, the inner-side conjugate surface is the maximum image height, and the image lens assembly featuring a large inner-side conjugate surface provides high image quality.

When the image lens assembly is applied to a projecting unit, the inner-side conjugate surface is the maximum radius of the light source, and the image lens assembly featuring a large inner-side conjugate surface enhances the projection capability of the projecting unit. Please refer to FIG. 33, which shows a schematic view of YI according to the 1st embodiment of the present disclosure.

When the focal length of the image lens assembly is f, the focal length of the first lens element is f1, the focal length of the second lens element is f2, a focal length of the third lens element is f3, the focal length of the fourth lens element is f4, a focal length of the fifth lens element is f5, and a focal length of the i-th lens element is fi, at least two lens elements of the image lens assembly can satisfy the following condition: |f/fi|<0.19, wherein i=1, 2, 3, 4 or 5. Therefore, it is favorable for balancing the refractive power distribution of the image lens assembly so as to reduce the sensitivity of single lens element, thereby increasing assembly yield rate. Moreover, at least two lens elements of the image lens assembly can also satisfy the following condition: |f/fi|<0.16, wherein i=1, 2, 3, 4 or 5. Moreover, at least two lens elements of the image lens assembly can also satisfy the following condition: |f/fi|<0.12, wherein i=1, 2, 3, 4 or 5.

When an Abbe number of the first lens element is V1, an Abbe number of the second lens element is V2, the Abbe number of the third lens element is V3, an Abbe number of the fourth lens element is V4, the Abbe number of the fifth lens element is V5, and an Abbe number of the i-th lens element is Vi, at least three lens elements of the image lens assembly can satisfy the following condition: 15.0<Vi<50.0, wherein i=1, 2, 3, 4 or 5. The lower the Abbe number of a lens element is, the larger refractive power will be a characteristic of the said lens element. Therefore, it is favorable for further correcting aberrations and increasing aperture size. And, due to a low demand of the chromatic aberration correction within infrared light, it is also favorable for further correcting other kinds of aberrations. Moreover, at least three lens elements of the image lens assembly can also satisfy the following condition: 18.0<Vi<48.0, wherein i=1, 2, 3, 4 or 5. Moreover, at least three lens elements of the image lens assembly can also satisfy the following condition: 20.0<Vi<40.0, wherein i=1, 2, 3, 4 or 5. When a central thickness of the first lens element is CT1, and a central thickness of the second lens element is CT2, the following condition can be satisfied: 0.40<CT1/CT2<2.00. Therefore, it is favorable for adjusting the ratio of the central thickness of the first lens element to the central thickness of the second lens element so as to obtain a proper balance between increasing in manufacturing yield rate and increasing in the field of view. Moreover, the following condition can also be satisfied: 0.40<CT1/CT2<1.50.

When a curvature radius of the outer-side surface of the third lens element is R5, and a curvature radius of the inner-side surface of the third lens element is R6, the following condition can be satisfied: −30.00<R5/R6<0.50. Therefore, it is favorable for adjusting the lens shape of the third lens element, such that the third lens element provides significant convergence capability for the image lens assembly. Moreover, the following condition can also be satisfied: −15.00<R5/R6<0.00.

When the focal length of the image lens assembly is f, and a curvature radius of the inner-side surface of the fifth lens element is R10, the following condition can be satisfied: |f/R10|<0.80. Therefore, it is favorable for preventing overly curving the lens shape of the inner-side surface of the fifth lens element while maintaining the correction capability thereof in off-axis aberrations, thereby reducing molding difficulty. Moreover, the following condition can also be satisfied: |f/R10|<0.55.

When half of a maximum field of view of the image lens assembly is HFOV, the following condition can be satisfied: 46.0 [deg.]<HFOV<120.0 [deg.]. Therefore, it is favorable for increasing the photographing range so as to receive more spatial information at the peripheral environment, such that the image lens assembly is suitable for various scenarios. Moreover, the following condition can also be satisfied: 50.0 [deg.]<HFOV<100.0 [deg.]. Moreover, the following condition can also be satisfied: 52.0 [deg.]<HFOV<90.0 [deg.]. Moreover, the following condition can also be satisfied: 56.0 [deg.]<HFOV<80.0 [deg.].

When a refractive index of the fourth lens element is N4, the following condition can be satisfied: 1.52<N4<1.60. Therefore, it is favorable for selecting a proper material of the fourth lens element so as to disperse the refractive powers for preventing excessive aberration correction due to overly strong refractive power of single lens element.

When a maximum effective radius of the outer-side surface of the first lens element is Y11, and a maximum effective radius of the aperture stop is Ystop, the following condition can be satisfied: 2.80<Y11/Ystop<7.00. Therefore, it is favorable for obtaining a proper balance between increasing in the aperture size and increasing in the field of view. Moreover, the following condition can also be satisfied: 3.00<Y11/Ystop<5.00. Please refer to FIG. 33, which shows a schematic view of Y11 and Ystop according to the 1st embodiment of the present disclosure.

When the Abbe number of the fourth lens element is V4, and the Abbe number of the fifth lens element is V5, the following condition can be satisfied: 1.10<V4/V5<5.00. Therefore, it is favorable for adjusting the material configuration of the fourth lens element and the fifth lens element so as to correct aberrations. Moreover, the following condition can also be satisfied: 1.60<V4/V5<4.50. Moreover, the following condition can also be satisfied: 2.00<V4/V5<3.50.

When an axial distance between the aperture stop and the inner-side conjugate surface of the image lens assembly is SL, and the axial distance between the outer-side surface of the first lens element and the inner-side conjugate surface of the image lens assembly is TL, the following condition can be satisfied: 0.45<SL/TL<0.85. Therefore, it is favorable for adjusting the ratio of the total track length of the image lens assembly to the distance between the aperture stop and the inner-side conjugate surface, thereby increasing relative illuminance at the peripheral field of view.

When an entrance pupil diameter of the image lens assembly is EPD, and an axial distance between the inner-side surface of the fifth lens element and the inner-side conjugate surface of the image lens assembly is BL, the following condition can be satisfied: 0.30<EPD/BL<1.80. Therefore, it is favorable for adjusting the ratio of the entrance pupil diameter to the back focal length, thereby obtaining a proper balance between increasing in the aperture size and reduction in the back focal length. Moreover, the following condition can also be satisfied: 0.50<EPD/BL<1.50.

When a curvature radius of the inner-side surface of the fourth lens element is R8, and a curvature radius of the outer-side surface of the fifth lens element is R9, the following condition can be satisfied: −5.00<(R8+R9)/(R8−

R9)<5.00. Therefore, it is favorable for adjusting the lens shapes of the fourth lens element and the fifth lens element, thereby increasing convergence quality at the central and peripheral fields of view. Moreover, the following condition can also be satisfied: $-4.00<(R8+R9)/(R8-R9)<3.00$.

When a sum of axial distances between each of all adjacent lens elements of the image lens assembly is $\Sigma AT$, and the central thickness of the second lens element is CT2, the following condition can be satisfied: $1.20<\Sigma AT/CT2<6.00$. Therefore, it is favorable for adjusting the ratio of sum of lens intervals to the thickness of the second lens element so as to increase the space utilization efficiency of the image lens assembly, thereby preventing interference between lens elements due to an overly small lens interval or preventing eccentricity error due to an overly large lens interval. Moreover, the following condition can also be satisfied: $1.50<\Sigma AT/CT2<5.00$.

When a maximum value among central thicknesses of all lens elements of the image lens assembly is max(CT), and a minimum value among central thicknesses of all lens elements of the image lens assembly is min(CT), the following condition can be satisfied: $1.00<\max(CT)/\min(CT)<4.00$. Therefore, it is favorable for effectively balancing lens thicknesses among the image lens assembly so as to ensure suitable thicknesses of lens elements, thereby increasing manufacturing yield rate. Moreover, the following condition can also be satisfied: $1.20<\max(CT)/\min(CT)<3.50$.

When a vertical distance between a critical point located farthest away from an optical axis on the outer-side surface of the first lens element and the optical axis is Yc11, and the maximum effective radius of the outer-side surface of the first lens element is Y11, the following condition can be satisfied: $0.30<Yc11/Y11<0.80$. Therefore, it is favorable for adjusting the position of the critical point on the outer-side surface of the first lens element, thereby receiving light from a relatively large field of view. Moreover, the following condition can also be satisfied: $0.30<Yc11/Y11<0.68$. Please refer to FIG. 33, which shows a schematic view of Yc11 and Y11 according to the 1st embodiment of the present disclosure.

When a distance in parallel with the optical axis between a maximum effective radius position of the outer-side surface of the first lens element and a maximum effective radius position of the inner-side surface of the first lens element is ET1, and the central thickness of the first lens element is CT1, the following condition can be satisfied: $1.10<ET1/CT1<2.00$. Therefore, it is favorable for adjusting the ratio of the edge thickness of the first lens element to the central thickness of the first lens element so as to maintain the sufficient edge thickness thereof for increasing assembly yield rate. Please refer to FIG. 33, which shows a schematic view of ET1 according to the 1st embodiment of the present disclosure.

When the central thickness of the second lens element is CT2, and the central thickness of the third lens element is CT3, the following condition can be satisfied: $0.50<CT2/CT3<2.40$. Therefore, it is favorable for adjusting the ratio of the central thickness of the second lens element to the central thickness of the third lens element so as to obtain a proper balance between manufacturing yield rate and image quality at the central field of view. Moreover, the following condition can also be satisfied: $0.50<CT2/CT3<1.80$.

When a curvature radius of the outer-side surface of the fourth lens element is R7, and the curvature radius of the inner-side surface of the fourth lens element is R8, the following condition can be satisfied: $-1.00<R7/R8<4.00$. Therefore, it is favorable for adjusting the lens shape of the fourth lens element so as to correct peripheral aberrations. Moreover, the following condition can also be satisfied: $-0.78<R7/R8<2.56$.

When a composite focal length of the first lens element and the second lens element is f12, and a composite focal length of the fourth lens element and the fifth lens element is f45, the following condition can be satisfied: $-3.00<f12/f45<0.30$. Therefore, it is favorable for collaborating the lens elements at the outer side and the lens elements at the inner side among the image lens assembly so as to correct aberrations such as spherical aberration. Moreover, the following condition can also be satisfied: $-2.00<f12/f45<0.00$.

When a curvature radius of the outer-side surface of the second lens element is R3, and the curvature radius of the inner-side surface of the third lens element is R6, the following condition can be satisfied: $0.00<(R3+R6)/(R3-R6)<5.00$. Therefore, it is favorable for effectively controlling the lens shapes of the second lens element and the third lens element so as to have function for correcting aberrations generated by the adjacent lens element, thereby correcting field curvature.

When a maximum value of axial distances between each of all adjacent lens elements of the image lens assembly is max(AT), and a minimum value of axial distances between each of all adjacent lens elements of the image lens assembly is min(AT), the following condition can be satisfied: $1.00<\max(AT)/\min(AT)<20.00$. Therefore, it is favorable for adjusting the ratio of lens intervals, thereby obtaining a proper balance between reduction in the manufacturing tolerance and the temperature effect.

According to the present disclosure, the aforementioned features and conditions can be utilized in numerous combinations so as to achieve corresponding effects.

According to the present disclosure, the lens elements of the image lens assembly can be made of either glass or plastic material. When the lens elements are made of glass material, the refractive power distribution of the image lens assembly may be more flexible, and the influence on image quality caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the image lens assembly can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof. According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an outer-side surface and an inner-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters (e.g., the refractive power and the focal length) of the image lens assembly, image capturing unit, receiving unit, projecting unit, image sensor and the electronic device are not specifically defined, these parameters may be determined according to the operating wavelength range. For example, when the operating wavelength range is a wavelength range of visible light (e.g., 350 nm to 750 nm), these parameters are defined at the wavelength of helium d-line; when the operating wavelength range is a wavelength range of near infrared light (e.g., 750 nm to 1500 nm), these parameters are defined at the wavelength of 940 nm.

According to the present disclosure, an inflection point is a point on the surface of the lens element at which the surface changes from concave to convex, or vice versa. A critical point is a non-axial point of the lens surface where its tangent is perpendicular to the optical axis. According to the present disclosure, the inner-side conjugate surface of the image lens assembly, based on the corresponding image sensor, can be flat or curved, especially a curved surface being concave facing towards the outer side of the image lens assembly. According to the present disclosure, an image correction unit, such as a field flattener, can be optionally disposed between the lens element closest to the inner side of the image lens assembly along the optical path and the inner-side conjugate surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit or the receiving unit. In general, a preferable image correction unit is, for example, a thin transparent element having a concave outer-side surface and a planar inner-side surface, and the thin transparent element is disposed near the inner-side conjugate surface.

Figure 34:
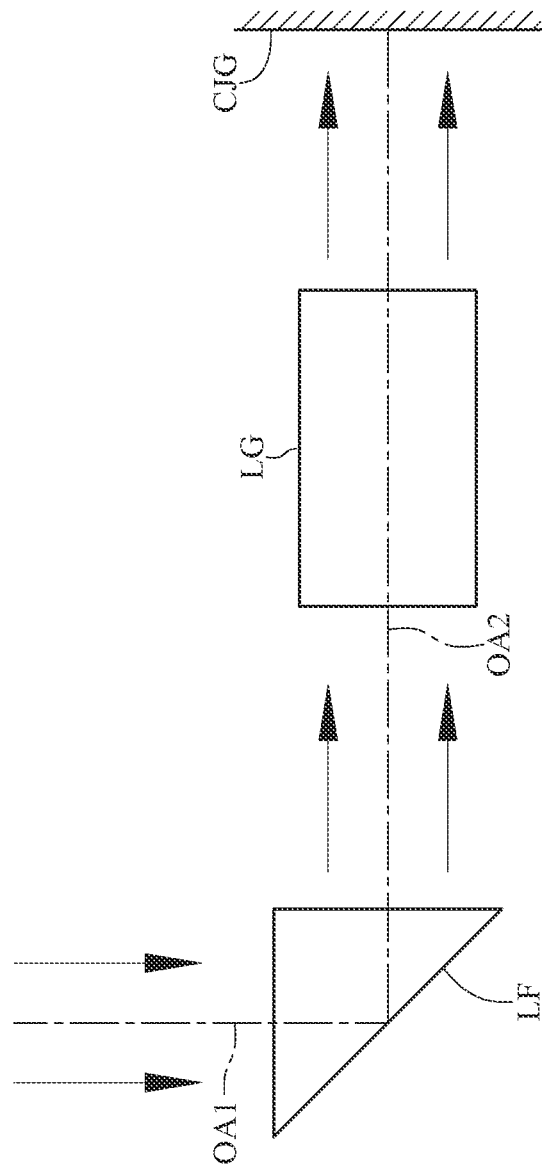
FIG. 34 shows a schematic view of a configuration of a light-folding element in an image lens assembly according to one embodiment of the present disclosure.
Figure 35:
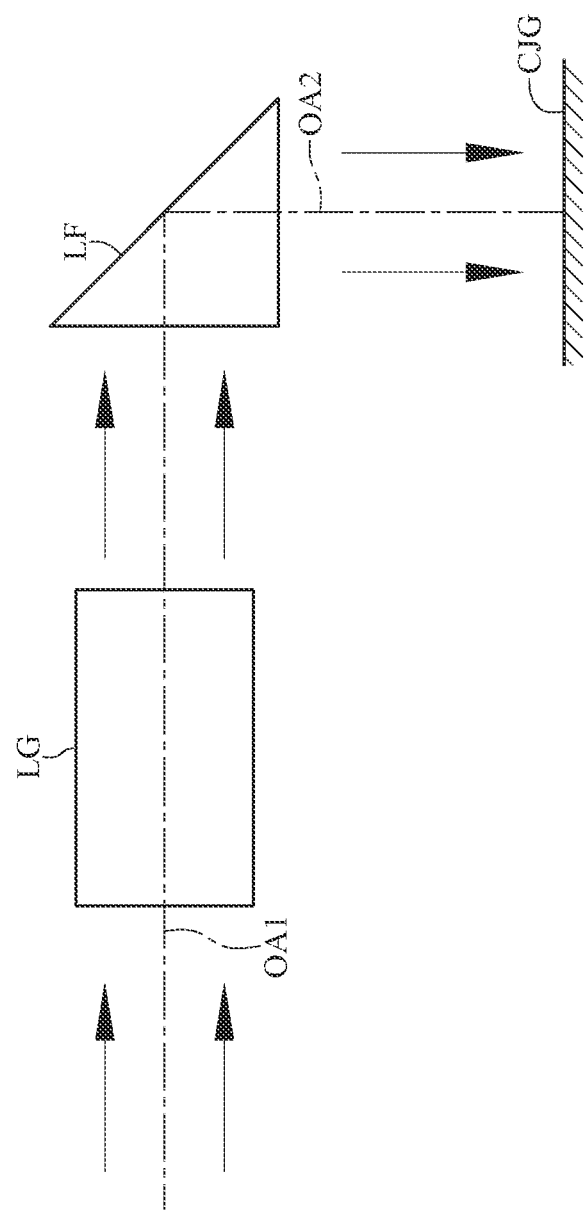
FIG. 35 shows a schematic view of another configuration of a light-folding element in an image lens assembly according to one embodiment of the present disclosure.
Figure 36:
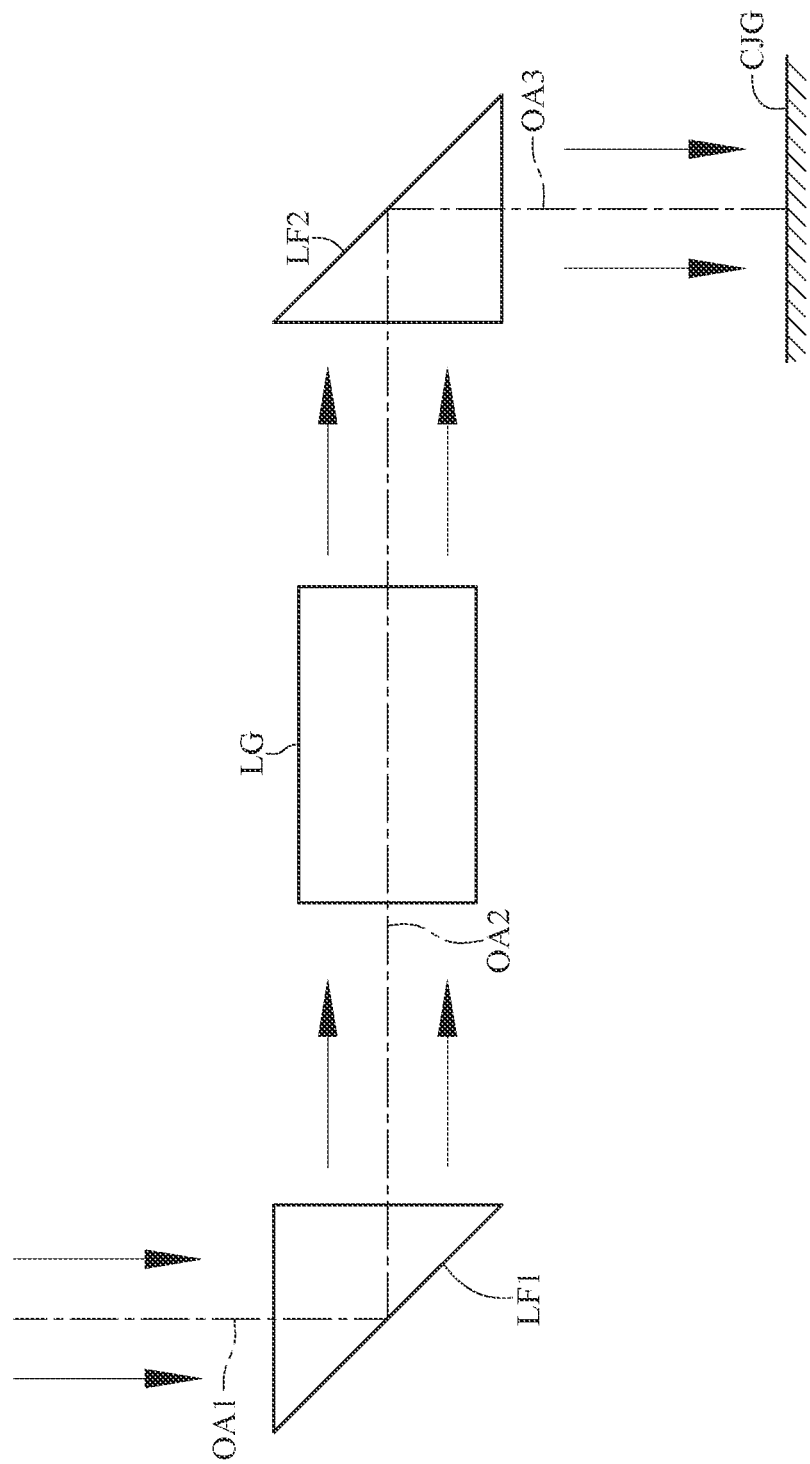
FIG. 36 shows a schematic view of a configuration of two light-folding elements in an image lens assembly according to one embodiment of the present disclosure.

According to the present disclosure, at least one light-folding element, such as a prism or a mirror, can be optionally disposed between an outer object (an imaged object or a detected object) and the inner-side conjugate surface on the optical path, such that the image lens assembly can be more flexible in space arrangement, and therefore the dimensions of an electronic device is not restricted by the total track length of the image lens assembly. Specifically, please refer to FIG. 34 and FIG. 35. FIG. 34 shows a schematic view of a configuration of a light-folding element in an image lens assembly according to one embodiment of the present disclosure, and FIG. 35 shows a schematic view of another configuration of a light-folding element in an image lens assembly according to one embodiment of the present disclosure. In FIG. 34 and FIG. 35, the image lens assembly can have, in order from an outer object (not shown in the figures) to an inner-side conjugate surface CJG along an optical path, a first optical axis OA1, a light-folding element LF and a second optical axis OA2. The light-folding element LF can be disposed between the outer object and a lens group LG of the image lens assembly as shown in FIG. 34 or disposed between a lens group LG of the image lens assembly and the inner-side conjugate surface CJG as shown in FIG. 35. Furthermore, please refer to FIG. 36, which shows a schematic view of a configuration of two light-folding elements in an image lens assembly according to one embodiment of the present disclosure. In FIG. 36, the image lens assembly can have, in order from an outer object (not shown in the figure) to an inner-side conjugate surface CJG along an optical path, a first optical axis OA1, a first light-folding element LF1, a second optical axis OA2, a second light-folding element LF2 and a third optical axis OA3. The first light-folding element LF1 is disposed between the outer object and a lens group LG of the image lens assembly, the second light-folding element LF2 is disposed between the lens group LG of the image lens assembly and the inner-side conjugate surface CJG, and the travelling direction of light on the first optical axis OA1 can be the same direction as the travelling direction of light on the third optical axis OA3 as shown in FIG. 36. The image lens assembly can be optionally provided with three or more light-folding elements, and the present disclosure is not limited to the type, amount and position of the light-folding elements of the embodiments disclosed in the aforementioned figures.

According to the present disclosure, the image lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an outer object and the first lens element can provide a longer distance between an exit pupil of the image lens assembly and the inner-side conjugate surface to produce a telecentric effect, thereby improving the image-sensing efficiency of an image sensor (for example, CCD or CMOS) when the image lens assembly is applied to an image capturing unit or a receiving unit, or thereby increasing projection efficiency when the image lens assembly is applied to a projecting unit. A middle stop disposed between the first lens element and the inner-side conjugate surface is favorable for enlarging the viewing angle of the image lens assembly and thereby provides a wider field of view for the same.

According to the present disclosure, the image lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. When the image lens assembly is applied to an image capturing unit or a receiving unit, the aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed. When the image lens assembly is applied to a projecting unit, the aperture control unit adjusts the projection illuminance or area.

According to the present disclosure, the image lens assembly can include one or more optical elements for limiting the form of light passing through the image lens assembly. Each optical element can be, but not limited to, a filter, a polarizer, etc., and each optical element can be, but not limited to, a single-piece element, a composite component, a thin film, etc. The optical element can be located at the outer side or the inner side of the image lens assembly or between any two adjacent lens elements so as to allow light in a specific form to pass through, thereby meeting application requirements.

Figure 25:
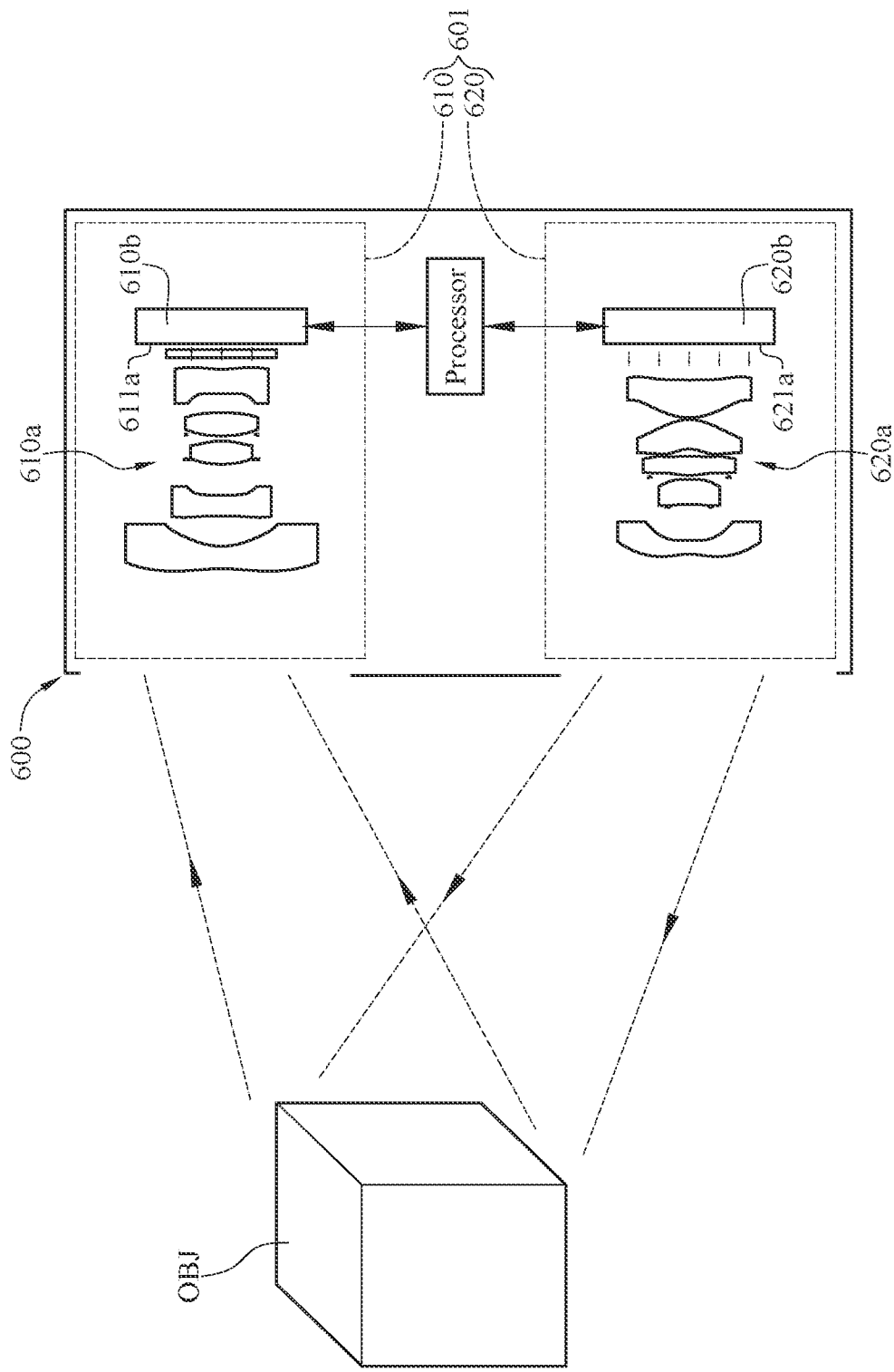
FIG. 25 is a schematic view of a detecting module of an electronic device according to the 14th embodiment of the present disclosure.

According to the present disclosure, said outer side indicates the outside of a mechanism, said inner side indicates the inside of the mechanism, and said inner-side conjugate surface indicates the focus plane inside the mechanism. FIG. 25 is a schematic view of an imaging lens assembly of a receiving unit and a projecting lens assembly of a projecting unit according to an exemplary embodiment of the present disclosure. In the receiving unit 610, the inner-side conjugate surface 611a of the imaging optical system 610a is an image surface. In the projecting unit 620, the inner-side conjugate surface 621a of the projecting optical system 620a is a conjugate surface at the reduction side. As for the imaging optical system 610a, the outer side of the imaging optical system 610a is an object side of the imaging optical system 610a, and the inner side of the imaging optical system 610a is an image side of the imaging optical system 610a. As for any lens element of the imaging optical system 610a, an outer-side surface of the lens element is a lens surface facing toward the object side, and an inner-side surface of the lens element is a lens surface facing toward the image side. As for the projecting optical system 620a of the projecting unit 620, the outer side of the projecting optical system 620a is a magnifying side of the projecting optical system 620a close to a detected object OBJ, and the inner side of the projecting optical system 620a is a reduction side of the projecting optical system 620a close to a light source 620b. As for any lens element of the projecting optical system 620a, an outer-side surface (i.e., a light emitting surface) of the lens element is a lens surface facing toward the detected object OBJ, and an inner-side surface (i.e., a light receiving surface) of the lens element is a lens surface facing toward the light source 620b (or the inner-side conjugate surface 621a). Furthermore, a maximum effective radius YI of the inner-side conjugate surface 611a of the imaging optical system 610a is a maximum image height of the imaging optical system 610a; a maximum effective radius YI of the inner-side conjugate surface 621a of the projecting optical system 620a is a maximum radius of the light source 620b.

According to the above description of the present disclosure, the following specific embodiments are provided for further explanation.

1st Embodiment

Figure 1:
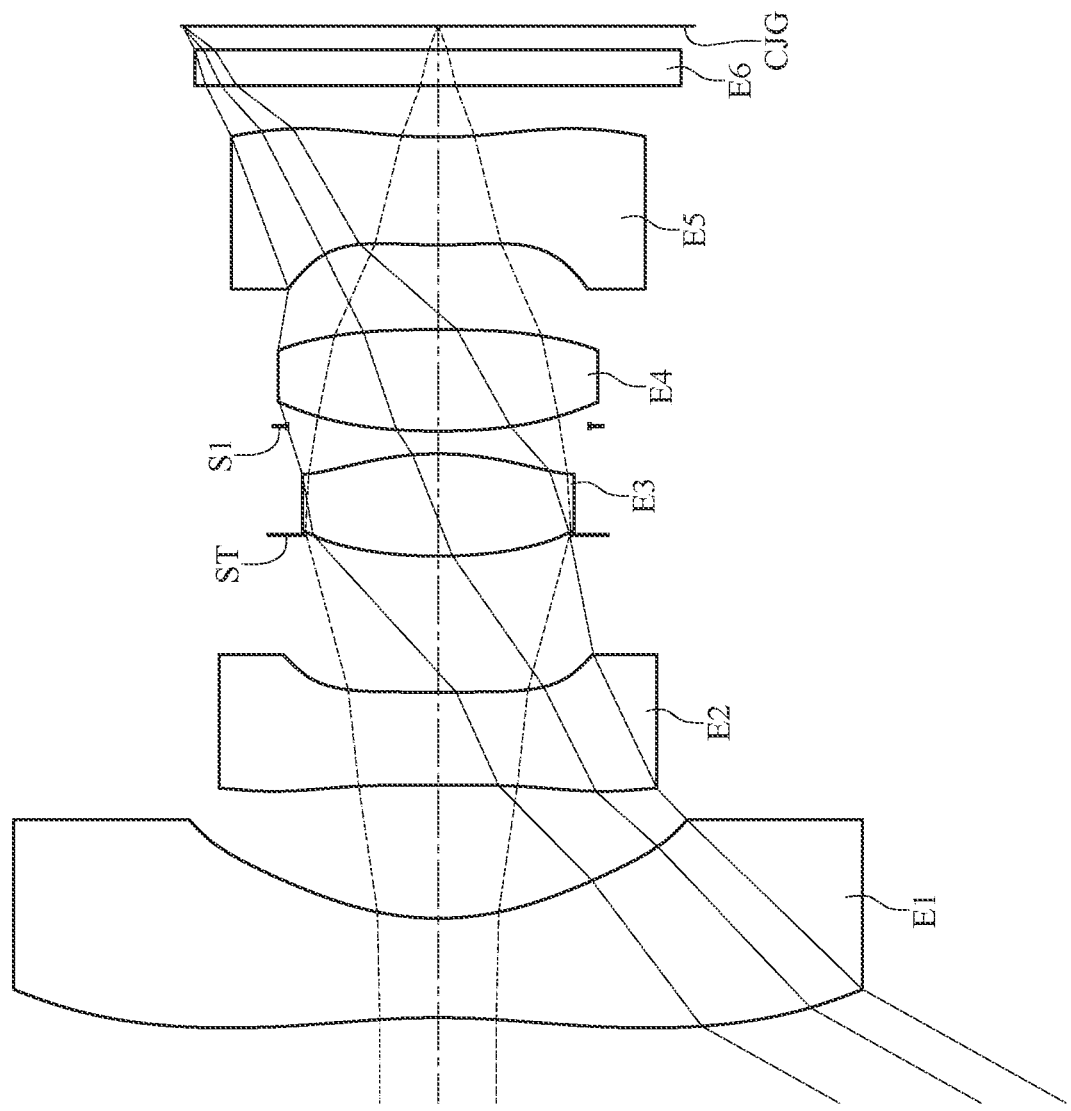
FIG. 1 is a schematic view of an optical device according to the 1st embodiment of the present disclosure.
Figure 2:
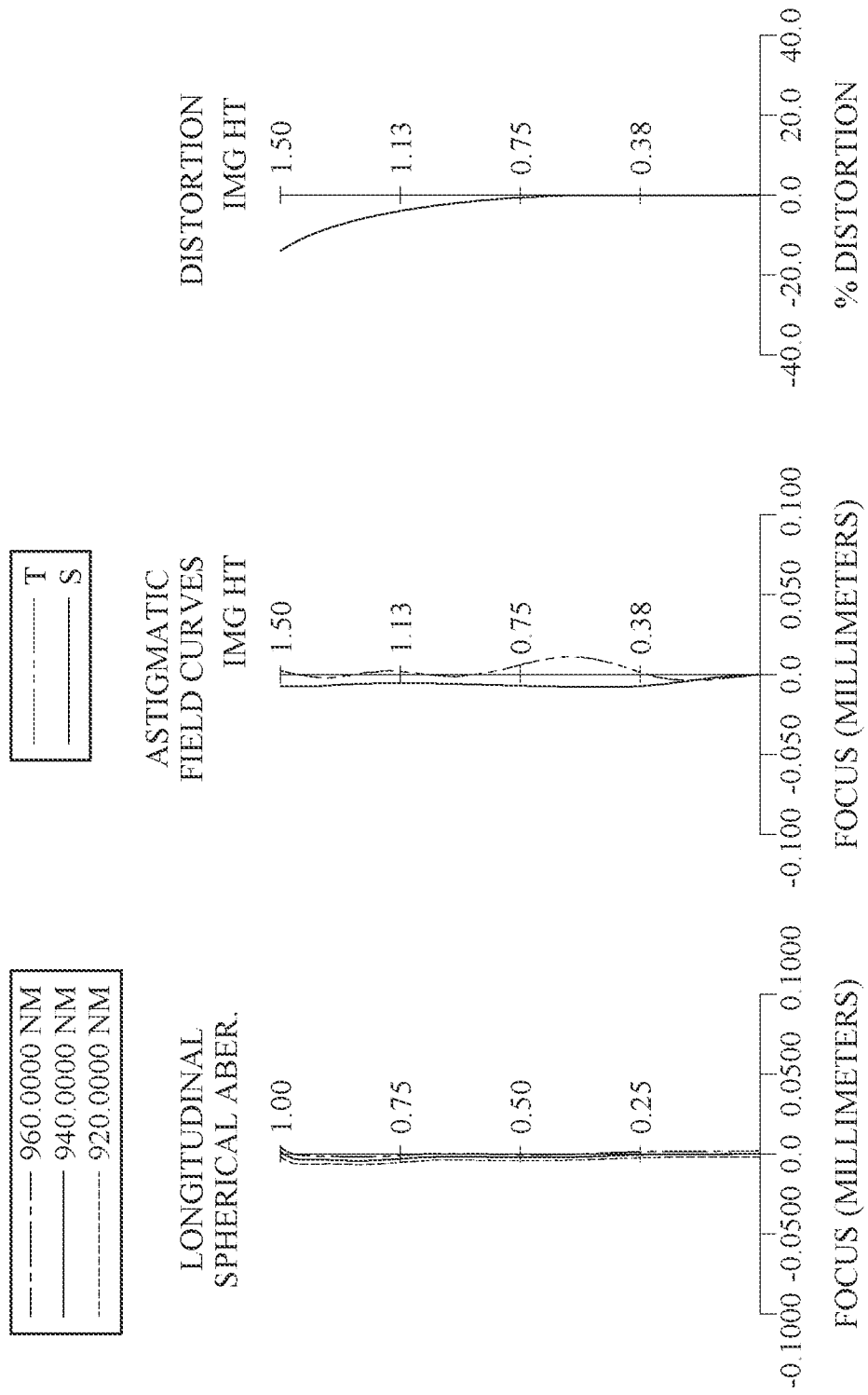
FIG. 2 shows spherical aberration curves, astigmatic field curves and a distortion curve of the optical device according to the 1st embodiment.

FIG. 1 is a schematic view of an optical device according to the 1st embodiment of the present disclosure. FIG. 2 shows, in order from left to right, spherical aberration curves, astigmatic field curves and a distortion curve of the optical device according to the 1st embodiment. The optical device 1 in FIG. 1 can be used as an image capturing unit, a receiving unit or a projecting unit. In FIG. 1, the optical device 1 includes the image lens assembly (its reference numeral is omitted) of the present disclosure. The image lens assembly includes, in order from an outer side to an inner side along an optical axis, a first lens element E1, a second lens element E2, an aperture stop ST, a third lens element E3, a stop S1, a fourth lens element E4, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The outer-side surface of the first lens element E1 has one critical point in an off-axis region thereof.

The second lens element E2 with negative refractive power has an outer-side surface being concave in a paraxial region thereof and an inner-side surface being concave in a paraxial region thereof. The second lens element E2 is made of plastic material and has the outer-side surface and the inner-side surface being both aspheric. The outer-side surface of the second lens element E2 has two inflection points. The outer-side surface of the second lens element E2 has one critical point in an off-axis region thereof.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric. The inner-side surface of the third lens element E3 has one inflection point. The inner-side surface of the third lens element E3 has one critical point in an off-axis region thereof.

The fourth lens element E4 with positive refractive power has an outer-side surface being convex in a paraxial region thereof and an inner-side surface being convex in a paraxial region thereof. The fourth lens element E4 is made of plastic material and has the outer-side surface and the inner-side surface being both aspheric. The inner-side surface of the fourth lens element E4 has one inflection point.

The fifth lens element E5 with negative refractive power has an outer-side surface being convex in a paraxial region thereof and an inner-side surface being concave in a paraxial region thereof. The fifth lens element E5 is made of plastic material and has the outer-side surface and the inner-side surface being both aspheric. The outer-side surface of the fifth lens element E5 has one inflection point. The inner-side surface of the fifth lens element E5 has one inflection point. The outer-side surface of the fifth lens element E5 has one critical point in an off-axis region thereof. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
- X is the displacement in parallel with an optical axis from an axial vertex on the aspheric surface to a point at a distance of Y from the optical axis on the aspheric surface;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14, 16, 18 and 20.

In the image lens assembly of the optical device 1 according to the 1st embodiment, when a focal length of the image lens assembly is f, an f-number of the image lens assembly is Fno, and half of a maximum field of view of the image lens assembly is HFOV, these parameters have the following values: f=0.98 millimeters (mm), Fno=1.43, HFOV=60.8 degrees (deg.). When the focal length of the image lens assembly is f, a focal length of the first lens element E1 is f1, a focal length of the second lens element E2 is f2, a focal length of the third lens element E3 is f3, a focal length of the fourth lens element E4 is f4, a focal length of the fifth lens element E5 is f5, the following conditions are satisfied: f/f1=−0.44; f/f2=−0.03; f/f3=0.54; f/f4=0.19; and f/f5=−0.05.

When an axial distance between the outer-side surface of the first lens element E1 and the inner-side conjugate surface CJG of the image lens assembly is TL, and the focal length of the image lens assembly is f, the following condition is satisfied: TL/f=5.95.

When the axial distance between the outer-side surface of the first lens element E1 and the inner-side conjugate surface CJG of the image lens assembly is TL, and a maximum effective radius of the inner-side conjugate surface CJG of the image lens assembly is YI, the following condition is satisfied: TL/YI=3.87.

When an axial distance between the aperture stop ST and an inner-side conjugate surface CJG of the image lens assembly is SL, and the axial distance between the outer-side surface of the first lens element E1 and the inner-side conjugate surface CJG of the image lens assembly is TL, the following condition is satisfied: SL/TL=0.51.

When an entrance pupil diameter of the image lens assembly is EPD, and an axial distance between the inner-side surface of the fifth lens element E5 and an inner-side conjugate surface CJG of the image lens assembly is BL, the following condition is satisfied: EPD/BL=1.05. When a curvature radius of the outer-side surface of the second lens element E2 is R3, and a curvature radius of the inner-side surface of the third lens element E3 is R6, the following condition is satisfied: (R3+R6)/(R3−R6)=1.08.

When a curvature radius of the inner-side surface of the fourth lens element E4 is R8, and a curvature radius of the outer-side surface of the fifth lens element E5 is R9, the following condition is satisfied: (R8+R9)/(R8−R9)=0.38.

When a curvature radius of the outer-side surface of the third lens element E3 is R5, and the curvature radius of the inner-side surface of the third lens element E3 is R6, the following condition is satisfied: R5/R6=−1.61.

When a curvature radius of the outer-side surface of the fourth lens element E4 is R7, and the curvature radius of the inner-side surface of the fourth lens element E4 is R8, the following condition is satisfied: R7/R8=−0.44.

When the focal length of the image lens assembly is f, the focal length of the first lens element E1 is f1, the focal length of the second lens element E2 is f2, and the focal length of the fourth lens element E4 is f4, the following condition is satisfied: |f/f1|/(|f/f2|+|f/f4|)=2.03.

When the focal length of the image lens assembly is f, and a curvature radius of the outer-side surface of the first lens element E1 is R1, the following condition is satisfied: f/R1=−0.21.

When the focal length of the image lens assembly is f, and a curvature radius of the inner-side surface of the fifth lens element E5 is R10, the following condition is satisfied: |f/R10|=0.34. When a composite focal length of the first lens element E1 and the second lens element E2 is f12, and a composite focal length of the fourth lens element E4 and the fifth lens element E5 is f45, the following condition is satisfied: f12/f45=−0.33.

When a refractive index of the fourth lens element E4 is N4, the following condition is satisfied: N4=1.535.

When an Abbe number of the third lens element E3 is V3, and an Abbe number of the fifth lens element E5 is V5, the following condition is satisfied: V3+V5=41.9.

When an Abbe number of the fourth lens element E4 is V4, and the Abbe number of the fifth lens element E5 is V5, the following condition is satisfied: V4/V5=3.05.

When a central thickness of the first lens element E1 is CT1, and a central thickness of the second lens element E2 is CT2, the following condition is satisfied: CT1/CT2=1.07.

When the central thickness of the second lens element E2 is CT2, and a central thickness of the third lens element E3 is CT3, the following condition is satisfied: CT2/CT3=0.91.

When a distance in parallel with an optical axis between a maximum effective radius position of the outer-side surface of the first lens element E1 and a maximum effective radius position of the inner-side surface of the first lens element E1 is ET1, and the central thickness of the first lens element E1 is CT1, the following condition is satisfied: ET1/CT1=1.71.

When a sum of axial distances between each of all adjacent lens elements of the image lens assembly is ΣAT, and the central thickness of the second lens element E2 is CT2, the following condition is satisfied: ΣAT/CT2=4.07. In this embodiment, ΣAT is a sum of axial distances between the first lens element E1 and the second lens element E2, the second lens element E2 and the third lens element E3, the third lens element E3 and the fourth lens element E4, and the fourth lens element E4 and the fifth lens element E5. In this embodiment, an axial distance between two adjacent lens elements is a distance in a paraxial region between two adjacent lens surfaces of the two adjacent lens elements.

When an axial distance between the first lens element E1 and the second lens element E2 is T12, the central thickness of the third lens element E3 is CT3, and the focal length of the image lens assembly is f, the following condition is satisfied: (T12+CT3)/f=1.42. When a maximum effective radius of the outer-side surface of the first lens element E1 is Y11, and a maximum effective radius of the aperture stop ST is Ystop, the following condition is satisfied: Y11/Ystop=3.22.

When a vertical distance between a critical point located farthest away from the optical axis on the outer-side surface of the first lens element E1 and the optical axis is Yc11, and the maximum effective radius of the outer-side surface of the first lens element E1 is Y11, the following condition is satisfied: Yc11/Y11=0.50.

When a maximum value of axial distances between each of all adjacent lens elements of the image lens assembly is max(AT), and a minimum value of axial distances between each of all adjacent lens elements of the image lens assembly is min(AT), the following condition is satisfied: max(AT)/ min(AT)=5.99. In this embodiment, among the first through fifth lens elements (E1-E5), an axial distance between the second lens element E2 and the third lens element E3 is larger than axial distances between all the other two adjacent lens elements of the image lens assembly, and max(AT) is equal to the axial distance between the second lens element E2 and the third lens element E3. In this embodiment, among the first through fifth lens elements (E1-E5), an axial distance between the third lens element E3 and the fourth lens element E4 is smaller than axial distances between all the other two adjacent lens elements of the image lens assembly, and min(AT) is equal to the axial distance between the third lens element E3 and the fourth lens element E4.

When a maximum value among central thicknesses of all lens elements of the image lens assembly is max(CT), and a minimum value among central thicknesses of all lens elements of the image lens assembly is min(CT), the following condition is satisfied: max(CT)/min(CT)=1.16. In this embodiment, among the first through fifth lens elements (E1-E5), a central thickness of the fifth lens element E5 is larger than central thicknesses of all the other lens element of the image lens assembly, and max(CT) is equal to the central thickness of the fifth lens element E5. In this embodiment, among the first through fifth lens elements (E1-E5), a central thickness of the second lens element E2 is smaller than central thicknesses of all the other lens element of the image lens assembly, and min(CT) is equal to the central thickness of the second lens element E2.

The detailed optical data of the 1st embodiment are shown in Table 1A and the aspheric surface data are shown in Table 1 B below.

TABLE 1A

1st Embodiment
f = 0.98 mm, Fno = 1.43, HFOV = 60.8 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −4.5518 (ASP) | 0.582 | Plastic | 1.536 | 56.1 | −2.22 |
| 2 | | 1.6875 (ASP) | 0.782 | | | | |
| 3 | Lens 2 | −43.2900 (ASP) | 0.543 | Plastic | 1.634 | 20.4 | −33.75 |
| 4 | | 42.5263 (ASP) | 0.920 | | | | |
| 5 | Ape. Stop | Plano | −0.123 | | | | |
| 6 | Lens 3 | 2.7656 (ASP) | 0.600 | Plastic | 1.616 | 23.5 | 1.81 |
| 7 | | −1.7162 (ASP) | 0.163 | | | | |
| 8 | Stop | Plano | −0.030 | | | | |
| 9 | Lens 4 | 3.9515 (ASP) | 0.595 | Plastic | 1.535 | 56.0 | 5.22 |
| 10 | | −9.0387 (ASP) | 0.496 | | | | |
| 11 | Lens 5 | 4.0828 (ASP) | 0.632 | Plastic | 1.656 | 18.4 | −19.52 |
| 12 | | 2.9060 (ASP) | 0.300 | | | | |
| 13 | Filter | Plano | 0.210 | Glass | 1.508 | 64.2 | — |
| 14 | | Plano | 0.142 | | | | |
| 15 | Inner-Side Conjugate Surface | Plano | — | | | | |

Note:
Reference wavelength is 940.0 nm (infrared light).
An effective radius of the stop S1 (Surface 8) is 0.885 mm.

TABLE 1B

Aspheric Coefficients

| Surface # | 1 | 2 | 3 | 4 |
|---|---|---|---|---|
| k= | 0.0000000E+00 | −2.2412400E−01 | −9.0000000E+01 | 9.0000000E+01 |
| A4= | 8.3593539E−02 | −5.2674891E−02 | −1.6362508E−01 | 2.5001246E−02 |
| A6= | −4.0517384E−02 | 4.4839812E−02 | 1.9742437E−01 | 8.5029816E−01 |
| A8= | 1.6444336E−02 | −1.3656893E−01 | −2.4645234E−02 | −3.7271729E+00 |
| A10= | −4.7296987E−03 | 1.6298222E−01 | −8.7120558E−02 | 1.4832224E+01 |
| A12= | 9.1729307E−04 | −1.0407518E−01 | 7.5428747E−02 | −3.5978920E+01 |
| A14= | −1.1247694E−04 | 3.7141405E−02 | −2.7468011E−02 | 5.2335068E+01 |
| A16= | 7.8112745E−06 | −6.2741394E−03 | 3.6002913E−03 | −4.0911897E+01 |
| A18= | −2.3370966E−07 | 3.0459573E−04 | — | 1.2903331E+01 |

| Surface # | 6 | 7 | 9 | 10 |
|---|---|---|---|---|
| k= | 7.1014500E+00 | 6.4349900E−02 | −2.0803100E+00 | 7.1710900E+01 |
| A4= | −7.0806320E−03 | 1.7641708E−01 | 1.2485767E−01 | −1.3983631E−01 |
| A6= | −5.0409436E−03 | −3.0068958E−01 | −1.1522419E−02 | −1.2621514E−01 |
| A8= | 2.7721449E−01 | 1.7410407E+00 | −6.6218933E−01 | 1.9055573E+00 |
| A10= | −7.3101470E−01 | −6.0375063E+00 | 3.3835078E+00 | −8.1890036E+00 |
| A12= | 1.1434521E+00 | 1.3030941E+01 | −8.5269713E+00 | 2.1940566E+01 |
| A14= | −9.2252791E−01 | −1.4746394E+01 | 1.1901496E+01 | −3.7582002E+01 |
| A16= | 3.1366779E−01 | 6.9581802E+00 | −8.8791584E+00 | 3.9576424E+01 |

TABLE 1B-continued

| Aspheric Coefficients | | | | |
| --- | --- | --- | --- | --- |
| A18= | — | — | 2.7625957E+00 | −2.3474553E+01 |
| A20= | — | — | — | 6.0384805E+00 |

| Surface # | 11 | 12 |
| --- | --- | --- |
| k= | −2.1354700E+01 | 3.0718900E+00 |
| A4= | −3.8751229E−01 | −1.2658722E−01 |
| A6= | −8.1246782E−01 | −2.4192167E−01 |
| A8= | 3.4895146E+00 | 4.5365213E−01 |
| A10= | −1.1260737E+01 | −3.8479703E−01 |
| A12= | 1.8529167E+01 | 1.2145693E−01 |
| A14= | −1.0106702E+01 | 9.3030311E−02 |
| A16= | −1.0744885E+01 | −1.2108118E−01 |
| A18= | 1.7352937E+01 | 5.1252503E−02 |
| A20= | −6.5500377E+00 | −7.8231309E−03 |

In Table 1A, the curvature radius, the thickness and the focal length are shown in millimeters (mm). Surface numbers 0-15 represent the surfaces sequentially arranged from the outer side to the inner side along the optical axis, and the outer-side conjugate surface may be a surface of an outer object such as an imaged object or a detected object. In Table 1B, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
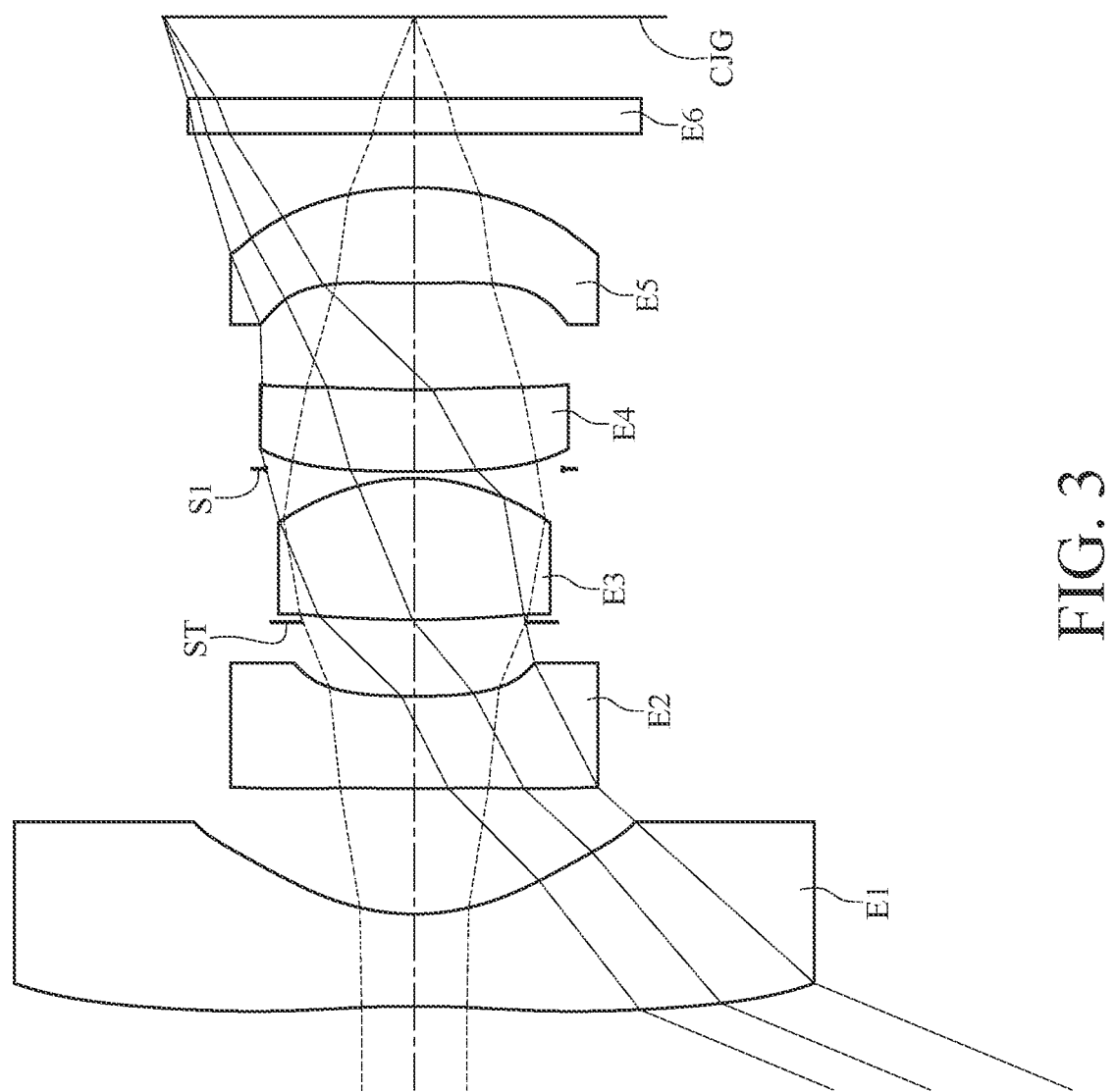
FIG. 3 is a schematic view of an optical device according to the 2nd embodiment of the present disclosure.
Figure 4:
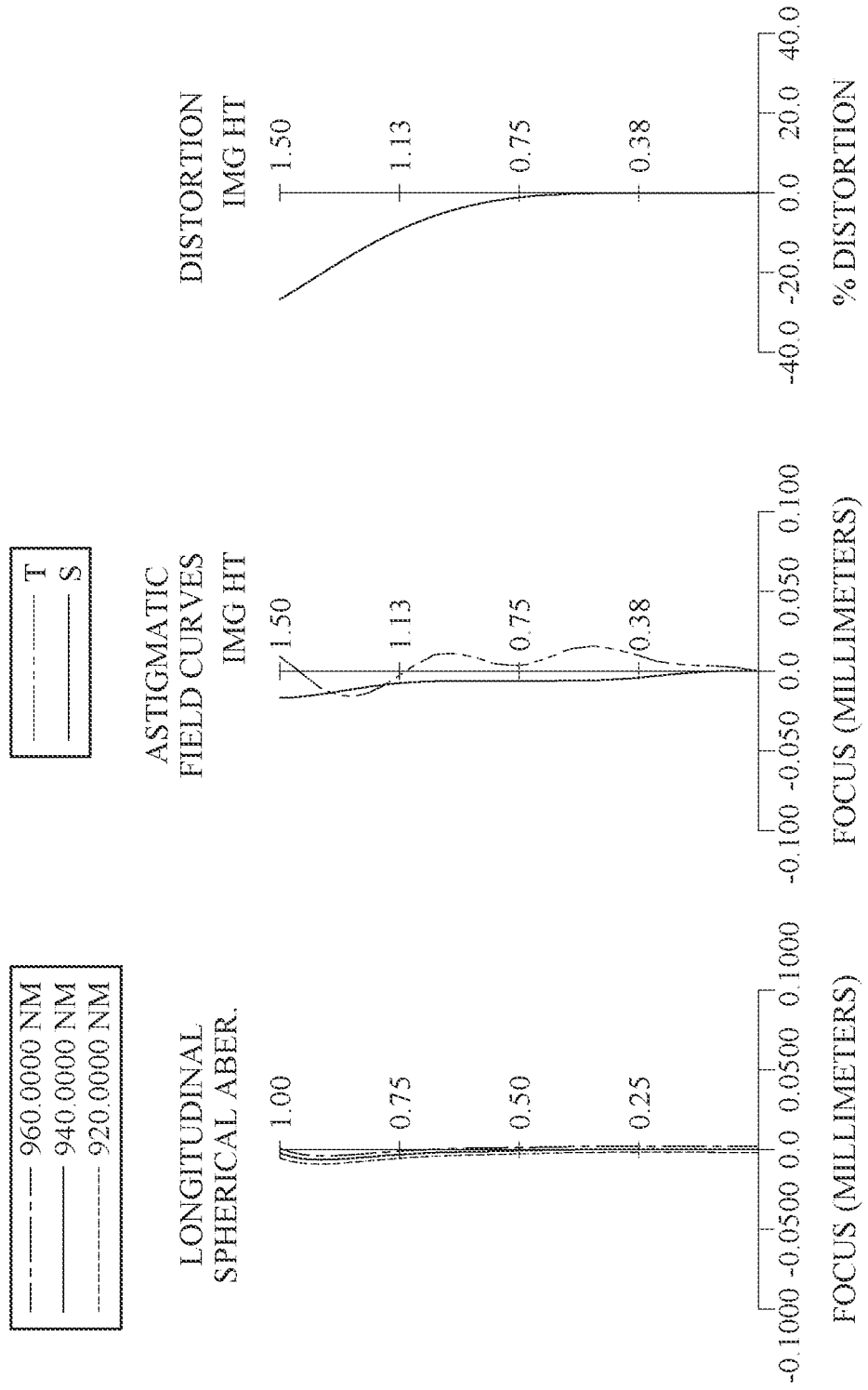
FIG. 4 shows spherical aberration curves, astigmatic field curves and a distortion curve of the optical device according to the 2nd embodiment.

FIG. 3 is a schematic view of an optical device according to the 2nd embodiment of the present disclosure. FIG. 4 shows, in order from left to right, spherical aberration curves, astigmatic field curves and a distortion curve of the optical device according to the 2nd embodiment. The optical device 2 in FIG. 3 can be used as an image capturing unit, a receiving unit or a projecting unit. In FIG. 3, the optical device 2 includes the image lens assembly (its reference numeral is omitted) of the present disclosure. The image lens assembly includes, in order from an outer side to an inner side along an optical axis, a first lens element E1, a second lens element E2, an aperture stop ST, a third lens element E3, a stop S1, a fourth lens element E4, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The outer-side surface of the first lens element E1 has one critical point in an off-axis region thereof.

The second lens element E2 with negative refractive power has an outer-side surface being convex in a paraxial region thereof and an inner-side surface being concave in a paraxial region thereof. The second lens element E2 is made of plastic material and has the outer-side surface and the inner-side surface being both aspheric. The outer-side surface of the second lens element E2 has three inflection points. The outer-side surface of the second lens element E2 has three critical points in an off-axis region thereof.

The third lens element E3 with positive refractive power has an outer-side surface being convex in a paraxial region thereof and an inner-side surface being convex in a paraxial region thereof. The third lens element E3 is made of glass material and has the outer-side surface and the inner-side surface being both aspheric.

The fourth lens element E4 with negative refractive power has an outer-side surface being convex in a paraxial region thereof and an inner-side surface being concave in a paraxial region thereof. The fourth lens element E4 is made of plastic material and has the outer-side surface and the inner-side surface being both aspheric. The inner-side surface of the fourth lens element E4 has two inflection points.

The fifth lens element E5 with positive refractive power has an outer-side surface being convex in a paraxial region thereof and an inner-side surface being convex in a paraxial region thereof. The fifth lens element E5 is made of plastic material and has the outer-side surface and the inner-side surface being both aspheric. The outer-side surface of the fifth lens element E5 has two inflection points. The inner-side surface of the fifth lens element E5 has one inflection point. The outer-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 2nd embodiment are shown in Table 2A and the aspheric surface data are shown in Table 2B below.

TABLE 2A

2nd Embodiment
f = 0.85 mm, Fno = 1.35, HFOV = 67.5 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −5.6885 (ASP) | 0.550 | Plastic | 1.570 | 28.3 | −1.90 |
| 2 | | 1.3794 (ASP) | 0.750 | | | | |
| 3 | Lens 2 | 20.4686 (ASP) | 0.550 | Plastic | 1.553 | 37.4 | −8.79 |
| 4 | | 3.8895 (ASP) | 0.444 | | | | |
| 5 | Ape. Stop | Plano | 0.014 | | | | |
| 6 | Lens 3 | 6.5062 (ASP) | 0.845 | Glass | 1.705 | 28.3 | 1.50 |
| 7 | | −1.2000 (ASP) | 0.053 | | | | |
| 8 | Stop | Plano | −0.013 | | | | |
| 9 | Lens 4 | 7.8699 (ASP) | 0.488 | Plastic | 1.526 | 55.9 | −24.28 |
| 10 | | 4.7648 (ASP) | 0.637 | | | | |
| 11 | Lens 5 | 9.8806 (ASP) | 0.571 | Plastic | 1.634 | 20.4 | 2.58 |
| 12 | | −1.9148 (ASP) | 0.320 | | | | |
| 13 | Filter | Plano | 0.210 | Glass | 1.508 | 64.2 | — |
| 14 | | Plano | 0.491 | | | | |
| 15 | Inner-Side Conjugate Surface | Plano | — | | | | |

Reference wavelength is 940.0 nm (infrared light).
An effective radius of the stop S1 (Surface 8) is 0.885 mm.

TABLE 2B

Aspheric Coefficients

| Surface # | 1 | 2 | 3 | 4 |
|---|---|---|---|---|
| k= | 1.0713400E+00 | −4.1890400E−01 | 9.9000000E+01 | 1.5135900E+01 |
| A4= | 9.2564843E−02 | −4.2459734E−02 | −1.4410341E−01 | 1.2055351E−01 |
| A6= | −4.7079476E−02 | 1.2399990E−01 | 3.7474745E−01 | 1.2659283E+00 |
| A8= | 1.6438640E−02 | −3.5094938E−01 | −7.6345604E−01 | −7.8984751E+00 |
| A10= | −3.9274950E−03 | 3.4616943E−01 | 1.1743207E+00 | 4.5828777E+01 |
| A12= | 6.4350882E−04 | −1.9416513E−01 | −1.1058499E+00 | −1.5944623E+02 |
| A14= | −6.7995774E−05 | 7.6586854E−02 | 5.6683803E−01 | 3.3328907E+02 |
| A16= | 4.1179148E−06 | −2.2038003E−02 | −1.2415691E−01 | −3.7192796E+02 |
| A18= | −1.0729305E−07 | 3.5391841E−03 | — | 1.6667986E+02 |

| Surface # | 6 | 7 | 9 | 10 |
|---|---|---|---|---|
| k= | 8.7053200E+00 | 3.0764200E−01 | 2.8583200E+01 | −8.0856600E+00 |
| A4= | −5.0568261E−02 | 1.1090598E−01 | −6.2110811E−02 | −3.2643711E−01 |
| A6= | 1.0283856E−01 | 2.6596424E−01 | 8.4700147E−01 | 8.7515175E−01 |
| A8= | −3.3365066E−01 | −8.4771644E−01 | −2.5363824E+00 | −2.7031294E+00 |
| A10= | 9.8330503E−01 | 1.4280312E+00 | 5.4406477E+00 | 7.8089564E+00 |
| A12= | −1.1497503E+00 | −1.1579728E+00 | −8.1566047E+00 | −1.5236204E+01 |
| A14= | 4.7909776E−01 | 4.0877402E−01 | 8.0315540E+00 | 1.8277893E+01 |
| A16= | 4.1835053E−02 | 3.4756483E−02 | −4.5946796E+00 | −1.2368572E+01 |
| A18= | — | — | 1.1438384E+00 | 3.9195119E+00 |
| A20= | — | — | — | −2.9065839E−01 |

| Surface # | 11 | 12 |
|---|---|---|
| k= | 6.9900200E+01 | −5.0364300E+00 |
| A4= | −3.7480356E−01 | −1.2786503E−01 |
| A6= | 1.0349676E+00 | 2.9387802E−01 |
| A8= | −9.7441761E+00 | −1.6861324E+00 |
| A10= | 5.0084968E+01 | 5.6588515E+00 |
| A12= | −1.5543239E+02 | −1.1448692E+01 |
| A14= | 2.9339685E+02 | 1.4024219E+01 |
| A16= | −3.3064324E+02 | −1.0222621E+01 |
| A18= | 2.0373496E+02 | 4.0733034E+00 |
| A20= | −5.2486749E+01 | −6.7618882E−01 |

In the 2nd embodiment, the equation of the aspheric surface profiles of the aforementioned lens elements is the same as the equation of the 1st embodiment. Also, the definitions of these parameters shown in Table 2C are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Schematic Parameters

| | | | |
|---|---|---|---|
| f [mm] | 0.85 | \|f/f1\|/(\|f/f2\| + \|f/f4\|) | 3.41 |
| Fno | 1.35 | f/R1 | −0.15 |
| HFOV [deg.] | 67.5 | \|f/R10\| | 0.44 |
| f/f1 | −0.45 | f12/f45 | −0.49 |
| f/f2 | −0.10 | N4 | 1.526 |
| f/f3 | 0.56 | V3 + V5 | 48.7 |
| f/f4 | −0.04 | V4/V5 | 2.74 |
| f/f5 | 0.33 | CT1/CT2 | 1.00 |
| TL/f | 6.95 | CT2/CT3 | 0.65 |
| TL/YI | 3.94 | ET1/CT1 | 1.75 |
| SL/TL | 0.61 | ΣAT/CT2 | 3.43 |
| EPD/BL | 0.62 | (T12 + CT3)/f | 1.88 |
| (R3 + R6)/(R3 − R6) | 0.89 | Y11/Ystop | 3.60 |
| (R8 + R9)/(R8 − R9) | −2.86 | Yc11/Y11 | 0.40 |
| R5/R6 | −5.42 | max(AT)/min(AT) | 18.75 |
| R7/R8 | 1.65 | max(CT)/min(CT) | 1.73 |

3rd Embodiment

Figure 5:
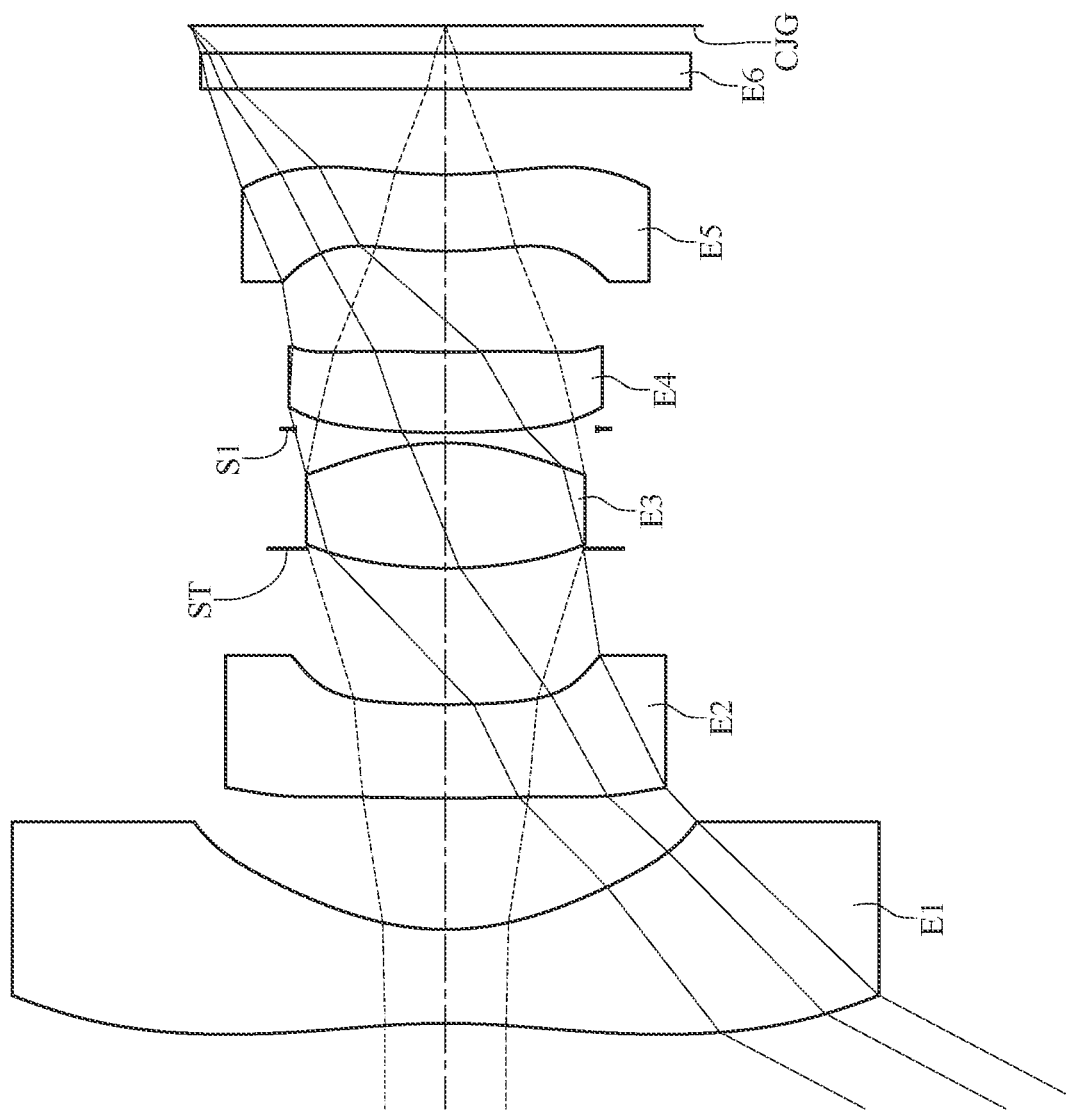
FIG. 5 is a schematic view of an optical device according to the 3rd embodiment of the present disclosure.
Figure 6:
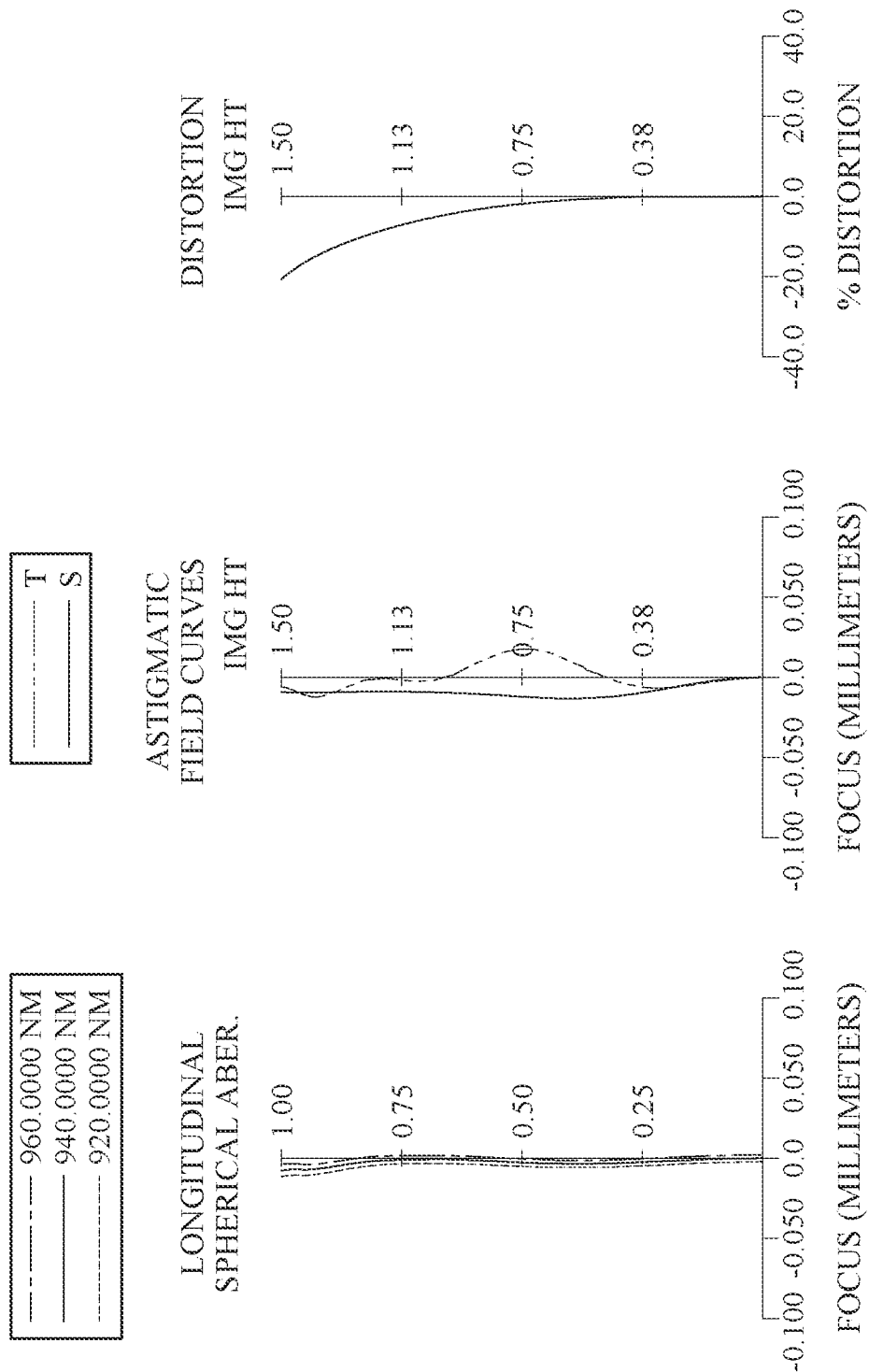
FIG. 6 shows spherical aberration curves, astigmatic field curves and a distortion curve of the optical device according to the 3rd embodiment.

FIG. 5 is a schematic view of an optical device according to the 3rd embodiment of the present disclosure. FIG. 6 shows, in order from left to right, spherical aberration curves, astigmatic field curves and a distortion curve of the optical device according to the 3rd embodiment. The optical device 3 in FIG. 5 can be used as an image capturing unit, a receiving unit or a projecting unit. In FIG. 5, the optical device 3 includes the image lens assembly (its reference numeral is omitted) of the present disclosure. The image lens assembly includes, in order from an outer side to an inner side along an optical axis, a first lens element E1, a second lens element E2, an aperture stop ST, a third lens element E3, a stop S1, a fourth lens element E4, a fifth lens element E5, a filter E6 and an inner-side conjugate surface CJG. The image lens disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The outer-side surface of the first lens element E1 has one critical point in an off-axis region thereof.

The second lens element E2 with negative refractive power has an outer-side surface being convex in a paraxial region thereof and an inner-side surface being concave in a paraxial region thereof. The second lens element E2 is made of plastic material and has the outer-side surface and the inner-side surface being both aspheric. The outer-side surface of the second lens element E2 has three inflection points. The inner-side surface of the second lens element E2 has one inflection point. The outer-side surface of the second lens element E2 has two critical points in an off-axis region thereof.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric. The inner-side surface of the third lens element E3 has one inflection point.

The fourth lens element E4 with positive refractive power has an outer-side surface being convex in a paraxial region thereof and an inner-side surface being concave in a paraxial region thereof. The fourth lens element E4 is made of plastic material and has the outer-side surface and the inner-side surface being both aspheric. The inner-side surface of the fourth lens element E4 has two inflection points. The inner-side surface of the fourth lens element E4 has two critical points in an off-axis region thereof.

The fifth lens element E5 with positive refractive power has an outer-side surface being convex in a paraxial region thereof and an inner-side surface being concave in a paraxial region thereof. The fifth lens element E5 is made of plastic material and has the outer-side surface and the inner-side surface being both aspheric. The outer-side surface of the fifth lens element E5 has two inflection points. The inner-side surface of the fifth lens element E5 has one inflection point. The outer-side surface of the fifth lens element E5 has one critical point in an off-axis region thereof. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 3rd embodiment are shown in Table 3A and the aspheric surface data are shown in Table 3B below.

TABLE 3A

3rd Embodiment
f = 1.00 mm, Fno = 1.41, HFOV = 62.2 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −4.4431 (ASP) | 0.550 | Plastic | 1.536 | 56.1 | −2.17 |
| 2 | | 1.6426 (ASP) | 0.769 | | | | |
| 3 | Lens 2 | 9.0914 (ASP) | 0.550 | Plastic | 1.634 | 20.4 | −33.33 |
| 4 | | 6.2078 (ASP) | 0.913 | | | | |
| 5 | Ape. Stop | Plano | −0.115 | | | | |
| 6 | Lens 3 | 2.7331 (ASP) | 0.734 | Plastic | 1.616 | 23.5 | 1.66 |
| 7 | | −1.4712 (ASP) | 0.081 | | | | |

TABLE 3A-continued

3rd Embodiment
f = 1.00 mm, Fno = 1.41, HFOV = 62.2 deg.

| Surface # | | Curvature Radius | Thickness | Material | Index | Abbe # | Focal Length |
|---|---|---|---|---|---|---|---|
| 8 | Stop | Plano | −0.021 | | | | |
| 9 | Lens 4 | 4.7281 (ASP) | 0.473 | Plastic | 1.535 | 56.0 | 21.02 |
| 10 | | 7.8706 (ASP) | 0.590 | | | | |
| 11 | Lens 5 | 2.1649 (ASP) | 0.450 | Plastic | 1.634 | 20.4 | 11.59 |
| 12 | | 2.8211 (ASP) | 0.500 | | | | |
| 13 | Filter | Plano | 0.210 | Glass | 1.508 | 64.2 | — |
| 14 | | Plano | 0.162 | | | | |
| 15 | Inner-Side Conjugate Surface | Plano | — | | | | |

Note:
Reference wavelength is 940.0 nm (infrared light).
An effective radius of the stop S1 (Surface 8) is 0.885 mm.

TABLE 3B

Aspheric Coefficients

| Surface # | 1 | 2 | 3 | 4 |
|---|---|---|---|---|
| k= | 0.0000000E+00 | −2.2412400E−01 | 1.3478500E−01 | 5.2827000E−02 |
| A4= | 8.3593539E−02 | −5.2674891E−02 | −1.4887011E−01 | −1.6315940E−02 |
| A6= | −4.0517384E−02 | 4.4839812E−02 | 1.5024695E−01 | 1.3588904E+00 |
| A8= | 1.6444336E−02 | −1.3656893E−01 | −3.4500481E−02 | −6.6727521E+00 |
| A10= | −4.7296987E−03 | 1.6298222E−01 | 1.0037386E−03 | 2.4693608E+01 |
| A12= | 9.1729307E−04 | −1.0407518E−01 | −1.1882071E−02 | −5.5622492E+01 |
| A14= | −1.1247694E−04 | 3.7141405E−02 | 9.6405471E−03 | 7.5720463E+01 |
| A16= | 7.8112745E−06 | −6.2741394E−03 | −2.4963043E−03 | −5.6002019E+01 |
| A18= | −2.3370966E−07 | 3.0459573E−04 | — | 1.6873569E+01 |

| Surface # | 6 | 7 | 9 | 10 |
|---|---|---|---|---|
| k= | 5.7151400E+00 | 3.1929800E−01 | −2.9103600E−02 | −1.4221800E−01 |
| A4= | −2.9149103E−02 | 8.9574316E−02 | −1.0746384E−01 | −3.3081376E−01 |
| A6= | 2.5363593E−02 | 2.6446136E−01 | 8.1805327E−01 | 9.4991947E−01 |
| A8= | −4.3558977E−02 | −7.2967920E−01 | −2.7609898E+00 | −4.8622589E+00 |
| A10= | −4.3906125E−02 | 1.2323895E+00 | 7.1578846E+00 | 2.2868639E+01 |
| A12= | 5.2355767E−01 | −9.0832830E−01 | −1.2026588E+01 | −6.6916108E+01 |
| A14= | −8.7591359E−01 | 1.0706813E−01 | 1.2437240E+01 | 1.2097708E+02 |
| A16= | 4.4913588E−01 | 1.6782099E−01 | −7.1870638E+00 | −1.3121343E+02 |
| A18= | — | — | 1.7757856E+00 | 7.8214316E+01 |
| A20= | — | — | — | −1.9643709E+01 |

| Surface # | 11 | 12 |
|---|---|---|
| k= | 2.8899600E−03 | 1.5402600E−03 |
| A4= | −4.3173241E−01 | −9.5750029E−02 |
| A6= | 2.2960090E−01 | −3.9396592E−01 |
| A8= | −3.0898240E+00 | 7.0300288E−01 |
| A10= | 1.3533372E+01 | −7.5529046E−01 |
| A12= | −3.5289065E+01 | 5.2421176E−01 |
| A14= | 5.5848332E+01 | −1.4247759E−01 |
| A16= | −5.1232142E+01 | −7.1187014E−02 |
| A18= | 2.4804689E+01 | 5.9144979E−02 |
| A20= | −4.8338835E+00 | −1.1236891E−02 |

In the 3rd embodiment, the equation of the aspheric surface profiles of the aforementioned lens elements is the same as the equation of the 1st embodiment. Also, the definitions of these parameters shown in Table 3C are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Schematic Parameters

| f [mm] | 1.00 | $|f/f1|/(|f/f2|+|f/f4|)$ | 5.95 |
|---|---|---|---|
| Fno | 1.41 | f/R1 | −0.23 |
| HFOV [deg.] | 62.2 | $|f/R10|$ | 0.35 |
| f/f1 | −0.46 | f12/f45 | −0.25 |
| f/f2 | −0.03 | N4 | 1.535 |
| f/f3 | 0.60 | V3 + V5 | 43.9 |
| f/f4 | 0.05 | V4/V5 | 2.74 |
| f/f5 | 0.09 | CT1/CT2 | 1.00 |

TABLE 3C-continued

Schematic Parameters

| | | | |
|---|---|---|---|
| TL/f | 5.85 | CT2/CT3 | 0.75 |
| TL/YI | 3.90 | ET1/CT1 | 1.85 |
| SL/TL | 0.52 | ΣAT/CT2 | 4.03 |
| EPD/BL | 0.81 | (T12 + CT3)/f | 1.50 |
| (R3 + R6)/(R3 − R6) | 0.72 | Y11/Ystop | 3.14 |
| (R8 + R9)/(R8 − R9) | 1.76 | Yc11/Y11 | 0.50 |
| R5/R6 | −1.86 | max(AT)/min(AT) | 13.30 |
| R7/R8 | 0.60 | max(CT)/min(CT) | 1.63 |

4th Embodiment

Figure 7:
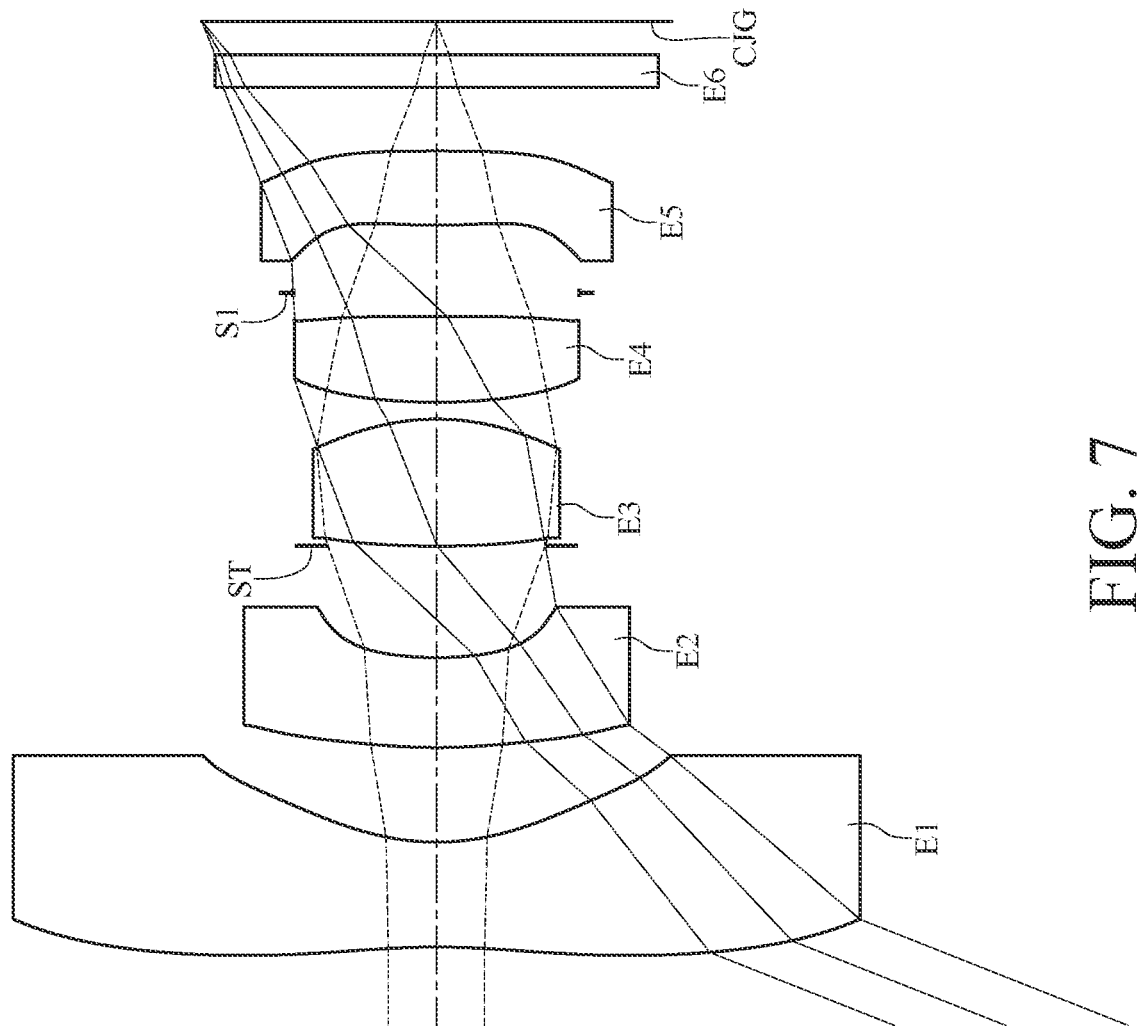
FIG. 7 is a schematic view of an optical device according to the 4th embodiment of the present disclosure.
Figure 8:
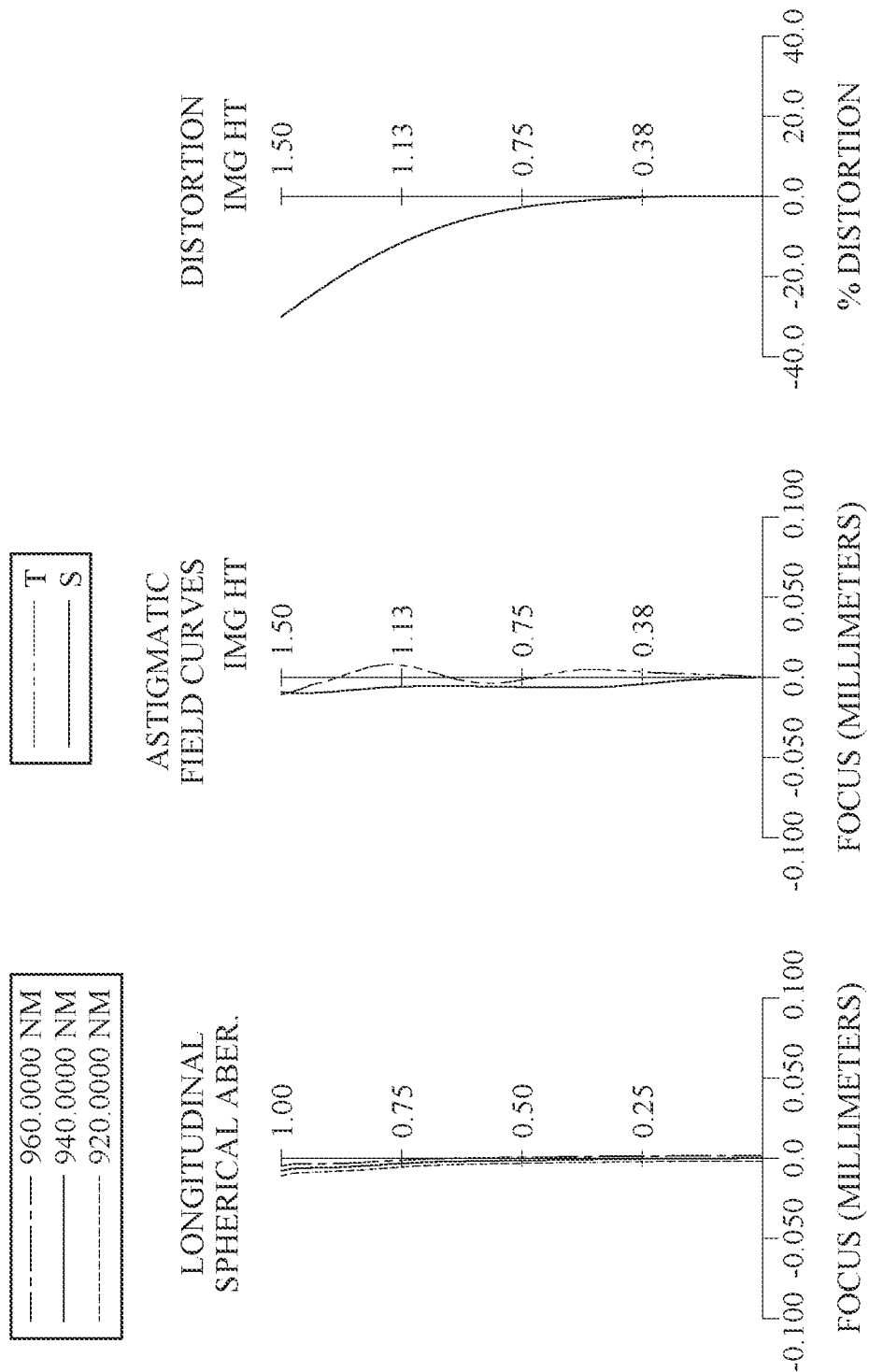
FIG. 8 shows spherical aberration curves, astigmatic field curves and a distortion curve of the optical device according to the 4th embodiment.

FIG. 7 is a schematic view of an optical device according to the 4th embodiment of the present disclosure. FIG. 8 shows, in order from left to right, spherical aberration curves, astigmatic field curves and a distortion curve of the optical device according to the 4th embodiment. The optical device 4 in FIG. 7 can be used as an image capturing unit, a receiving unit or a projecting unit. In FIG. 7, the optical device 4 includes the image lens assembly (its reference numeral is omitted) of the present disclosure. The image lens assembly includes, in order from an outer side to an inner side along an optical axis, a first lens element E1, a second lens element E2, an aperture stop ST, a third lens element E3, a fourth lens element E4, a stop S1, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The outer-side surface of the first lens element E1 has one critical point in an off-axis region thereof.

The second lens element E2 with negative refractive power has an outer-side surface being convex in a paraxial region thereof and an inner-side surface being concave in a paraxial region thereof. The second lens element E2 is made of plastic material and has the outer-side surface and the inner-side surface being both aspheric. The outer-side surface of the second lens element E2 has one inflection point.

The third lens element E3 with positive refractive power has an outer-side surface being convex in a paraxial region thereof and an inner-side surface being convex in a paraxial region thereof. The third lens element E3 is made of glass material and has the outer-side surface and the inner-side surface being both aspheric. The inner-side surface of the third lens element E3 has one inflection point.

The fourth lens element E4 with positive refractive power has an outer-side surface being convex in a paraxial region thereof and an inner-side surface being concave in a paraxial region thereof. The fourth lens element E4 is made of plastic material and has the outer-side surface and the inner-side surface being both aspheric. The inner-side surface of the fourth lens element E4 has two inflection points. The inner-side surface of the fourth lens element E4 has two critical points in an off-axis region thereof.

The fifth lens element E5 with positive refractive power has an outer-side surface being convex in a paraxial region thereof and an inner-side surface being convex in a paraxial region thereof.

The fifth lens element E5 is made of plastic material and has the outer-side surface and the inner-side surface being both aspheric. The outer-side surface of the fifth lens element E5 has two inflection points. The inner-side surface of the fifth lens element E5 has one inflection point. The outer-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 4th embodiment are shown in Table 4A and the aspheric surface data are shown in Table 4B below.

TABLE 4A

4th Embodiment
f = 0.85 mm, Fno = 1.38, HFOV = 68.4 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −4.8730 (ASP) | 0.671 | Plastic | 1.625 | 21.8 | −1.80 |
| 2 | | 1.5408 (ASP) | 0.604 | | | | |
| 3 | Lens 2 | 3.5120 (ASP) | 0.576 | Plastic | 1.616 | 23.5 | −13.68 |
| 4 | | 2.3242 (ASP) | 0.717 | | | | |
| 5 | Ape. Stop | Plano | −0.005 | | | | |
| 6 | Lens 3 | 5.6408 (ASP) | 0.812 | Glass | 1.778 | 25.5 | 1.62 |
| 7 | | −1.5138 (ASP) | 0.108 | | | | |
| 8 | Lens 4 | 4.0549 (ASP) | 0.547 | Plastic | 1.535 | 56.0 | 8.95 |
| 9 | | 25.2033 (ASP) | 0.152 | | | | |
| 10 | Stop | Plano | 0.433 | | | | |
| 11 | Lens 5 | 3.8500 (ASP) | 0.474 | Plastic | 1.634 | 20.4 | 5.00 |
| 12 | | −17.0827 (ASP) | 0.407 | | | | |
| 13 | Filter | Plano | 0.210 | Glass | 1.508 | 64.2 | — |
| 14 | | Plano | 0.212 | | | | |
| 15 | Inner-Side Conjugate Surface | Plano | — | | | | |

Note:
Reference wavelength is 940.0 nm (infrared light).
An effective radius of the stop S1 (Surface 10) is 0.915 mm.

TABLE 4B

Aspheric Coefficients

| Surface # | 1 | 2 | 3 | 4 |
|---|---|---|---|---|
| k= | 7.0125800E−01 | −5.8727100E−01 | −5.3150400E+00 | 5.0128800E+00 |
| A4= | 8.0462198E−02 | −9.0895569E−02 | −1.2506982E−01 | 9.8943344E−02 |
| A6= | −3.4981748E−02 | 1.5641152E−01 | 1.5396995E−01 | 1.2428700E+00 |
| A8= | 1.1240813E−02 | −3.3329938E−01 | −1.3168908E−01 | −8.5973680E+00 |
| A10= | −2.4728849E−03 | 3.3636873E−01 | 1.2650537E−01 | 5.1134175E+01 |
| A12= | 3.6618114E−04 | −1.8463639E−01 | −8.4624845E−02 | −1.7505022E+02 |
| A14= | −3.4483973E−05 | 5.6119430E−02 | 3.1855943E−02 | 3.4796953E+02 |
| A16= | 1.8515861E−06 | −8.1917525E−03 | −6.2115352E−03 | −3.5854840E+02 |
| A18= | −4.2897225E−08 | 3.4888064E−04 | — | 1.4515084E+02 |

| Surface # | 6 | 7 | 8 | 9 |
|---|---|---|---|---|
| k= | 1.5248500E+01 | 7.3233500E−01 | −9.4696800E−01 | −9.9000000E+01 |
| A4= | −1.4777210E−02 | 1.0849443E−01 | 7.3648029E−02 | −1.5300565E−01 |
| A6= | 5.7288379E−02 | −1.2040176E−01 | −1.1901167E−01 | 3.2514727E−02 |
| A8= | −1.2513447E−01 | 5.2767597E−01 | 5.4740540E−01 | 1.2305127E+00 |
| A10= | 5.3630128E−01 | −1.3444916E+00 | −1.6167451E+00 | −7.4922365E+00 |
| A12= | −9.3511960E−01 | 2.3532243E+00 | 3.0785272E+00 | 2.4928993E+01 |
| A14= | 9.3795395E−01 | −2.1942397E+00 | −3.5062451E+00 | −4.9891599E+01 |
| A16= | −3.6175782E−01 | 9.1616101E−01 | 2.2087415E+00 | 5.9611797E+01 |
| A18= | — | — | −5.6687536E−01 | −3.9190036E+01 |
| A20= | — | — | — | 1.0969169E+01 |

| Surface # | 11 | 12 |
|---|---|---|
| k= | −7.1513200E+00 | −6.4497000E+01 |
| A4= | −3.7684473E−01 | −6.4858351E−02 |
| A6= | 2.9205745E−01 | −3.3002353E−01 |
| A8= | −3.3030592E+00 | 9.7679986E−01 |
| A10= | 1.4159220E+01 | −2.1463200E+00 |
| A12= | −3.8046529E+01 | 3.1929980E+00 |
| A14= | 6.3015073E+01 | −3.0139552E+00 |
| A16= | −6.1972794E+01 | 1.7667599E+00 |
| A18= | 3.3373374E+01 | −5.9127411E−01 |
| A20= | −7.5543905E+00 | 8.6781854E−02 |

In the 4th embodiment, the equation of the aspheric surface profiles of the aforementioned lens elements is the same as the equation of the 1st embodiment. Also, the definitions of these parameters shown in Table 4C are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Schematic Parameters

| | | | |
|---|---|---|---|
| f [mm] | 0.85 | \|f/f1\|/(\|f/f2\| + \|f/f4\|) | 3.01 |
| Fno | 1.38 | f/R1 | −0.17 |
| HFOV [deg.] | 68.4 | \|f/R10\| | 0.05 |
| f/f1 | −0.47 | f12/f45 | −0.41 |
| f/f2 | −0.06 | N4 | 1.535 |
| f/f3 | 0.53 | V3 + V5 | 45.9 |
| f/f4 | 0.09 | V4/V5 | 2.74 |
| f/f5 | 0.17 | CT1/CT2 | 1.16 |
| TL/f | 6.96 | CT2/CT3 | 0.71 |
| TL/YI | 3.95 | ET1/CT1 | 1.56 |
| SL/TL | 0.57 | ΣAT/CT2 | 3.49 |
| EPD/BL | 0.74 | (T12 + CT3)/f | 1.67 |
| (R3 + R6)/(R3 − R6) | 0.40 | Y11/Ystop | 3.89 |
| (R8 + R9)/(R8 − R9) | 1.36 | Yc11/Y11 | 0.45 |
| R5/R6 | −3.73 | max(AT)/min(AT) | 6.59 |
| R7/R8 | 0.16 | max(CT)/min(CT) | 1.71 |

5th Embodiment

Figure 9:
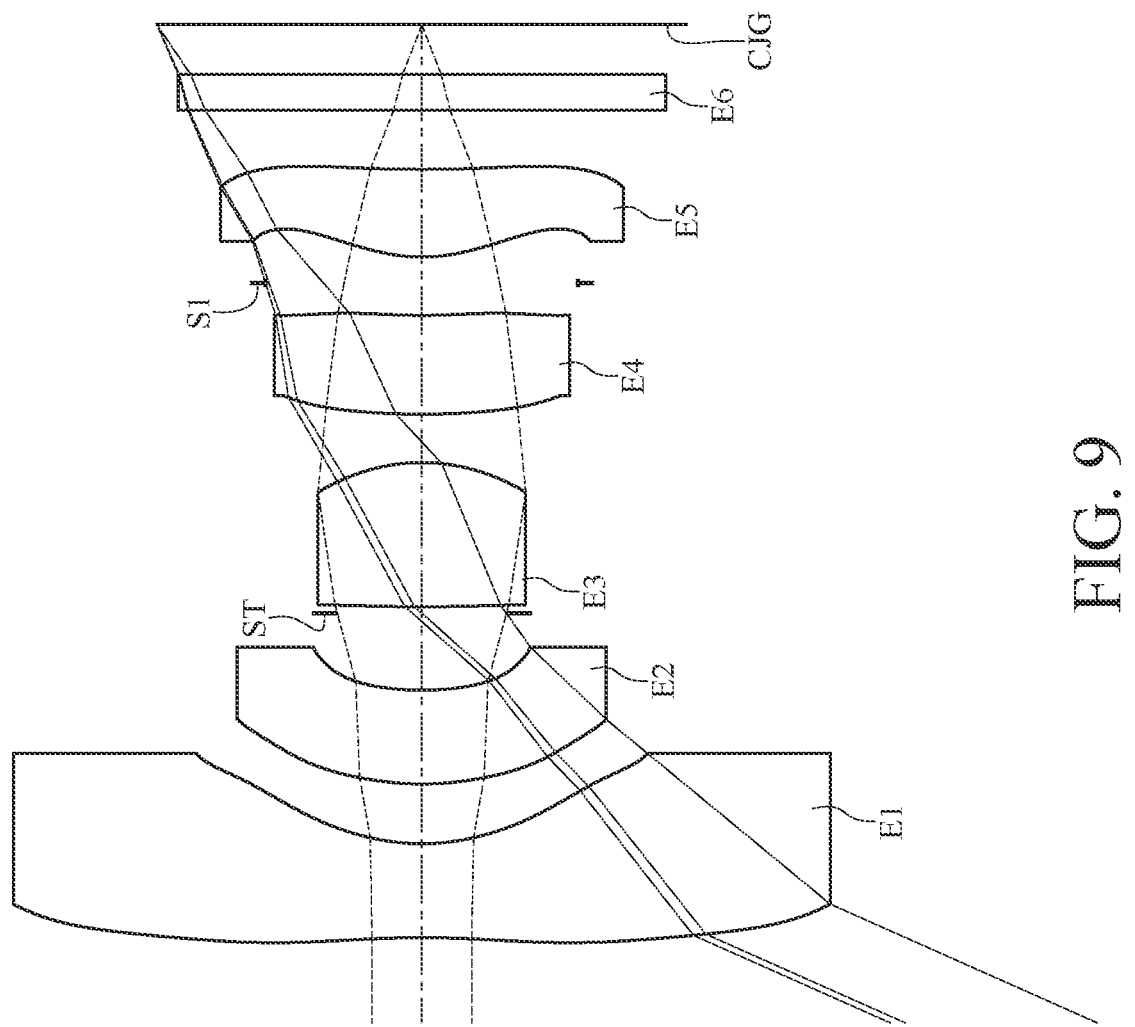
FIG. 9 is a schematic view of an optical device according to the 5th embodiment of the present disclosure.
Figure 10:
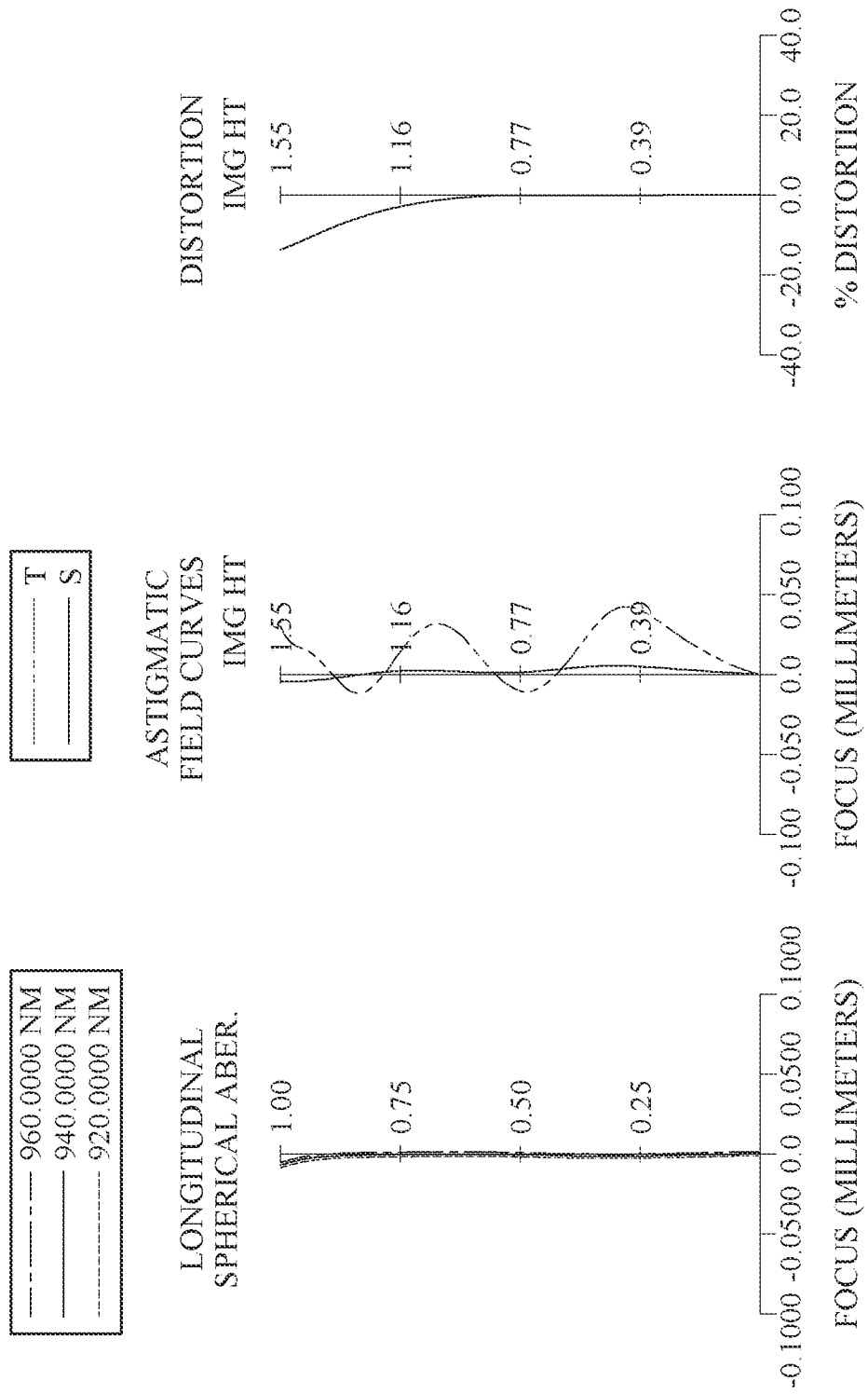
FIG. 10 shows spherical aberration curves, astigmatic field curves and a distortion curve of the optical device according to the 5th embodiment.

FIG. 9 is a schematic view of an optical device according to the 5th embodiment of the present disclosure. FIG. 10 shows, in order from left to right, spherical aberration curves, astigmatic field curves and a distortion curve of the optical device according to the 5th embodiment. The optical device 5 in FIG. 9 can be used as an image capturing unit, a receiving unit or a projecting unit. In FIG. 9, the optical device 5 includes the image lens assembly (its reference numeral is omitted) of the present disclosure. The image lens assembly includes, in order from an outer side to an inner side along an optical axis, a first lens element E1, a second lens element E2, an aperture stop ST, a third lens element E3, a fourth lens element E4, a stop S1, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The inner-side surface of the first lens element E1 has two inflection points. The outer-side surface of the first lens element E1 has one critical point in an off-axis region thereof.

The second lens element E2 with positive refractive power has an outer-side surface being convex in a paraxial region thereof and an inner-side surface being concave in a paraxial region thereof. The second lens element E2 is made of plastic material and has the outer-side surface and the inner-side surface being both aspheric. The outer-side surface of the second lens element E2 has one inflection point.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric.

The fourth lens element E4 with negative refractive power has an outer-side surface being convex in a paraxial region thereof and an inner-side surface being concave in a paraxial region thereof. The fourth lens element E4 is made of glass material and has the outer-side surface and the inner-side surface being both aspheric. The inner-side surface of the fourth lens element E4 has two inflection points. The inner-side surface of the fourth lens element E4 has two critical points in an off-axis region thereof.

The fifth lens element E5 with positive refractive power has an outer-side surface being convex in a paraxial region thereof and an inner-side surface being concave in a paraxial region thereof. The fifth lens element E5 is made of plastic material and has the outer-side surface and the inner-side surface being both aspheric. The outer-side surface of the fifth lens element E5 has one inflection point. The inner-side surface of the fifth lens element E5 has one inflection point. The outer-side surface of the fifth lens element E5 has one critical point in an off-axis region thereof. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 5th embodiment are shown in Table 5A and the aspheric surface data are shown in Table 5B below.

TABLE 5A

5th Embodiment
f = 0.80 mm, Fno = 1.37, HFOV = 66.0 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −5.1168 (ASP) | 0.550 | Plastic | 1.616 | 23.5 | −1.56 |
| 2 | | 1.2300 (ASP) | 0.350 | | | | |
| 3 | Lens 2 | 1.6019 (ASP) | 0.550 | Plastic | 1.553 | 37.4 | 13.79 |
| 4 | | 1.7802 (ASP) | 0.450 | | | | |
| 5 | Ape. Stop | Plano | 0.039 | | | | |
| 6 | Lens 3 | 11.0447 (ASP) | 0.845 | Plastic | 1.570 | 28.3 | 1.80 |
| 7 | | −1.0964 (ASP) | 0.283 | | | | |
| 8 | Lens 4 | 4.0184 (ASP) | 0.579 | Glass | 1.571 | 60.6 | −21.05 |
| 9 | | 2.8536 (ASP) | 0.190 | | | | |
| 10 | Stop | Plano | 0.152 | | | | |
| 11 | Lens 5 | 0.9821 (ASP) | 0.514 | Plastic | 1.634 | 20.3 | 1.68 |
| 12 | | 9.8039 (ASP) | 0.345 | | | | |
| 13 | Filter | Plano | 0.210 | Glass | 1.508 | 64.2 | — |
| 14 | | Plano | 0.294 | | | | |
| 15 | Inner-Side Conjugate Surface | Plano | — | | | | |

Note:
Reference wavelength is 940.0 nm (infrared light).
An effective radius of the stop S1 (Surface 10) is 0.915 mm.

TABLE 5B

Aspheric Coefficients

| Surface # | 1 | 2 | 3 | 4 |
|---|---|---|---|---|
| k= | 3.8158200E−01 | −5.3533300E−01 | −9.4182100E−01 | 2.5577000E+00 |
| A4= | 1.0819607E−01 | −2.7959294E−01 | −4.4975078E−01 | 3.1189633E−01 |
| A6= | −4.8615831E−02 | 7.8259310E−01 | 2.0307793E+00 | −1.4022562E+00 |
| A8= | 1.3139241E−02 | −1.4440482E+00 | −5.2973870E+00 | 1.2317367E+01 |
| A10= | −2.3356971E−03 | 1.8596919E+00 | 9.8739540E+00 | 4.6462389E+01 |
| A12= | 2.9766482E−04 | −1.8666311E+00 | −1.1313503E+01 | −7.7564252E+02 |
| A14= | −2.5579122E−05 | 1.2362531E+00 | 6.7488126E+00 | 3.5316767E+03 |
| A16= | 1.2239920E−06 | −4.5003984E−01 | −1.5895904E+00 | −7.2605636E+03 |
| A18= | −2.0302049E−08 | 6.7763059E−02 | — | 5.7730511E+03 |

| Surface # | 6 | 7 | 8 | 9 |
|---|---|---|---|---|
| k= | −7.9284000E+01 | 2.2968900E−01 | 1.4929000E−01 | −9.1708500E+01 |
| A4= | 6.0163347E−02 | 5.4318864E−02 | −1.5803199E−01 | −4.4318744E−01 |

TABLE 5B-continued

| Aspheric Coefficients | | | | |
|---|---|---|---|---|
| A6= | −1.7902742E+00 | 3.5044575E−01 | 1.1820663E+00 | 8.1129181E−01 |
| A8= | 1.7205007E+01 | −8.9401357E−01 | −3.7551276E+00 | 3.1020376E−03 |
| A10= | −9.4811418E+01 | 2.6242647E−02 | 8.2010300E+00 | −6.7052467E+00 |
| A12= | 3.0497203E+02 | 4.7713721E+00 | −1.1708575E+01 | 2.6825221E+01 |
| A14= | −5.1566547E+02 | −8.4837517E+00 | 1.0552312E+01 | −5.4934552E+01 |
| A16= | 3.6252474E+02 | 5.1949341E+00 | −5.4035635E+00 | 6.4569778E+01 |
| A18= | — | — | 1.2006126E+00 | −4.1325657E+01 |
| A20= | — | — | — | 1.1245109E+01 |

| Surface # | 11 | 12 |
|---|---|---|
| k= | −4.5415600E−01 | 2.8407600E+01 |
| A4= | −5.6676857E−01 | 1.4963293E−01 |
| A6= | 6.9105995E−01 | −1.1186148E+00 |
| A8= | −3.4435813E+00 | 3.8034360E+00 |
| A10= | 1.3476696E+01 | −8.8289886E+00 |
| A12= | −3.5293920E+01 | 1.3062776E+01 |
| A14= | 5.6897877E+01 | −1.2063674E+01 |
| A16= | −5.4563822E+01 | 6.7395032E+00 |
| A18= | 2.8693354E+01 | −2.0916978E+00 |
| A20= | −6.4236840E+00 | 2.7744539E−01 |

In the 5th embodiment, the equation of the aspheric surface profiles of the aforementioned lens elements is the same as the equation of the 1st embodiment. Also, the definitions of these parameters shown in Table 5C are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Schematic Parameters | | | |
|---|---|---|---|
| f [mm] | 0.80 | $|f/f1|/(|f/f2| + |f/f4|)$ | 5.35 |
| Fno | 1.37 | f/R1 | −0.16 |
| HFOV [deg.] | 66.0 | $|f/R10|$ | 0.08 |
| f/f1 | −0.51 | f12/f45 | −0.84 |
| f/f2 | 0.06 | N4 | 1.571 |
| f/f3 | 0.45 | V3 + V5 | 48.6 |
| f/f4 | −0.04 | V4/V5 | 2.98 |
| f/f5 | 0.48 | CT1/CT2 | 1.00 |
| TL/f | 6.69 | CT2/CT3 | 0.65 |
| TL/YI | 3.45 | ET1/CT1 | 1.61 |
| SL/TL | 0.64 | ΣAT/CT2 | 2.66 |
| EPD/BL | 0.69 | (T12 + CT3)/f | 1.49 |
| (R3 + R6)/(R3 − R6) | 0.19 | Y11/Ystop | 4.83 |
| (R8 + R9)/(R8 − R9) | 2.05 | Yc11/Y11 | 0.36 |
| R5/R6 | −10.07 | max(AT)/min(AT) | 1.73 |
| R7/R8 | 1.41 | max(CT)/min(CT) | 1.64 |

6th Embodiment

Figure 11:
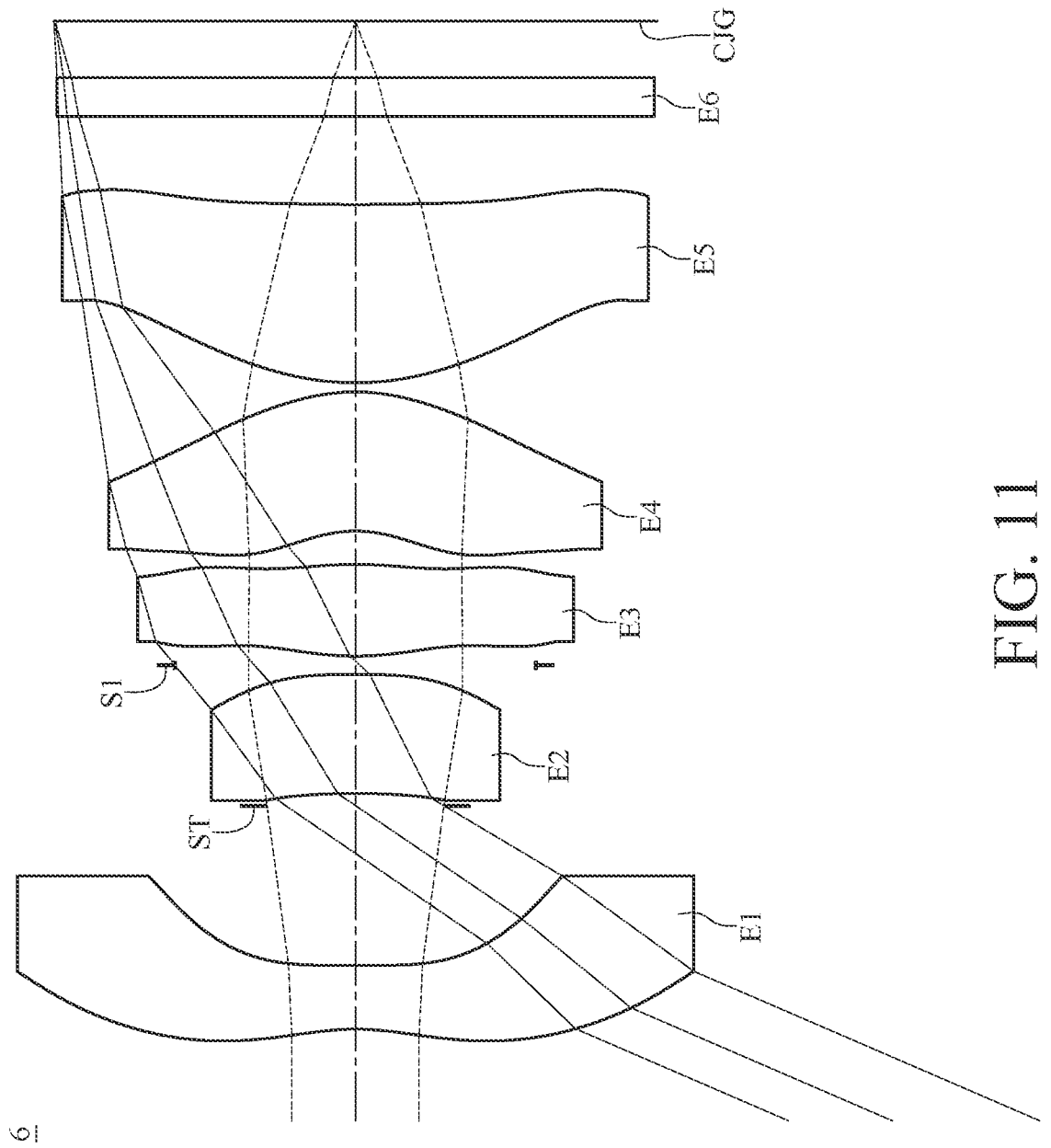
FIG. 11 is a schematic view of an optical device according to the 6th embodiment of the present disclosure.
Figure 12:
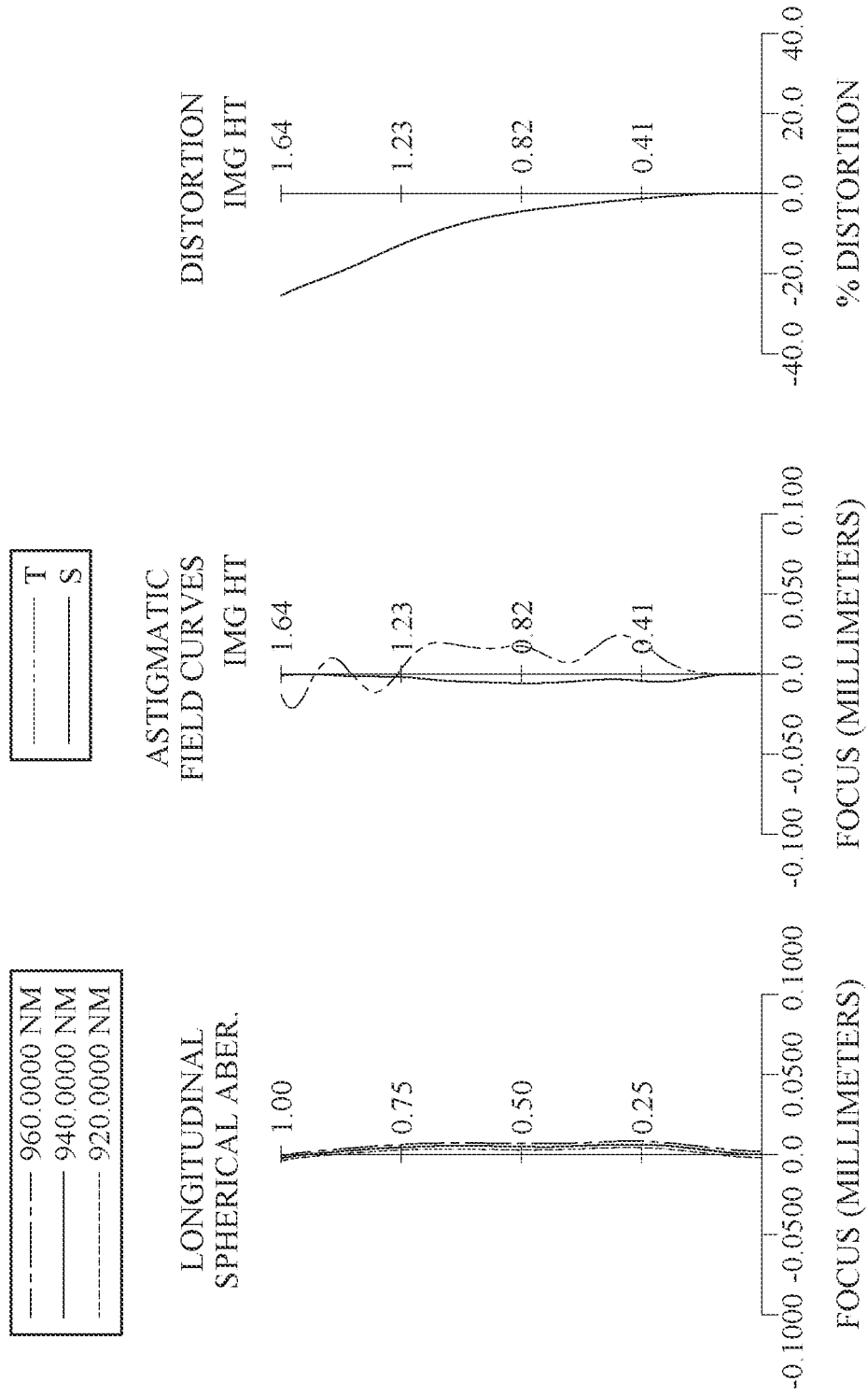
FIG. 12 shows spherical aberration curves, astigmatic field curves and a distortion curve of the optical device according to the 6th embodiment.

FIG. 11 is a schematic view of an optical device according to the 6th embodiment of the present disclosure. FIG. 12 shows, in order from left to right, spherical aberration curves, astigmatic field curves and a distortion curve of the optical device according to the 6th embodiment. The optical device 6 in FIG. 11 can be used as an image capturing unit, a receiving unit or a projecting unit. In FIG. 11, the optical device 6 includes the image lens assembly (its reference numeral is omitted) of the present disclosure. The image lens assembly includes, in order from an outer side to an inner side along an optical axis, a first lens element E1, an aperture stop ST, a second lens element E2, a stop S1, a third lens element E3, a fourth lens element E4, a fifth lens element E5, a filter E6 and an inner-side conjugate surface CJG. The image lens disposed between each of the adjacent five lens elements.

The first lens element E1 with negative refractive power has an outer-side surface being concave in a paraxial region thereof and an inner-side surface being convex in a paraxial region thereof. The first lens element E1 is made of plastic material and has the outer-side surface and the inner-side surface being both aspheric. The outer-side surface of the first lens element E1 has two inflection points. The inner-side surface of the first lens element E1 has two inflection points. The outer-side surface of the first lens element E1 has one critical point in an off-axis region thereof. The inner-side surface of the first lens element E1 has one critical point in an off-axis region thereof.

The second lens element E2 with negative refractive power has an outer-side surface being concave in a paraxial region thereof and an inner-side surface being convex in a paraxial region thereof. The second lens element E2 is made of plastic material and has the outer-side surface and the inner-side surface being both aspheric.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric. The outer-side surface of the third lens element E3 has two inflection points. The inner-side surface of the third lens element E3 has four inflection points. The outer-side surface of the third lens element E3 has two critical points in an off-axis region thereof. The inner-side surface of the third lens element E3 has two critical points in an off-axis region thereof.

The fourth lens element E4 with negative refractive power has an outer-side surface being concave in a paraxial region thereof and an inner-side surface being convex in a paraxial region thereof. The fourth lens element E4 is made of plastic material and has the outer-side surface and the inner-side surface being both aspheric. The outer-side surface of the fourth lens element E4 has four inflection points. The inner-side surface of the fourth lens element E4 has four inflection points. The outer-side surface of the fourth lens element E4 has two critical points in an off-axis region thereof.

The fifth lens element E5 with positive refractive power has an outer-side surface being convex in a paraxial region thereof and an inner-side surface being concave in a paraxial region thereof. The fifth lens element E5 is made of plastic material and has the outer-side surface and the inner-side surface being both aspheric. The outer-side surface of the fifth lens element E5 has one inflection point. The inner-side surface of the fifth lens element E5 has one inflection point. The outer-side surface of the fifth lens element E5 has one critical point in an off-axis region thereof. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 6th embodiment are shown in Table 6A and the aspheric surface data are shown in Table 6B below.

TABLE 6A

6th Embodiment
f = 0.95 mm, Fno = 1.37, HFOV = 66.6 deg.

| Surface # | | Curvature Radius | Thickness | Material | Index | Abbe # | Focal Length |
|---|---|---|---|---|---|---|---|
| 0 | Outer-Side Conjugate Surface | Plano | Infinity | | | | |
| 1 | Lens 1 | −1.3245 (ASP) | 0.350 | Plastic | 1.536 | 56.1 | −2.89 |
| 2 | | −9.9900 (ASP) | 0.871 | | | | |
| 3 | Ape. Stop | Plano | 0.066 | | | | |
| 4 | Lens 2 | −4.5807 (ASP) | 0.650 | Plastic | 1.616 | 23.5 | −25.42 |
| 5 | | −6.8251 (ASP) | 0.050 | | | | |
| 6 | Stop | Plano | 0.050 | | | | |
| 7 | Lens 3 | 1.5396 (ASP) | 0.501 | Plastic | 1.616 | 23.5 | 1.52 |
| 8 | | −2.0899 (ASP) | 0.182 | | | | |
| 9 | Lens 4 | −0.6682 (ASP) | 0.760 | Plastic | 1.535 | 56.0 | −16.14 |
| 10 | | −1.0114 (ASP) | 0.050 | | | | |
| 11 | Lens 5 | 1.6158 (ASP) | 0.973 | Plastic | 1.634 | 20.4 | 2.84 |
| 12 | | 12.1206 (ASP) | 0.482 | | | | |
| 13 | Filter | Plano | 0.210 | Glass | 1.508 | 64.2 | — |
| 14 | | Plano | 0.309 | | | | |
| 15 | Inner-Side Conjugate Surface | Plano | — | | | | |

Note:
Reference wavelength is 940.0 nm (infrared light).
An effective radius of the stop S1 (Surface 6) is 0.985 mm.

TABLE 6B

Aspheric Coefficients

| Surface # | 1 | 2 | 4 | 5 |
|---|---|---|---|---|
| k= | −1.6776000E+01 | −9.0000000E+01 | −2.2741900E+00 | 1.0451900E+01 |
| A4= | 3.1073261E−01 | 1.0573376E+00 | −2.2042096E−01 | −8.4699825E−01 |
| A6= | −3.4772009E−01 | −2.3092635E+00 | 1.7208578E+00 | 1.6327696E+00 |
| A8= | 3.0870254E−01 | 5.2768882E+00 | −4.2895790E+01 | −6.9742544E+00 |
| A10= | −2.0118081E−01 | −9.5670755E+00 | 5.3456115E+02 | 3.1091552E+01 |
| A12= | 9.1952392E−02 | 1.2450919E+01 | −3.7788991E+03 | −8.1893865E+01 |
| A14= | −2.8295207E−02 | −1.1089191E+01 | 1.5341892E+04 | 1.2439748E+02 |
| A16= | 5.5478048E−03 | 6.4407681E+00 | −3.3421715E+04 | −1.0252047E+02 |
| A18= | −6.2325648E−04 | −2.2089499E+00 | 3.0310835E+04 | 3.5563585E+01 |
| A20= | 3.0366440E−05 | 3.3773746E−01 | — | — |

| Surface # | 7 | 8 | 9 | 10 |
|---|---|---|---|---|
| k= | 3.0440500E−02 | −7.2986900E+01 | −9.8672300E−01 | −9.3251900E−01 |
| A4= | −6.2161491E−01 | −2.4784333E−01 | 1.3877835E+00 | 5.2642066E−01 |
| A6= | 1.3662133E+00 | 4.5014403E+00 | −1.2764365E+00 | −1.5000423E+00 |
| A8= | −7.4226069E+00 | −1.8313185E+01 | 3.7552723E+00 | 3.9149283E+00 |

TABLE 6B-continued

Aspheric Coefficients

| A10= | 2.1812317E+01 | 4.2183040E+01 | −1.3527703E+01 | −7.6169547E+00 |
|---|---|---|---|---|
| A12= | −3.4855421E+01 | −6.4986551E+01 | 2.6660501E+01 | 1.0357250E+01 |
| A14= | 3.3058273E+01 | 6.8825678E+01 | −3.1361715E+01 | −9.3857290E+00 |
| A16= | −1.8752745E+01 | −4.9348622E+01 | 2.3114528E+01 | 5.4892283E+00 |
| A18= | 5.8991075E+00 | 2.2900865E+01 | −1.0515441E+01 | −1.9835283E+00 |
| A20= | −7.9329025E−01 | −6.2107671E+00 | 2.7074352E+00 | 4.0285286E−01 |
| A22= | — | 7.4670069E−01 | −3.0261116E−01 | −3.5253915E−02 |

| Surface # | 11 | 12 |
|---|---|---|
| k= | −1.8850900E−01 | 2.5931500E+01 |
| A4= | 1.9746938E−01 | −1.1682513E−01 |
| A6= | −1.2439116E+00 | 4.1683277E−01 |
| A8= | 3.4421224E+00 | −7.9982897E−01 |
| A10= | −6.2246570E+00 | 1.2029285E+00 |
| A12= | 7.6068181E+00 | −1.3679212E+00 |
| A14= | −6.3662948E+00 | 1.1036427E+00 |
| A16= | 3.6349808E+00 | −6.1906428E−01 |
| A18= | −1.3864988E+00 | 2.3577382E−01 |
| A20= | 3.3619989E−01 | −5.7869753E−02 |
| A22= | −4.6479694E−02 | 8.2072776E−03 |
| A24= | 2.7496044E−03 | −5.0840105E−04 |

In the 6th embodiment, the equation of the aspheric surface profiles of the aforementioned lens elements is the same as the equation of the 1st embodiment. Also, the definitions of these parameters shown in Table 6C are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

Schematic Parameters

| f [mm] | 0.95 | |f/f1|/(|f/f2| + |f/f4|) | 3.42 |
|---|---|---|---|
| Fno | 1.37 | f/R1 | −0.72 |
| HFOV [deg.] | 66.6 | |f/R10| | 0.08 |
| f/f1 | −0.33 | f12/f45 | −1.10 |
| f/f2 | −0.04 | N4 | 1.535 |
| f/f3 | 0.63 | V3 + V5 | 43.9 |
| f/f4 | −0.06 | V4/V5 | 2.74 |
| f/f5 | 0.34 | CT1/CT2 | 0.54 |
| TL/f | 5.78 | CT2/CT3 | 1.30 |
| TL/YI | 3.36 | ET1/CT1 | 1.48 |
| SL/TL | 0.78 | ΣAT/CT2 | 1.95 |
| EPD/BL | 0.69 | (T12 + CT3)/f | 1.51 |
| (R3 + R6)/(R3 − R6) | 2.68 | Y11/Ystop | 3.82 |
| (R8 + R9)/(R8 − R9) | −0.23 | Yc11/Y11 | 0.39 |
| R5/R6 | −0.74 | max(AT)/min(AT) | 18.74 |
| R7/R8 | 0.66 | max(CT)/min(CT) | 2.78 |

7th Embodiment

Figure 13:
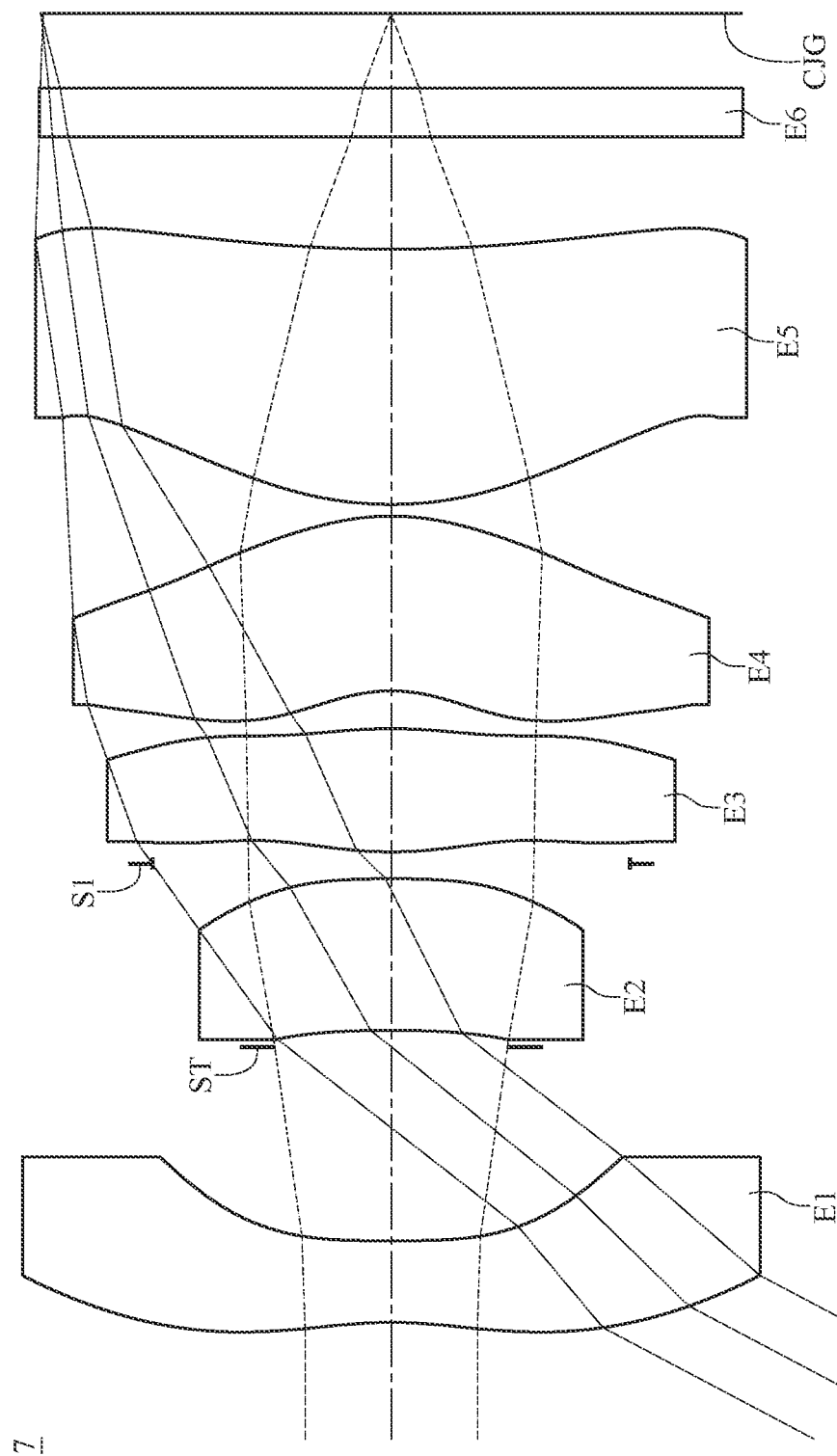
FIG. 13 is a schematic view of an optical device according to the 7th embodiment of the present disclosure.
Figure 14:
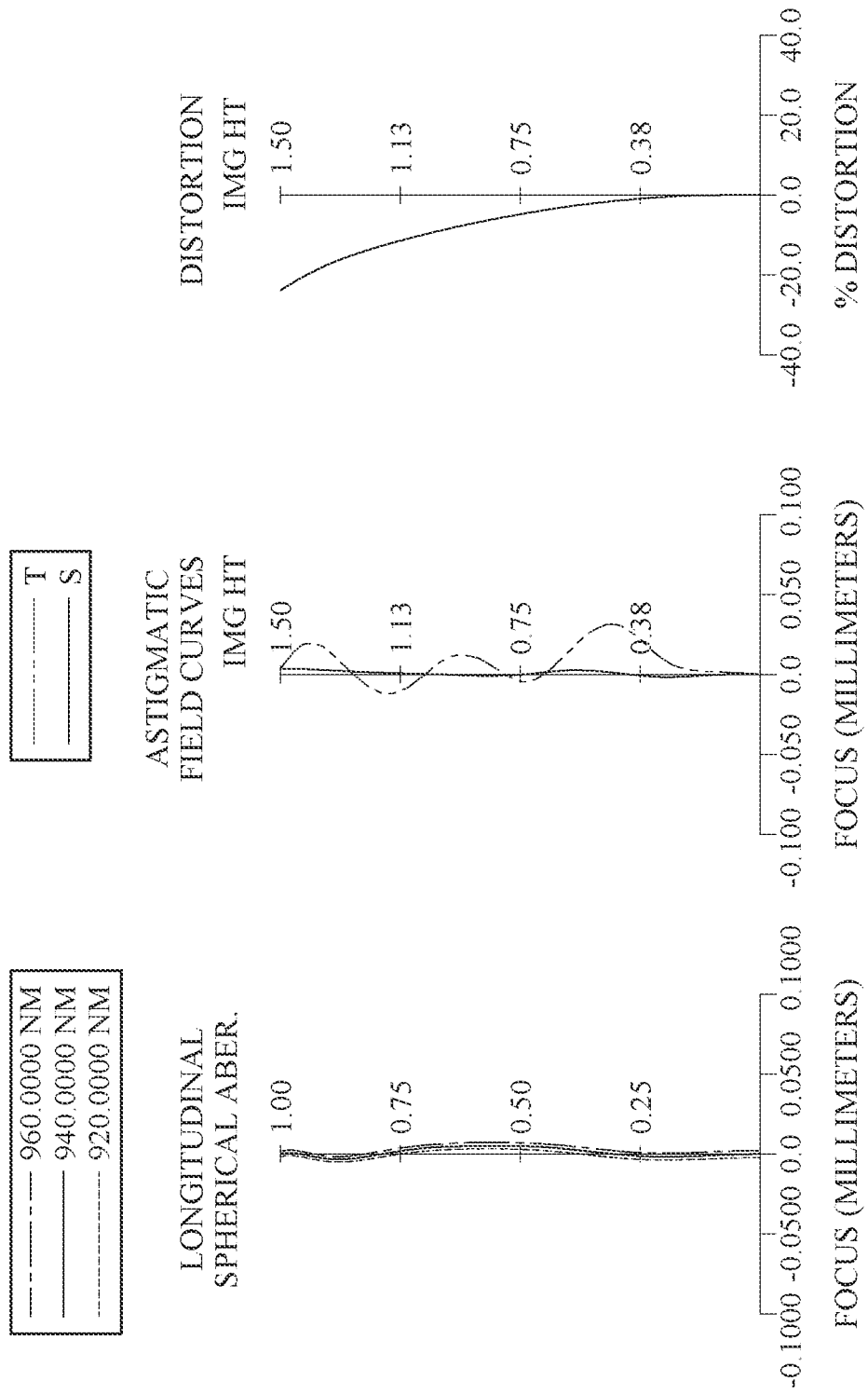
FIG. 14 shows spherical aberration curves, astigmatic field curves and a distortion curve of the optical device according to the 7th embodiment.

FIG. 13 is a schematic view of an optical device according to the 7th embodiment of the present disclosure. FIG. 14 shows, in order from left to right, spherical aberration curves, astigmatic field curves and a distortion curve of the optical device according to the 7th embodiment. The optical device 7 in FIG. 13 can be used as an image capturing unit, a receiving unit or a projecting unit. In FIG. 13, the optical device 7 includes the image lens assembly (its reference numeral is omitted) of the present disclosure. The image lens assembly includes, in order from an outer side to an inner side along an optical axis, a first lens element E1, an aperture stop ST, a second lens element E2, a stop S1, a third lens element E3, a fourth lens element E4, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being concave in a paraxial region thereof. The first lens element E1 is made of plastic material and has the outer-side surface and the inner-side surface being both aspheric. The outer-side surface of the first lens element E1 has one inflection point. The outer-side surface of the first lens element E1 has one critical point in an off-axis region thereof.

The second lens element E2 with negative refractive power has an outer-side surface being concave in a paraxial region thereof and an inner-side surface being convex in a paraxial region thereof. The second lens element E2 is made of plastic material and has the outer-side surface and the inner-side surface being both aspheric.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric. The outer-side surface of the third lens element E3 has two inflection points. The inner-side surface of the third lens element E3 has two inflection points. The outer-side surface of the third lens element E3 has two critical points in an off-axis region thereof.

The fourth lens element E4 with negative refractive power has an outer-side surface being concave in a paraxial region thereof and an inner-side surface being convex in a paraxial region thereof. The fourth lens element E4 is made of plastic material and has the outer-side surface and the inner-side surface being both aspheric. The outer-side surface of the fourth lens element E4 has four inflection points. The inner-side surface of the fourth lens element E4 has four inflection points. The outer-side surface of the fourth lens element E4 has one critical point in an off-axis region thereof.

The fifth lens element E5 with positive refractive power has an outer-side surface being convex in a paraxial region thereof and an inner-side surface being concave in a paraxial region thereof. The fifth lens element E5 is made of plastic material and has the outer-side surface and the inner-side surface being both aspheric. The outer-side surface of the fifth lens element E5 has one inflection point. The inner-side surface of the fifth lens element E5 has one inflection point. The outer-side surface of the fifth lens element E5 has one critical point in an off-axis region thereof. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 7th embodiment are shown in Table 7A and the aspheric surface data are shown in Table 7B below.

TABLE 7A

7th embodiment
f = 1.04 mm, Fno = 1.41, HFOV = 62.1 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | | Infinity | | | |
| 1 | Lens 1 | −1.7697 | (ASP) | 0.350 | Plastic | 1.536 | 56.1 | −2.90 |
| 2 | | 13.7475 | (ASP) | 0.832 | | | | |
| 3 | Ape. Stop | Plano | | 0.071 | | | | |
| 4 | Lens 2 | −4.5699 | (ASP) | 0.650 | Plastic | 1.616 | 23.5 | −36.57 |
| 5 | | −6.0435 | (ASP) | 0.065 | | | | |
| 6 | Stop | Plano | | 0.050 | | | | |
| 7 | Lens 3 | 1.6031 | (ASP) | 0.529 | Plastic | 1.616 | 23.5 | 1.55 |
| 8 | | −2.0726 | (ASP) | 0.162 | | | | |
| 9 | Lens 4 | −0.6701 | (ASP) | 0.750 | Plastic | 1.535 | 56.0 | −14.14 |
| 10 | | −1.0221 | (ASP) | 0.050 | | | | |
| 11 | Lens 5 | 1.6150 | (ASP) | 1.094 | Plastic | 1.634 | 20.4 | 3.31 |
| 12 | | 5.1626 | (ASP) | 0.482 | | | | |
| 13 | Filter | Plano | | 0.210 | Glass | 1.508 | 64.2 | — |
| 14 | | Plano | | 0.319 | | | | |
| 15 | Inner-Side Conjugate Surface | Plano | | — | | | | |

Note:
Reference wavelength is 940.0 nm (infrared light).
An effective radius of the stop S1 (Surface 6) is 1.024 mm.

TABLE 7B

Aspheric Coefficients

| Surface # | 1 | 2 | 4 | 5 |
|---|---|---|---|---|
| k= | −2.5192000E+01 | 0.0000000E+00 | 0.0000000E+00 | 0.0000000E+00 |
| A4= | 3.0667840E−01 | 8.2347509E−01 | −3.0173849E−02 | −7.9877285E−01 |
| A6= | −3.3953107E−01 | −1.1385320E+00 | −5.4826696E+00 | 9.6587890E−01 |
| A8= | 2.8223631E−01 | 1.0846953E+00 | 8.7039741E+01 | −2.3252717E−01 |
| A10= | −1.6211147E−01 | −1.3713290E−01 | −7.9597946E+02 | −2.8828457E+00 |
| A12= | 6.1920139E−02 | −8.1648813E−01 | 4.2652308E+03 | 1.2790807E+01 |
| A14= | −1.5188156E−02 | 6.7599098E−01 | −1.3079779E+04 | −2.4766471E+01 |
| A16= | 2.2253696E−03 | −1.6068397E−01 | 2.0895469E+04 | 2.1373514E+01 |
| A18= | −1.6334990E−04 | — | −1.3188568E+04 | −6.6889808E+00 |
| A20= | 3.4805985E−06 | — | — | — |

| Surface # | 7 | 8 | 9 | 10 |
|---|---|---|---|---|
| k= | 0.0000000E+00 | −4.0412700E+01 | −1.0000000E+00 | −1.0000000E+00 |
| A4= | −6.7397257E−01 | −1.0919197E−01 | 1.2390351E+00 | 5.1110998E−01 |
| A6= | 1.5099633E+00 | 3.4003288E+00 | 7.9503335E−01 | −1.0282144E+00 |
| A8= | −8.0465214E+00 | −1.3600945E+01 | −6.0744547E+00 | 1.7500556E+00 |
| A10= | 2.4377046E+01 | 2.6953231E+01 | 1.0448122E+01 | −2.4745948E+00 |
| A12= | −4.0083799E+01 | −3.2015130E+01 | −8.8437750E+00 | 2.8315828E+00 |
| A14= | 3.8758918E+01 | 2.3758394E+01 | 3.1164777E+00 | −2.2042219E+00 |
| A16= | −2.2241652E+01 | −1.0822447E+01 | 7.2240893E−01 | 1.0252640E+00 |
| A18= | 7.0361224E+00 | 2.8148830E+00 | −1.0899832E+00 | −2.5176009E−01 |
| A20= | −9.4657766E−01 | −3.4852470E−01 | 3.8038421E−01 | 2.3866063E−02 |
| A22= | — | 1.0981898E−02 | −4.7045559E−02 | 3.9053282E−04 |

TABLE 7B-continued

| Aspheric Coefficients | | |
|---|---|---|
| Surface # | 11 | 12 |
| k= | 0.0000000E+00 | −1.0000000E+00 |
| A4= | 1.7370350E−01 | −1.2161120E−01 |
| A6= | −9.4572730E−01 | 4.2097922E−01 |
| A8= | 2.0224481E+00 | −9.5696271E−01 |
| A10= | −2.8717991E+00 | 1.4407174E+00 |
| A12= | 2.5965067E+00 | −1.5407730E+00 |
| A14= | −1.3103736E+00 | 1.1926031E+00 |
| A16= | 1.4236676E−01 | −6.5733234E−01 |
| A18= | 2.4157568E−01 | 2.4798296E−01 |
| A20= | −1.5265006E−01 | −6.0275970E−02 |
| A22= | 3.8518524E−02 | 8.4626300E−03 |
| A24= | −3.7125085E−03 | −5.2011406E−04 |

In the 7th embodiment, the equation of the aspheric surface profiles of the aforementioned lens elements is the same as the equation of the 1st embodiment. Also, the definitions of these parameters shown in Table 7C are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

| Schematic Parameters | | | |
|---|---|---|---|
| f [mm] | 1.04 | \|f/f1\|/(\|f/f2\| + \|f/f4\|) | 3.51 |
| Fno | 1.41 | f/R1 | −0.59 |
| HFOV [deg.] | 62.1 | \|f/R10\| | 0.20 |
| f/f1 | −0.36 | f12/f45 | −0.94 |
| f/f2 | −0.03 | N4 | 1.535 |
| f/f3 | 0.67 | V3 + V5 | 43.9 |
| f/f4 | −0.07 | V4/V5 | 2.74 |
| f/f5 | 0.31 | CT1/CT2 | 0.54 |
| TL/f | 5.39 | CT2/CT3 | 1.23 |
| TL/YI | 3.74 | ET1/CT1 | 1.46 |
| SL/TL | 0.79 | ΣAT/CT2 | 1.89 |
| EPD/BL | 0.73 | (T12 + CT3)/f | 1.38 |
| (R3 + R6)/(R3 − R6) | 2.66 | Y11/Ystop | 3.17 |
| (R8 + R9)/(R8 − R9) | −0.22 | Yc11/Y11 | 0.40 |
| R5/R6 | −0.77 | max(AT)/min(AT) | 18.06 |
| R7/R8 | 0.66 | max(CT)/min(CT) | 3.13 |

8th Embodiment

Figure 15:
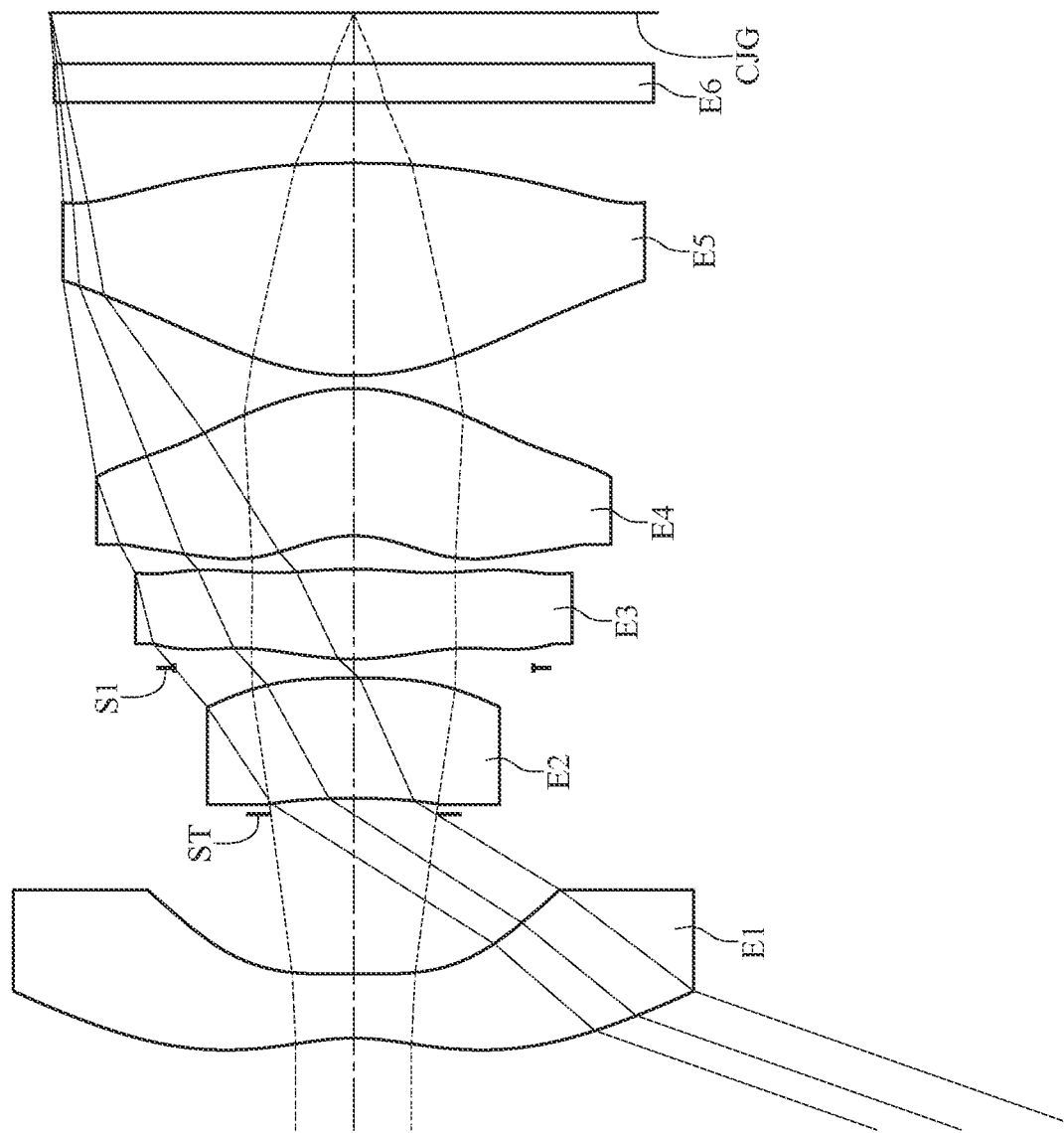
FIG. 15 is a schematic view of an optical device according to the 8th embodiment of the present disclosure.
Figure 16:
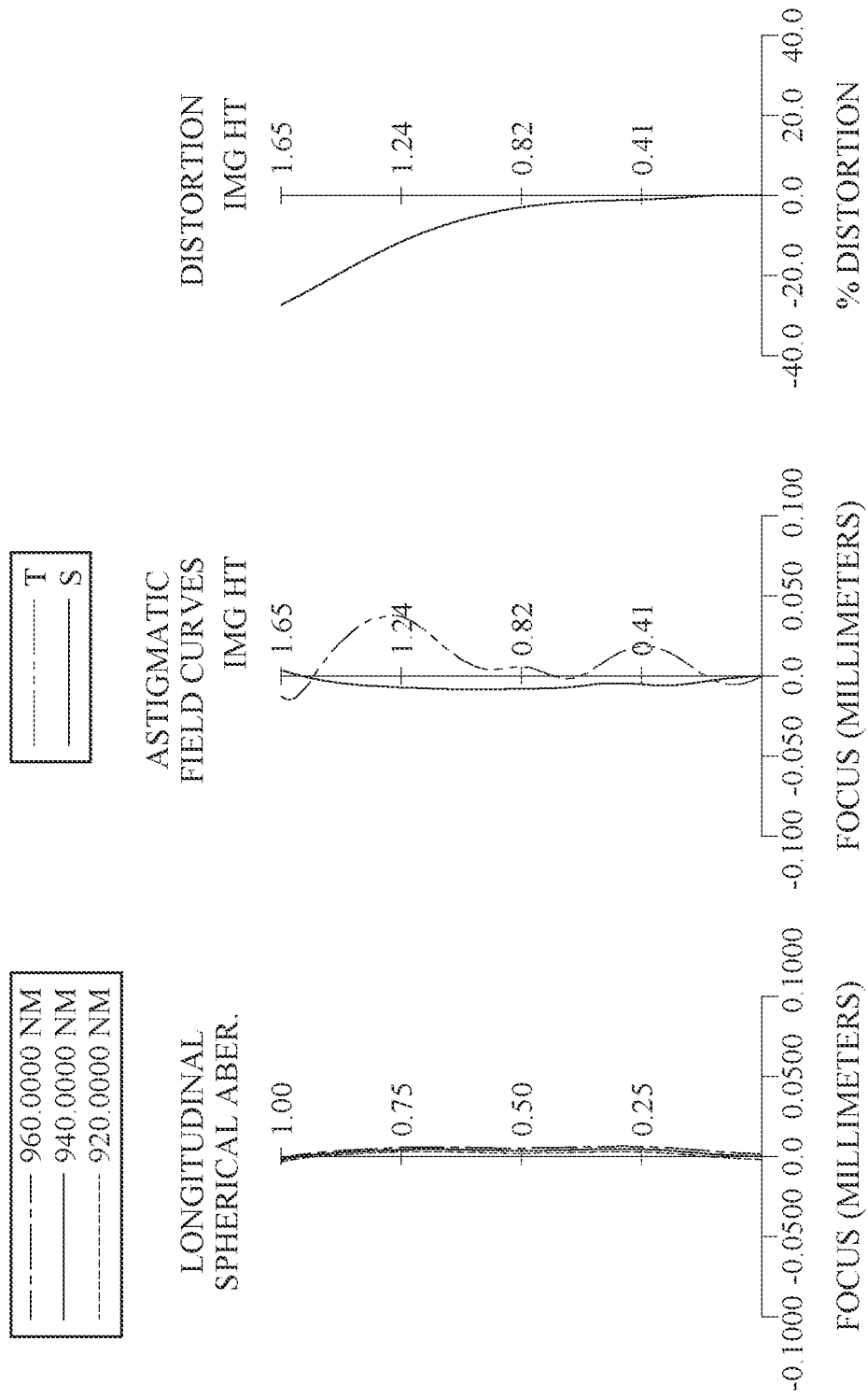
FIG. 16 shows spherical aberration curves, astigmatic field curves and a distortion curve of the optical device according to the 8th embodiment.

FIG. 15 is a schematic view of an optical device according to the 8th embodiment of the present disclosure. FIG. 16 shows, in order from left to right, spherical aberration curves, astigmatic field curves and a distortion curve of the optical device according to the 8th embodiment. The optical device 8 in FIG. 15 can be used as an image capturing unit, a receiving unit or a projecting unit. In FIG. 15, the optical device 8 includes the image lens assembly (its reference numeral is omitted) of the present disclosure. The image lens assembly includes, in order from an outer side to an inner side along an optical axis, a first lens element E1, an aperture stop ST, a second lens element E2, a stop S1, a third lens element E3, a fourth lens element E4, a fifth lens element E5, a filter E6 and an inner-side conjugate surface CJG. The image lens assembly includes five lens elements (E1, E2, E3, E4 and E5) with no additional lens element disposed between each of the adjacent five lens elements.

The first lens element E1 with negative refractive power has an outer-side surface being concave in a paraxial region thereof and an inner-side surface being convex in a paraxial region thereof. The first lens element E1 is made of plastic material and has the outer-side surface and the inner-side surface being both aspheric. The outer-side surface of the first lens element E1 has one inflection point. The inner-side surface of the first lens element E1 has one inflection point. The outer-side surface of the first lens element E1 has one critical point in an off-axis region thereof. The inner-side surface of the first lens element E1 has one critical point in an off-axis region thereof.

The second lens element E2 with negative refractive power has an outer-side surface being concave in a paraxial region thereof and an inner-side surface being convex in a paraxial region thereof. The second lens element E2 is made of glass material and has the outer-side surface and the inner-side surface being both aspheric.

The third lens element E3 with positive refractive power has an outer-side surface being convex in a paraxial region thereof and an inner-side surface being convex in a paraxial region thereof. The third lens element E3 is made of plastic material and has the outer-side surface and the inner-side surface being both aspheric. The outer-side surface of the third lens element E3 has two inflection points. The inner-side surface of the third lens element E3 has three inflection points. The outer-side surface of the third lens element E3 has two critical points in an off-axis region thereof. The inner-side surface of the third lens element E3 has three critical points in an off-axis region thereof.

The fourth lens element E4 with negative refractive power has an outer-side surface being concave in a paraxial region thereof and an inner-side surface being convex in a paraxial region thereof. The fourth lens element E4 is made of plastic material and has the outer-side surface and the inner-side surface being both aspheric. The outer-side surface of the fourth lens element E4 has four inflection points. The inner-side surface of the fourth lens element E4 has two inflection points. The outer-side surface of the fourth lens element E4 has two critical points in an off-axis region thereof.

The fifth lens element E5 with positive refractive power has an outer-side surface being convex in a paraxial region thereof and an inner-side surface being convex in a paraxial region thereof. The fifth lens element E5 is made of plastic material and has the outer-side surface and the inner-side surface being both aspheric. The outer-side surface of the fifth lens element E5 has one inflection point. The inner-side surface of the fifth lens element E5 has one inflection point. The inner-side surface of the fifth lens element E5 has one critical point in an off-axis region thereof.

The filter E6 is made of glass material and located between the fifth lens element E5 and the inner-side conjugate surface CJG, and will not affect the focal length of the image lens assembly.

The detailed optical data of the 8th embodiment are shown in Table 8A and the aspheric surface data are shown in Table 8B below.

TABLE 8A

8th embodiment
f = 0.80 mm, Fno = 1.27, HFOV = 70.6 deg.

| Surface # | | Curvature Radius | | Thickness | Material | Index | Abbe # | Focal Length |
|---|---|---|---|---|---|---|---|---|
| 0 | Outer-Side Conjugate Surface | Plano | | | Infinity | | | |
| 1 | Lens 1 | −1.2107 | (ASP) | 0.350 | Plastic | 1.535 | 56.0 | −2.61 |
| 2 | | −9.9010 | (ASP) | 0.867 | | | | |
| 3 | Ape. Stop | Plano | | 0.088 | | | | |
| 4 | Lens 2 | −4.4558 | (ASP) | 0.655 | Glass | 1.826 | 32.3 | −17.84 |
| 5 | | −6.8114 | (ASP) | 0.053 | | | | |
| 6 | Stop | Plano | | 0.050 | | | | |
| 7 | Lens 3 | 1.5308 | (ASP) | 0.489 | Plastic | 1.634 | 20.4 | 1.55 |
| 8 | | −2.3930 | (ASP) | 0.182 | | | | |
| 9 | Lens 4 | −0.6744 | (ASP) | 0.802 | Plastic | 1.535 | 56.0 | −20.75 |
| 10 | | −1.0157 | (ASP) | 0.070 | | | | |
| 11 | Lens 5 | 1.5174 | (ASP) | 1.156 | Plastic | 1.616 | 23.5 | 2.12 |
| 12 | | −6.5482 | (ASP) | 0.332 | | | | |
| 13 | Filter | Plano | | 0.210 | Glass | 1.508 | 64.2 | — |
| 14 | | Plano | | 0.277 | | | | |
| 15 | Inner-Side Conjugate Surface | Plano | | — | | | | |

Note:
Reference wavelength is 940.0 nm (infrared light).
An effective radius of the stop S1 (Surface 6) is 0.976 mm.

TABLE 8B

Aspheric Coefficients

| Surface # | 1 | 2 | 4 | 5 |
|---|---|---|---|---|
| k= | −1.4895300E+01 | −8.2831100E+01 | −1.5272600E+01 | −6.6803800E+01 |
| A4= | 3.8234958E−01 | 1.2001101E+00 | −2.4045062E−01 | −6.6378888E−01 |
| A6= | −4.6965601E−01 | −2.3708439E+00 | 1.9270134E+00 | 1.1018420E+00 |
| A8= | 4.2827755E−01 | 4.4427198E+00 | −3.3714616E+01 | −3.0608246E+00 |
| A10= | −2.7859556E−01 | −7.1670986E+00 | 3.4225940E+02 | 1.1346914E+01 |
| A12= | 1.2560666E−01 | 9.3606506E+00 | −2.0757037E+03 | −2.7094961E+01 |
| A14= | −3.8278121E−02 | −9.2165478E+00 | 7.4154190E+03 | 3.7779981E+01 |
| A16= | 7.5106754E−03 | 6.0704166E+00 | −1.4495389E+04 | −2.9093967E+01 |
| A18= | −8.5442881E−04 | −2.3011999E+00 | 1.2073638E+04 | 9.7336478E+00 |
| A20= | 4.2732450E−05 | 3.7478255E−01 | — | — |

| Surface # | 7 | 8 | 9 | 10 |
|---|---|---|---|---|
| k= | 3.3974100E−02 | −8.7621000E+01 | −1.0076700E+00 | −9.7511600E−01 |
| A4= | −6.0251304E−01 | −1.5755620E−01 | 1.2887899E+00 | 4.1220641E−01 |
| A6= | 1.3911157E+00 | 4.2972670E+00 | −2.9726331E−01 | −1.0390821E+00 |
| A8= | −8.0914020E+00 | −1.8311284E+01 | 2.3466357E−01 | 2.9031659E+00 |
| A10= | 2.4116350E+01 | 4.2002914E+01 | −6.9326711E+00 | −5.9963472E+00 |
| A12= | −3.8785623E+01 | −6.2337245E+01 | 1.9623670E+01 | 8.2710997E+00 |
| A14= | 3.6979431E+01 | 6.2433906E+01 | −2.7109363E+01 | −7.2540441E+00 |
| A16= | −2.1075376E+01 | −4.2089634E+01 | 2.1897437E+01 | 3.9465537E+00 |
| A18= | 6.6522267E+00 | 1.8463781E+01 | −1.0551026E+01 | −1.2805212E+00 |
| A20= | −8.9494731E−01 | −4.8046415E+00 | 2.8201125E+00 | 2.2510675E−01 |
| A22= | — | 5.6607644E−01 | −3.2295401E−01 | −1.6326803E−02 |

| Surface # | 11 | 12 |
|---|---|---|
| k= | −1.9818200E−01 | −4.9362300E+00 |
| A4= | 1.2226786E−01 | −1.5584261E−01 |
| A6= | −9.1513157E−01 | 3.1477301E−01 |
| A8= | 2.3199625E+00 | −2.8562693E−01 |
| A10= | −3.8638675E+00 | −6.5308964E−02 |

TABLE 8B-continued

Aspheric Coefficients

| A12= | 4.3139079E+00 | 4.5020426E−01 |
|---|---|---|
| A14= | −3.2808479E+00 | −5.2914135E−01 |
| A16= | 1.7030262E+00 | 3.4262613E−01 |
| A18= | −5.9285949E−01 | −1.3709374E−01 |
| A20= | 1.3201459E−01 | 3.3722686E−02 |
| A22= | −1.6920896E−02 | −4.6765541E−03 |
| A24= | 9.4324952E−04 | 2.7958987E−04 |

In the 8th embodiment, the equation of the aspheric surface profiles of the aforementioned lens elements is the same as the equation of the 1st embodiment. Also, the definitions of these parameters shown in Table 8C are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

Schematic Parameters

| f [mm] | 0.80 | |f/f1|/(|f/f2| + |f/f4|) | 3.67 |
|---|---|---|---|
| Fno | 1.27 | f/R1 | −0.66 |
| HFOV [deg.] | 70.6 | |f/R10| | 0.12 |
| f/f1 | −0.31 | f12/f45 | −1.40 |
| f/f2 | −0.04 | N4 | 1.535 |
| f/f3 | 0.52 | V3 + V5 | 43.9 |
| f/f4 | −0.04 | V4/V5 | 2.38 |
| f/f5 | 0.38 | CT1/CT2 | 0.53 |
| TL/f | 6.97 | CT2/CT3 | 1.34 |
| TL/YI | 3.38 | ET1/CT1 | 1.58 |
| SL/TL | 0.78 | ΣAT/CT2 | 2.00 |
| EPD/BL | 0.77 | (T12 + CT3)/f | 1.80 |
| (R3 + R6)/(R3 − R6) | 3.32 | Y11/Ystop | 4.11 |
| (R8 + R9)/(R8 − R9) | −0.20 | Yc11/Y11 | 0.38 |
| R5/R6 | −0.64 | max(AT)/min(AT) | 13.64 |
| R7/R8 | 0.66 | max(CT)/min(CT) | 3.30 |

9th Embodiment

Figure 17:
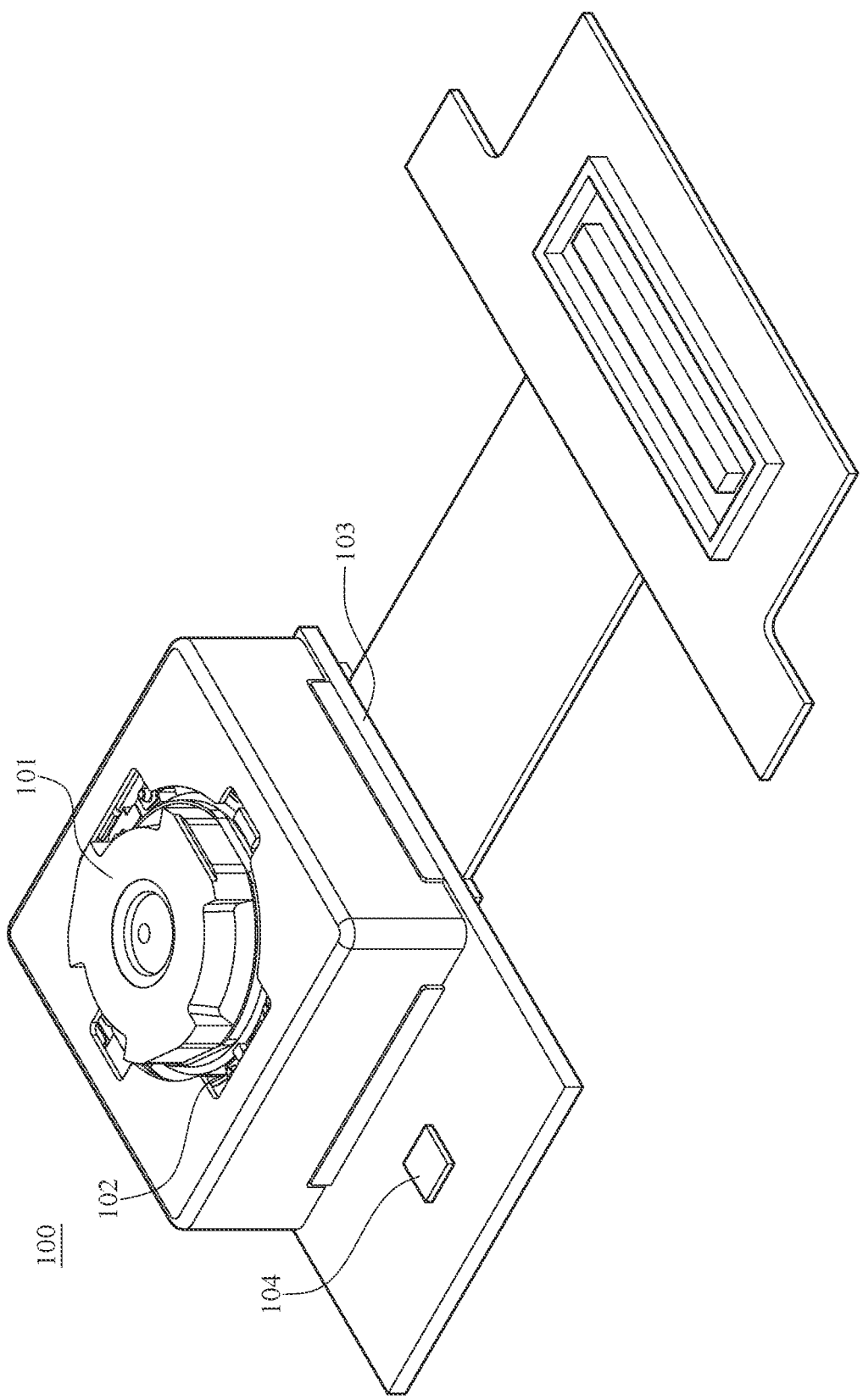
FIG. 17 is a perspective view of an image capturing unit according to the 9th embodiment of the present disclosure.

FIG. 17 is a perspective view of an image capturing unit according to the 9th embodiment of the present disclosure. In this embodiment, an image capturing unit 100 (optical device) is a camera module including a lens unit 101, a driving device 102, an image sensor 103 and an image stabilizer 104. The lens unit 101 includes the image lens assembly disclosed in the 1st embodiment, a barrel and a holder member (their reference numerals are omitted) for holding the image lens assembly. However, the lens unit 101 may alternatively be provided with the image lens assembly disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the inner-side conjugate surface (image surface) of the image lens assembly to provide higher image quality. In addition, the image sensor 103 can also be used for detecting infrared light. The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions. In addition, the image capturing unit 100 can further include another component with a light-filtering function.

10th Embodiment

Figure 18:
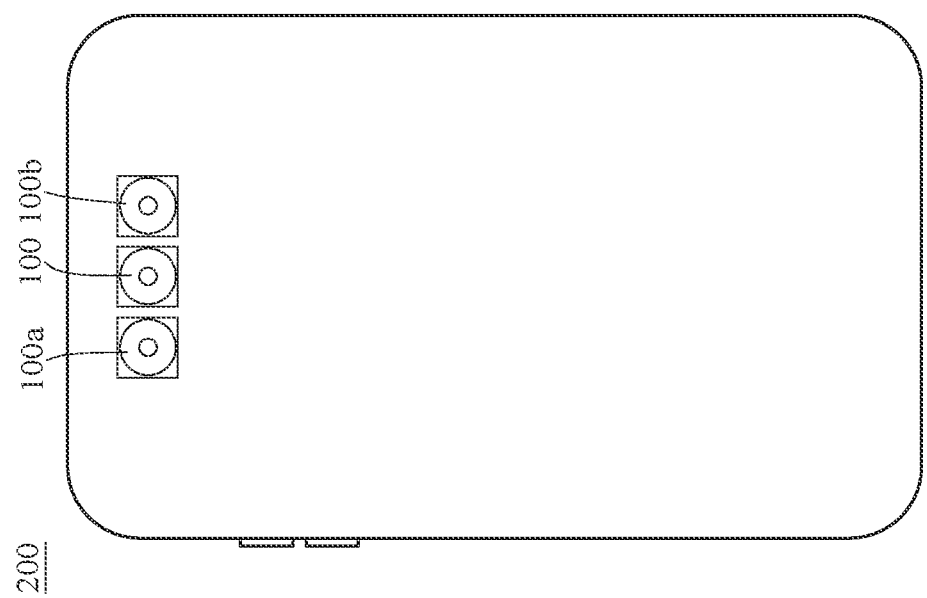
FIG. 18 is one perspective view of an electronic device according to the 10th embodiment of the present disclosure.
Figure 19:
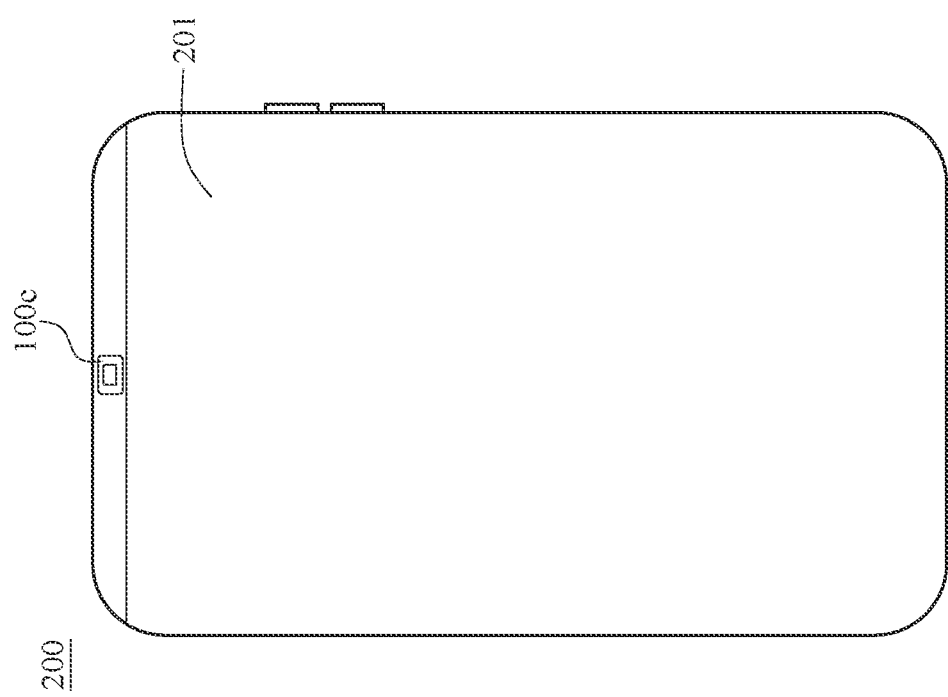
FIG. 19 is another perspective view of the electronic device in FIG. 18.

FIG. 18 is one perspective view of an electronic device according to the 10th embodiment of the present disclosure. FIG. 19 is another perspective view of the electronic device in FIG. 18.

In this embodiment, an electronic device 200 is a smartphone including the image capturing unit 100 disclosed in the 9th embodiment, an image capturing unit 100a, an image capturing unit 100b, an image capturing unit 100c and a display unit 201. As shown in FIG. 18, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 19, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the image lens assembly of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an image lens assembly such as the image lens assembly of the present disclosure, a barrel and a holder member for holding the image lens assembly.

The image capturing unit 100 is a wide-angle image capturing unit, the image capturing unit 100a is a telephoto image capturing unit, the image capturing unit 100b is an ultra-wide-angle image capturing unit, and the image capturing unit 100*c* is a wide-angle image capturing unit. In this embodiment, the image capturing units 100, 100*a* and 100*b* have different fields of view, such that the electronic device 200 can have various magnification ratios so as to meet the requirement of optical zoom functionality. Moreover, as shown in FIG. 19, the image capturing unit 100*c* can have a non-circular opening, and the optical elements in the image capturing unit 100*c* can have one or more trimmed edges at outer diameter positions thereof for corresponding to the non-circular opening. Therefore, it is favorable for further reducing the size of the image capturing unit 100*c*, thereby increasing the area ratio of the display unit 201 with respect to the electronic device 200 and reducing the thickness of the electronic device 200. In this embodiment, the electronic device 200 includes multiple image capturing units 100, 100*a*, 100*b* and 100*c*, but the present disclosure is not limited to the number and arrangement of image capturing units.

11th Embodiment

Figure 20:
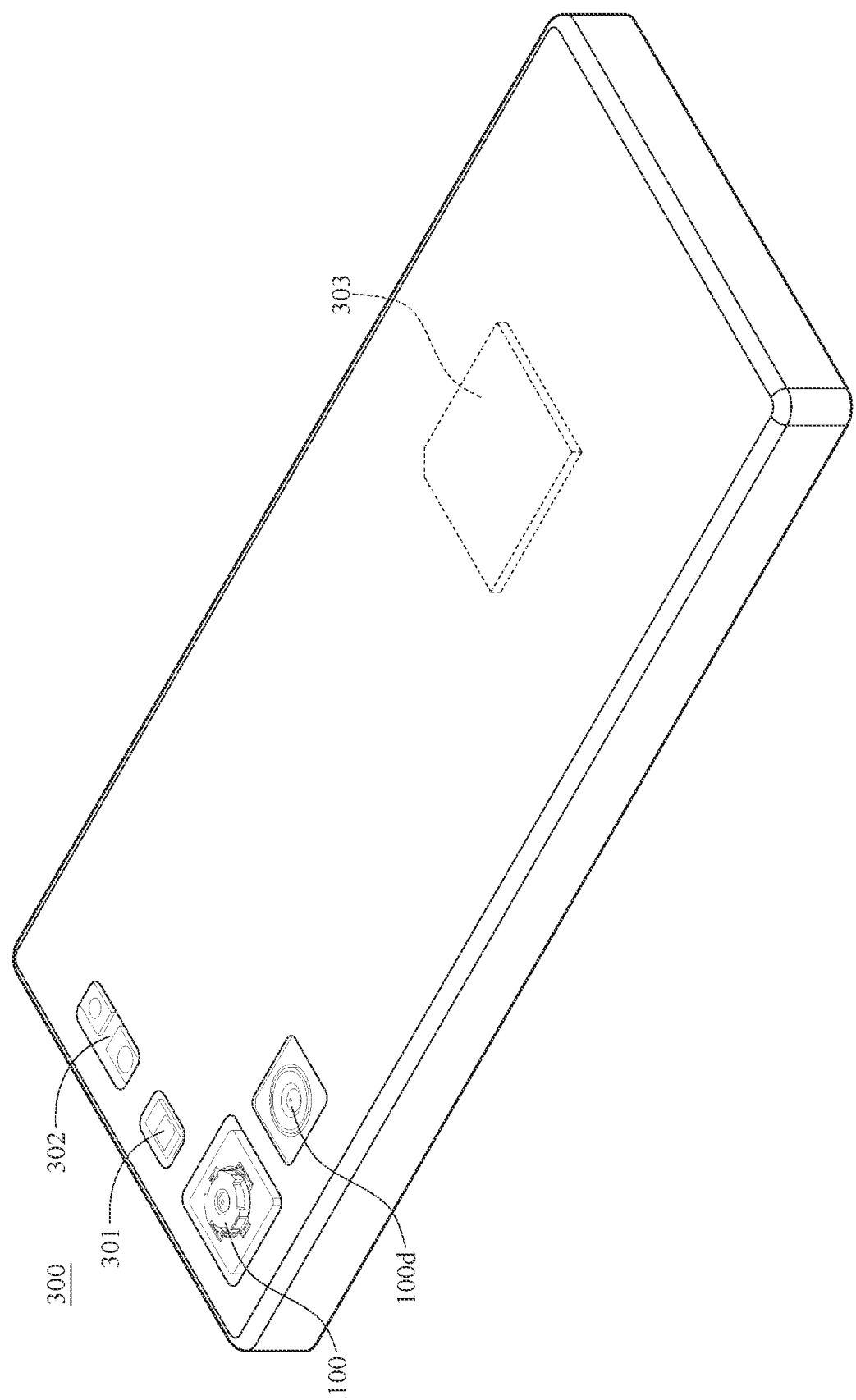
FIG. 20 is one perspective view of an electronic device according to the 11th embodiment of the present disclosure.
Figure 21:
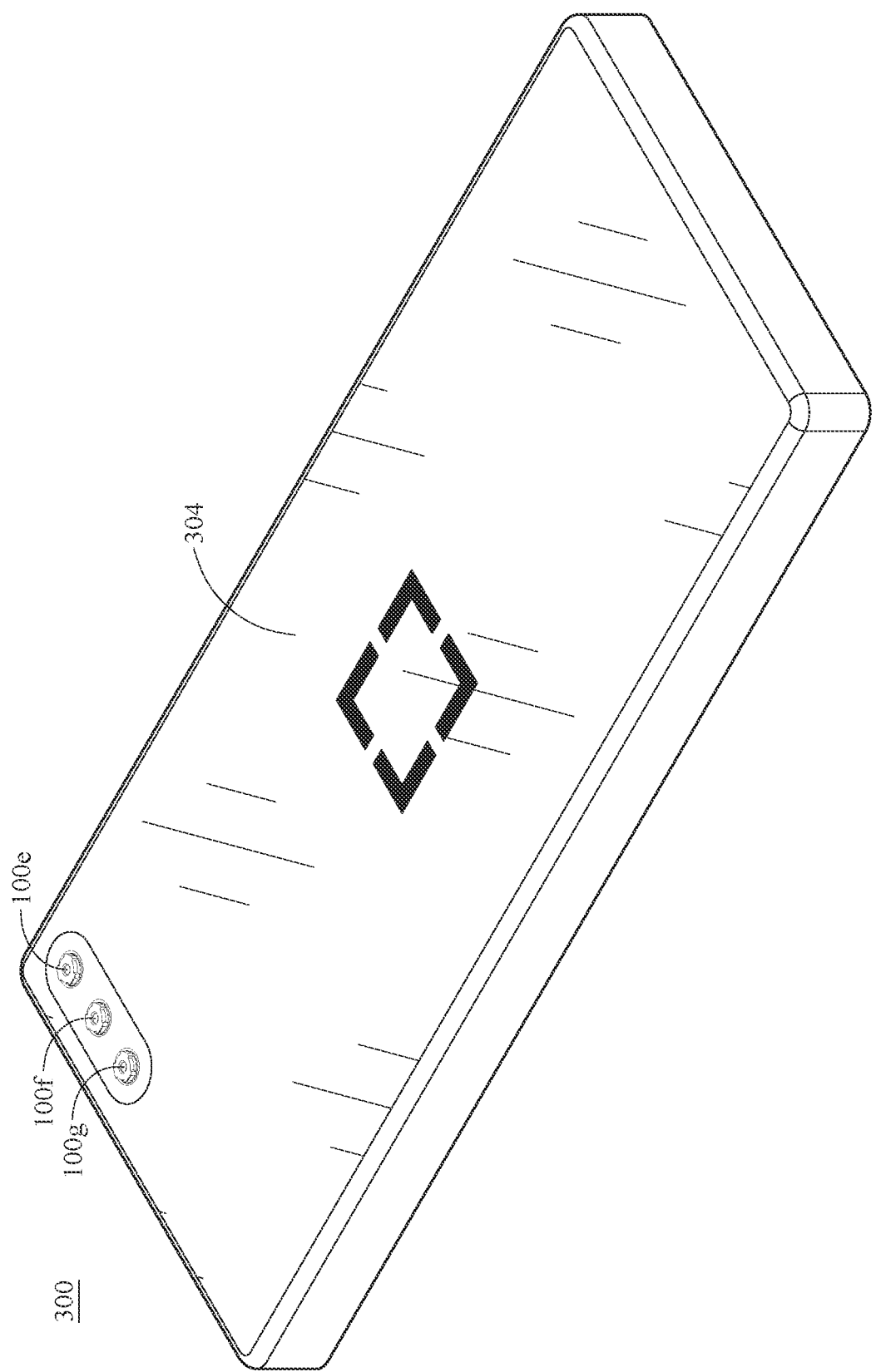
FIG. 21 is another perspective view of the electronic device in FIG. 20.
Figure 22:
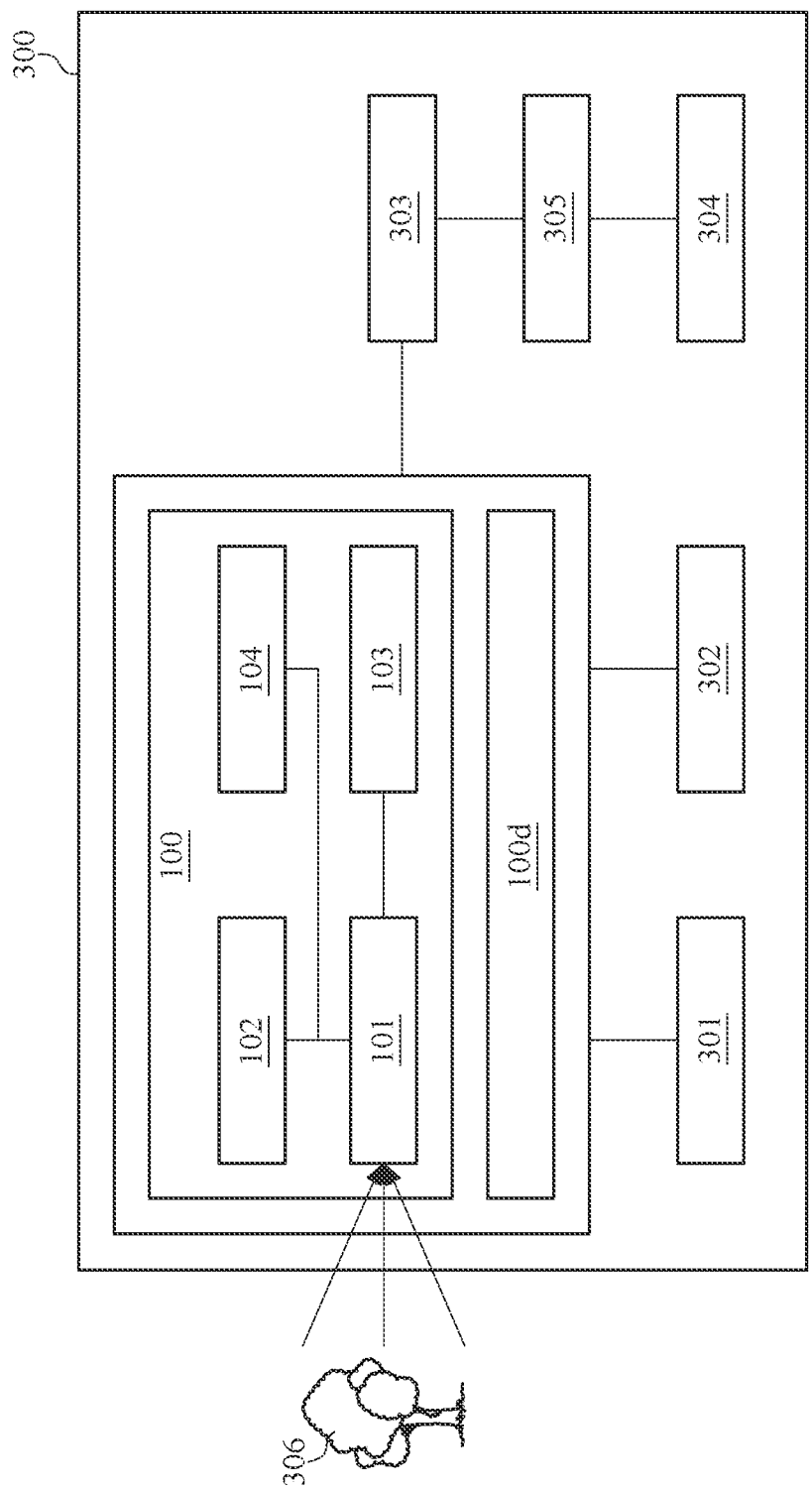
FIG. 22 is a block diagram of the electronic device in FIG. 20.

FIG. 20 is one perspective view of an electronic device according to the 11th embodiment of the present disclosure. FIG. 21 is another perspective view of the electronic device in FIG. 20. FIG. 22 is a block diagram of the electronic device in FIG. 20.

In this embodiment, an electronic device 300 is a smartphone including the image capturing unit 100 disclosed in the 9th embodiment, an image capturing unit 100*d*, an image capturing unit 100*e*, an image capturing unit 100*f*, an image capturing unit 100*g*, a flash module 301, a focus assist module 302, an image signal processor 303, a display module 304 and an image software processor 305. The image capturing unit 100 and the image capturing unit 100*d* are disposed on the same side of the electronic device 300. The focus assist module 302 can be a laser rangefinder or a ToF (time of flight) module, but the present disclosure is not limited thereto. The image capturing unit 100*e*, the image capturing unit 100*f*, the image capturing unit 100*g* and the display module 304 are disposed on the opposite side of the electronic device 300, and the display module 304 can be a user interface, such that the image capturing units 100*e*, 100*f*, 100*g* can be front-facing cameras of the electronic device 300 for taking selfies, but the present disclosure is not limited thereto. Furthermore, each of the image capturing units 100*d*, 100*e*, 100*f* and 100*g* can include the image lens assembly of the present disclosure and can have a configuration similar to that of the image capturing unit 100. In detail, each of the image capturing units 100*d*, 100*e*, 100*f* and 100*g* can include a lens unit, a driving device, an image sensor and an image stabilizer, and each of the lens unit can include an image lens assembly such as the image lens assembly of the present disclosure, a barrel and a holder member for holding the image lens assembly.

The image capturing unit 100 is a wide-angle image capturing unit, the image capturing unit 100*d* is an ultra-wide-angle image capturing unit, the image capturing unit 100*e* is a wide-angle image capturing unit, the image capturing unit 100*f* is an ultra-wide-angle image capturing unit, and the image capturing unit 100*g* is a ToF image capturing unit. In this embodiment, the image capturing units 100 and 100*d* have different fields of view, such that the electronic device 300 can have various magnification ratios so as to meet the requirement of optical zoom functionality. In addition, the image capturing unit 100*g* can determine depth information of the imaged object. In this embodiment, the electronic device 300 includes multiple image capturing units 100, 100*d*, 100*e*, 100*f* and 100*g*, but the present disclosure is not limited to the number and arrangement of image capturing units.

When a user captures images of an object 306 (an outer object having an outer-side conjugate surface), the light rays converge in the image capturing unit 100 or the image capturing unit 100*d* to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100*e*, 100*f* or 100*g* to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

12th Embodiment

Figure 23:
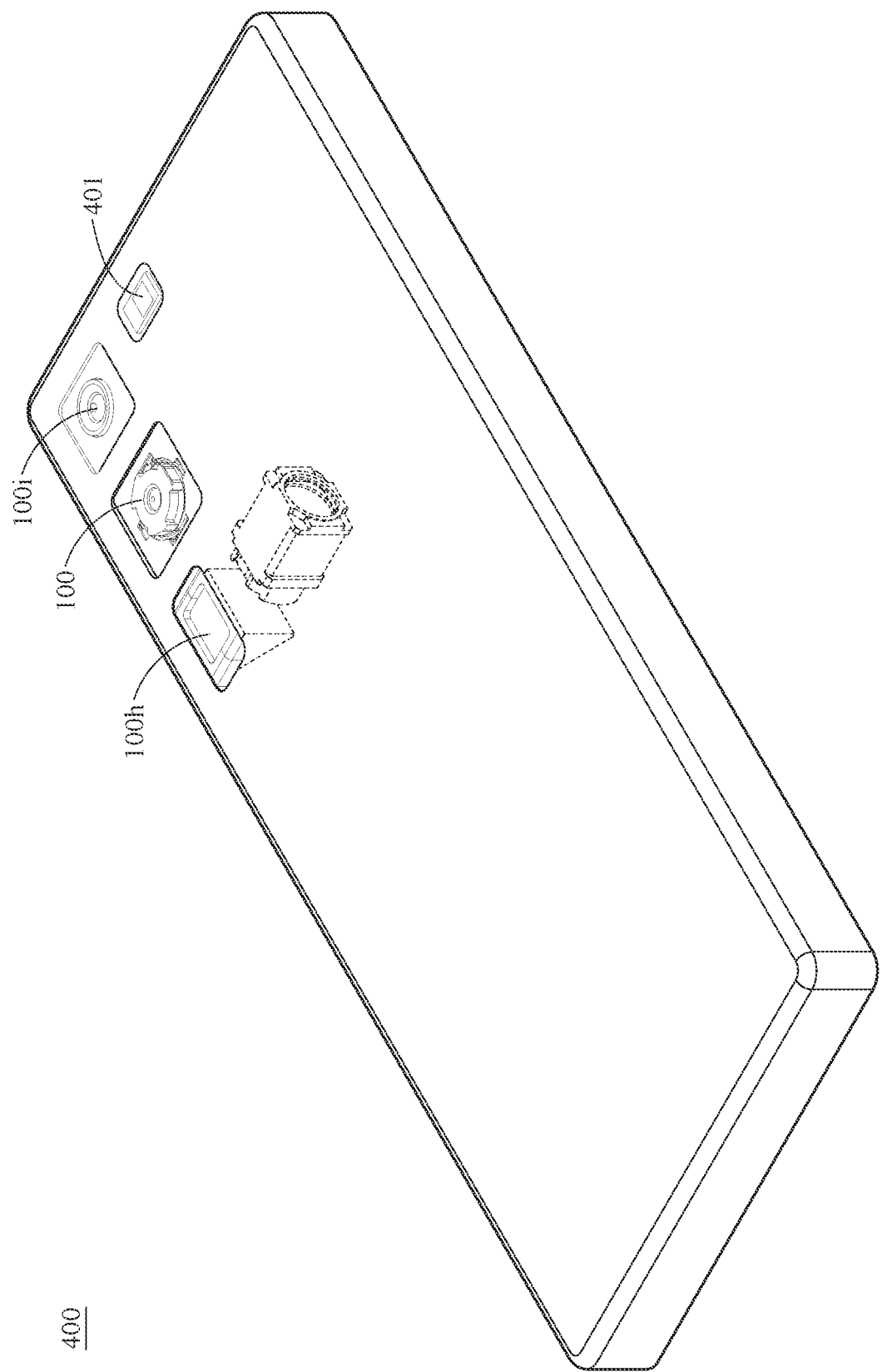
FIG. 23 is one perspective view of an electronic device according to the 12th embodiment of the present disclosure.

FIG. 23 is one perspective view of an electronic device according to the 12th embodiment of the present disclosure.

In this embodiment, an electronic device 400 is a smartphone including the image capturing unit 100 disclosed in the 9th embodiment, an image capturing unit 100*h*, an image capturing unit 100*i*, a flash module 401, a focus assist module, an image signal processor, a display module and an image software processor (not shown). The image capturing unit 100, the image capturing unit 100*h* and the image capturing unit 100*i* are disposed on the same side of the electronic device 400, while the display module is disposed on the opposite side of the electronic device 400. Furthermore, each of the image capturing units 100*h* and 100*i* can include the image lens assembly of the present disclosure and can have a configuration similar to that of the image capturing unit 100, and the details in this regard will not be provided again.

The image capturing unit 100 is a wide-angle image capturing unit, the image capturing unit 100*h* is a telephoto image capturing unit, and the image capturing unit 100*i* is an ultra-wide-angle image capturing unit. In this embodiment, the image capturing units 100, 100*h* and 100*i* have different fields of view, such that the electronic device 400 can have various magnification ratios so as to meet the requirement of optical zoom functionality. Moreover, the image capturing unit 100*h* can be a telephoto image capturing unit having a light-folding element configuration, such that the total track length of the image capturing unit 100*h* is not limited by the thickness of the electronic device 400. Moreover, the light-folding element configuration of the image capturing unit 100*h* can be similar to, for example, one of the structures shown in FIG. 34 to FIG. 36, which can be referred to foregoing descriptions corresponding to FIG. 34 to FIG. 36, and the details in this regard will not be provided again. In this embodiment, the electronic device 400 includes multiple image capturing units 100, 100*h* and 100*i*, but the present disclosure is not limited to the number and arrangement of image capturing units. When a user captures images of an object, light rays converge in the image capturing unit 100, 100*h* or 100*i* to generate images, and the flash module 401 is activated for light supplement. Further, the subsequent processes are performed in a manner similar to the abovementioned embodiment, so the details in this regard will not be provided again.

13th Embodiment

Figure 24:
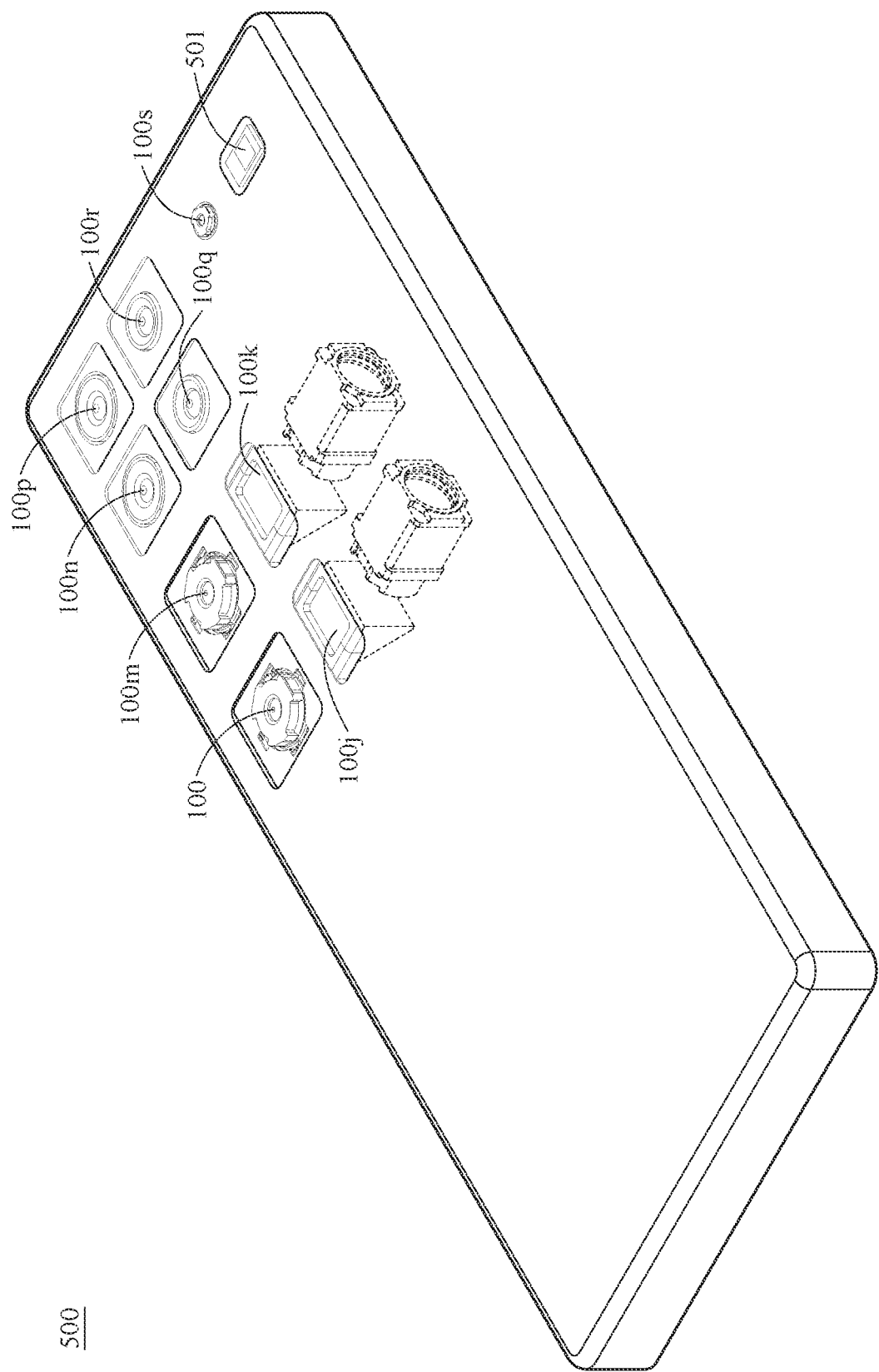
FIG. 24 is one perspective view of an electronic device according to the 13th embodiment of the present disclosure.

FIG. 24 is one perspective view of an electronic device according to the 13th embodiment of the present disclosure.

In this embodiment, an electronic device 500 is a smartphone including the image capturing unit 100 disclosed in the 9th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the image lens assembly of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 34 to FIG. 36, which can be referred to foregoing descriptions corresponding to FIG. 34 to FIG. 36, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement. Further, the subsequent processes are performed in a manner similar to the abovementioned embodiments, and the details in this regard will not be provided again.

14th Embodiment

FIG. 25 is a schematic view of a detecting module of an electronic device according to the 14th embodiment of the present disclosure. In this embodiment, an electronic device 600 includes a detecting module 601. The detecting module 601 includes a receiving unit 610 and a projecting unit 620. The receiving unit 610 includes an imaging optical system 610a and an image sensor 610b. The image sensor 610b is disposed on an inner-side conjugate surface 611a of the imaging optical system 610a. The projection unit 620 includes a projecting optical system 620a and a light source 620b. The light source 620b is disposed on an inner-side conjugate surface 621a of the projecting optical system 620a. In addition, the imaging optical system 610a can include the image lens assembly disclosed in the 1st embodiment, and the projecting optical system 620a can include the image lens assembly disclosed in the 6th embodiment. FIG. 25 further shows several lens elements of the imaging optical system 610a and the projecting optical system 620a.

The light source 620b can be a laser, a superluminescent diode (SLED), a micro LED, a resonant cavity light emitting diode (RCLED), a vertical cavity surface emitting laser (VCSEL) and the like. The light source 620b can be a single light source or multiple light sources disposed on the inner-side conjugate surface 621a of the projecting optical system 620a to present good projection quality. In the case that the light source 620b of the projection unit 620 is a VCSEL disposed on the inner-side conjugate surface 621a of the projecting optical system 620a, the light source 620b is favorable for the projection unit 620 to emit high directional light rays having low divergence and high intensity so as to enhance the illuminance of an outer-side conjugate surface of the projecting optical system 620a. The light source 620b of the projection unit 620 projects light onto a detected object OBJ (an outer object having an outer-side conjugate surface). The detected object OBJ reflects the light, and the reflected light travels into the receiving unit 610. The light traveling into the receiving unit 610 passes through the imaging optical system 610a and then is imaged on the image sensor 610b (inner-side conjugate surface). The received information can be analyzed and calculated by a processor of the electronic device 600 to obtain the relative distance between the detected object OBJ and the electronic device 600.

The projection unit 620 may further include a diffractive optical element (not shown). The diffractive optical element helps to project light evenly onto the detected object OBJ, or helps to diffract light to enlarge the projection angle and the projection field. The diffractive optical element may be a diffuser, a raster or a combination thereof (but not limited thereto). The diffractive optical element can have a micro structure such as a diffraction grating for scattering the light and replicating a speckle pattern generated by the scattered light, thereby enlarging the projection angle of the projection unit 620.

According to the present disclosure, the detecting module 601 can be operated within infrared light having a wavelength ranging from 750 nm to 1500 nm, such that the detecting module 601 is suitable for various applications such as augmented reality, facial recognition and motion capture.

The present disclosure is not limited to the detecting module 601 in FIG. 25. For example, the detecting module 601 can further include a focusing system or a reflector. The focusing system is configured to adjust the focal lengths of the projecting optical system 620a of the projection unit 620 and the imaging optical system 610a of the receiving unit 610 according to different photographing conditions so as to provide high image resolution. The reflector is configured to improve the space utilization.

15th Embodiment

Figure 26:
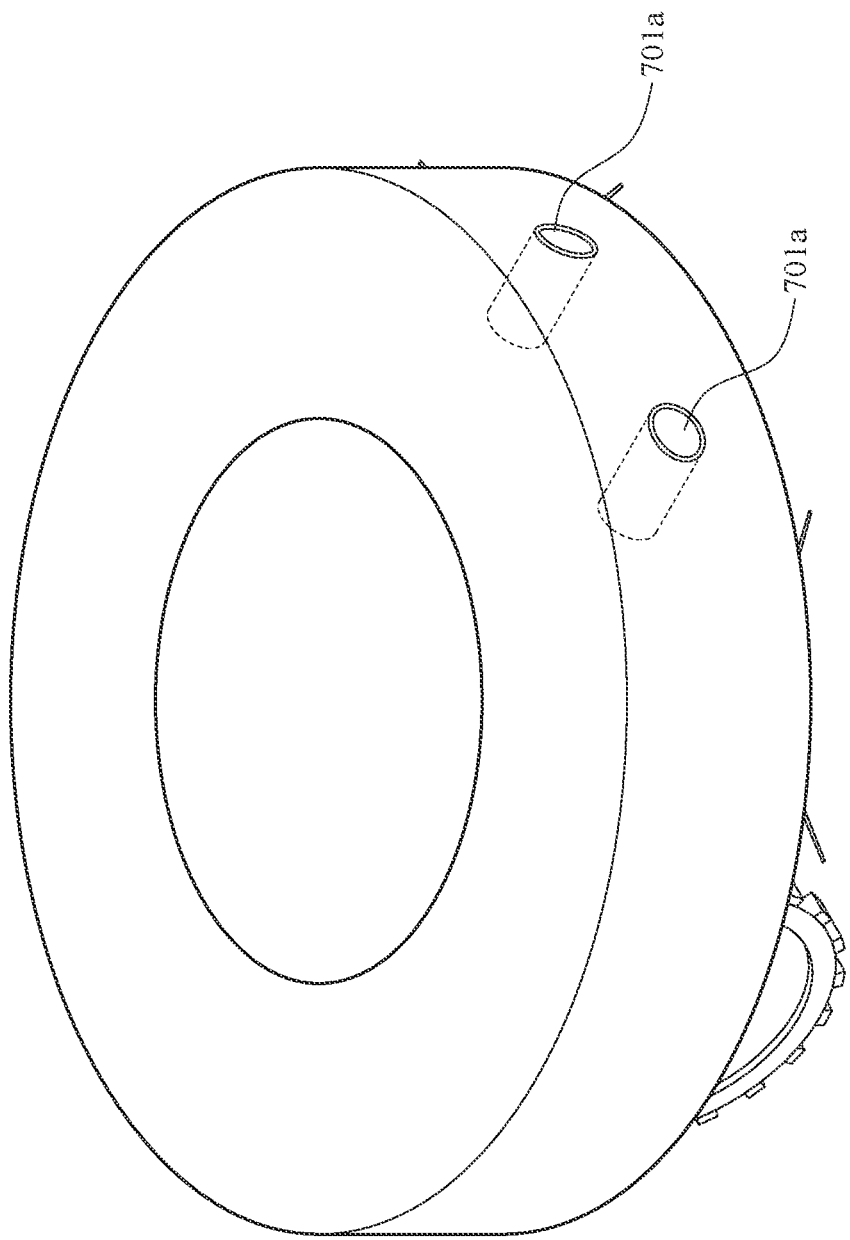
FIG. 26 is a schematic view of an electronic device according to the 15th embodiment of the present disclosure.
Figure 27:
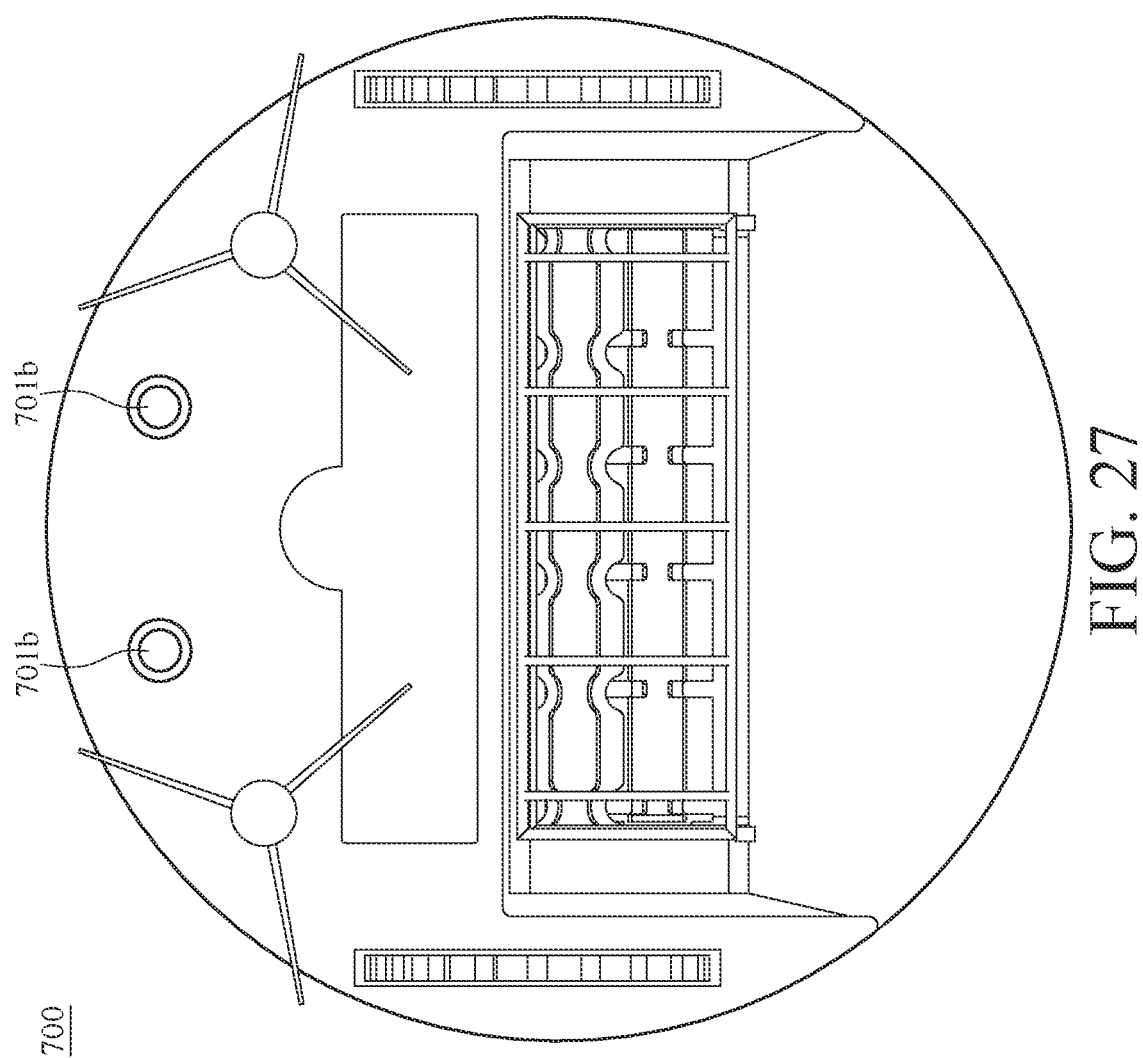
FIG. 27 is a bottom view of the electronic device in FIG. 26.

FIG. 26 is a schematic view of an electronic device according to the 15th embodiment of the present disclosure. FIG. 27 is a bottom view of the electronic device in FIG. 26.

Figure 28:
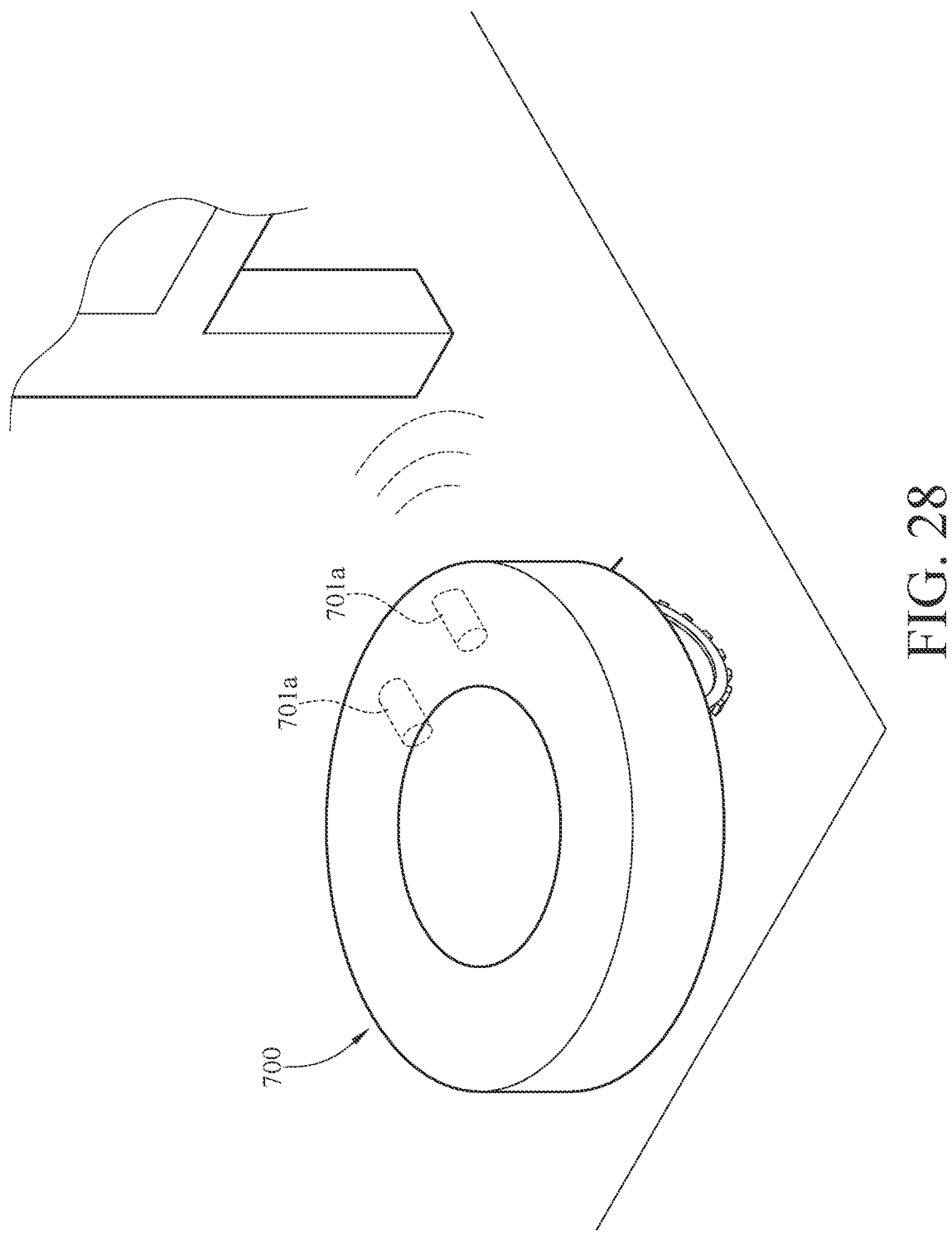
FIG. 28 is a schematic view showing detection of object distance of a front object by the electronic device in FIG. 26.
Figure 29:
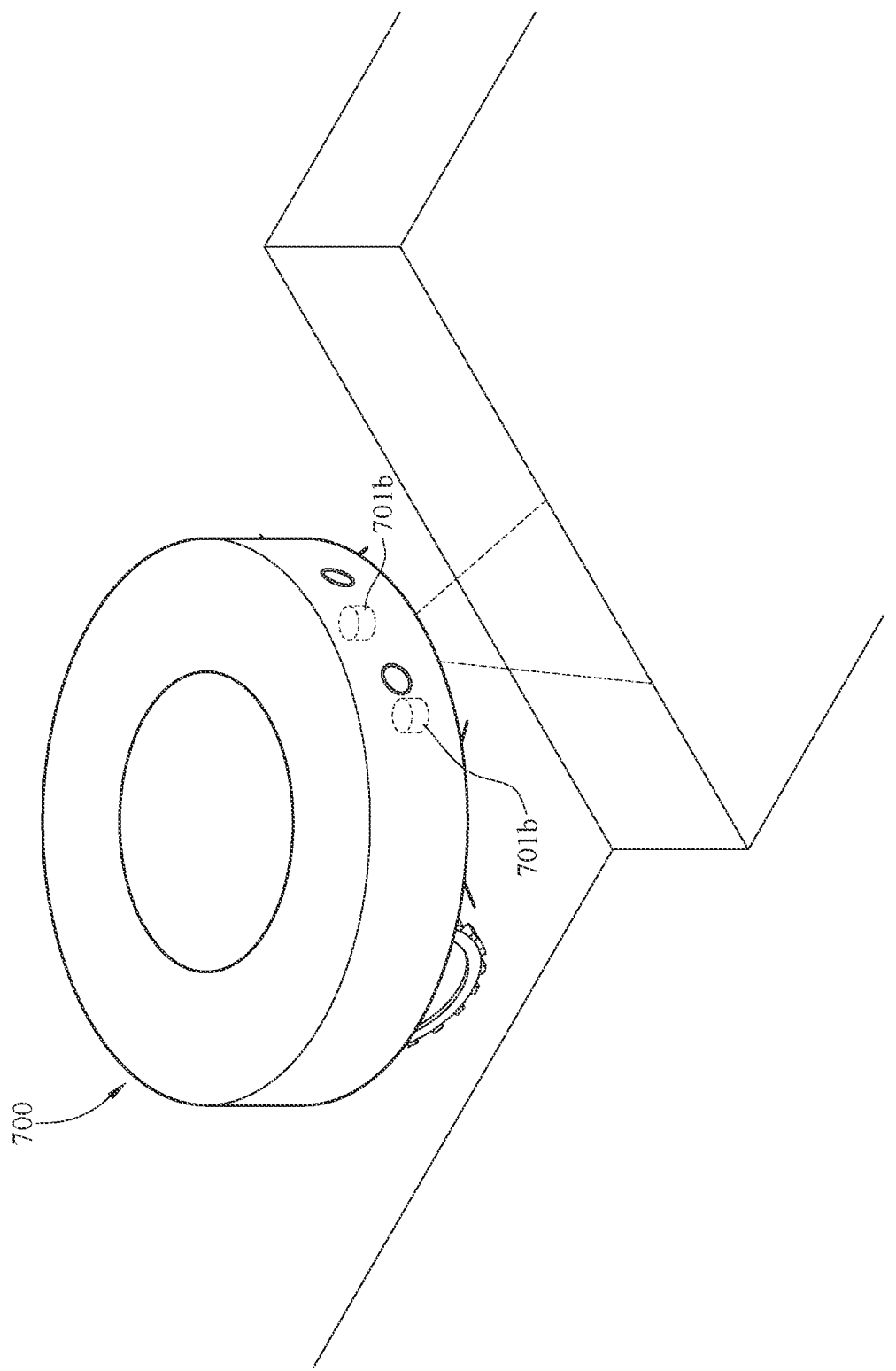
FIG. 29 is a schematic view showing detection of object distance of a bottom object by the electronic device in FIG. 26.

In this embodiment, an electronic device 700 may be a robot vacuum. The electronic device 700 includes an image capturing unit 701a disposed at the front side of a main part (not shown) thereof and an image capturing unit 701b disposed at the bottom side of the main part. Each of the image capturing unit 701a and the image capturing unit 701b can include the image lens assembly of the present disclosure. The image capturing unit 701a may be an anti-collision sensing lens which can detect the object distance of a front object (outer object) during movement of the electronic device 700 for preventing collision with the front object (as shown in FIG. 28, which is a schematic view showing detection of object distance of a front object by the electronic device in FIG. 26). The image capturing unit 701b may be an anti-fall sensing lens which can detect the step difference of the floor (outer object) during movement of the electronic device 700 for preventing falling down a structure with level difference such as stairs (as shown in FIG. 29, which is a schematic view showing detection of object distance of a bottom object by the electronic device in FIG. 26).

Figure 30:
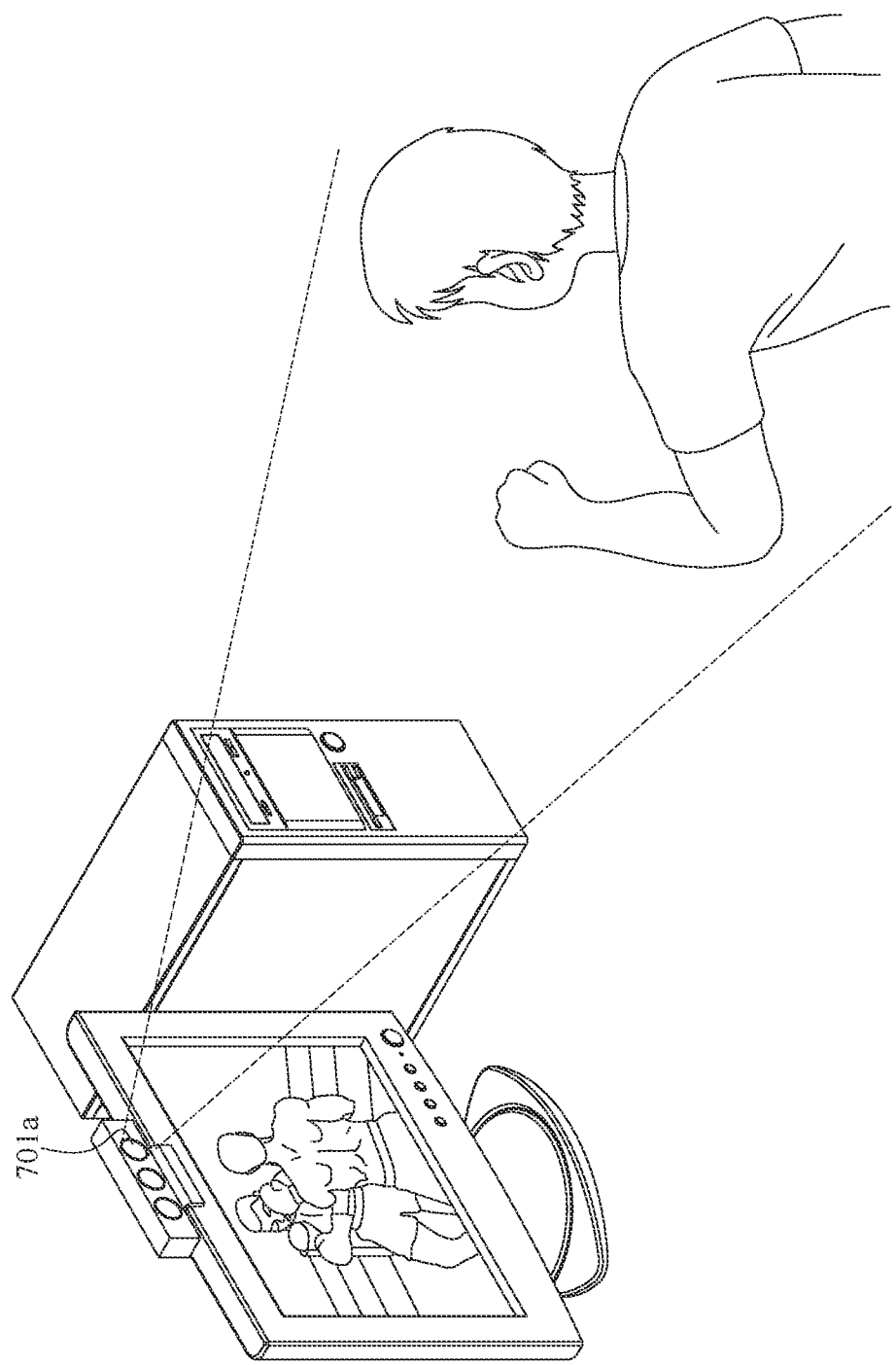
FIG. 30 is a schematic view of an electronic device according to the 16th embodiment of the present disclosure.
Figure 31:
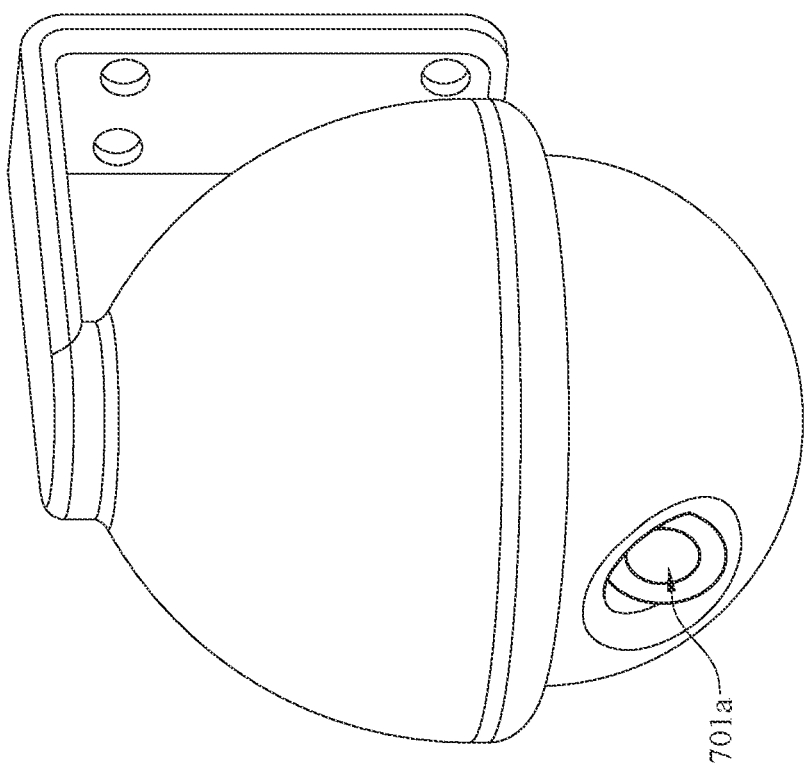
FIG. 31 is a schematic view of an electronic device according to the 17th embodiment of the present disclosure.
Figure 32:
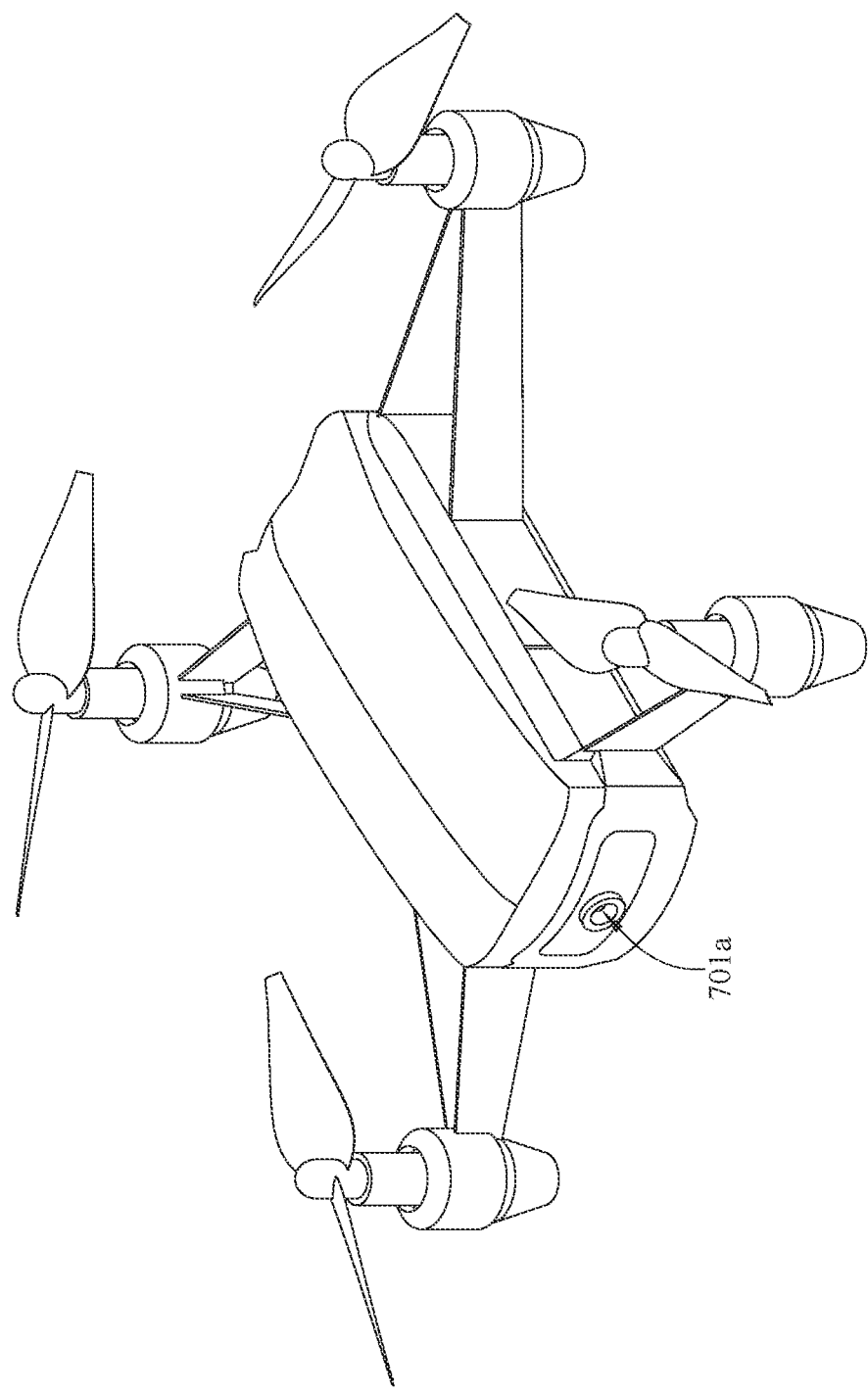
FIG. 32 is a schematic view of an electronic device according to the 18th embodiment of the present disclosure.

In this embodiment, the image capturing unit 701a and the image capturing unit 701b are applied to the electronic device 700, but the present disclosure is not limited thereto. The image capturing unit 701a or the image capturing unit 701b may be applied to other electronic devices, such as an image recognition device applied to motion sensing input devices (Please refer to FIG. 30, which is a schematic view of an electronic device according to the 16th embodiment of the present disclosure), a security surveillance device (Please refer to FIG. 31, which is a schematic view of an electronic device according to the 17th embodiment of the present disclosure) or an unmanned aerial vehicle (e.g., a drone camera; Please refer to FIG. 32, which is a schematic view of an electronic device according to the 18th embodiment of the present disclosure). In some cases, the electronic device may further include a control unit, a display unit, a storage unit, a random access memory unit (RAM) or a combination thereof.

The smartphone, the robot vacuum, the image recognition device applied to motion sensing input devices, the security surveillance device or the unmanned aerial vehicle in this embodiment is only exemplary for showing the image capturing unit of the present disclosure installed in an electronic device, and the present disclosure is not limited thereto. The image capturing unit can be optionally applied to optical systems with a movable focus. Furthermore, the image lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1A-8C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising five lens elements, the five lens elements being, in order from an outer side to an inner side along an optical path, a first lens element, a second lens element, a third lens element, a fourth lens element and a fifth lens element, and each of the five lens elements having an outer-side surface facing toward the outer side and an inner-side surface facing toward the inner side;

wherein a total number of lens elements of the image lens assembly is five, the outer-side surface of the first lens element is concave in a paraxial region thereof, and the outer-side surface of the first lens element has at least one inflection point;

wherein an f-number of the image lens assembly is Fno, a focal length of the image lens assembly is f, a focal length of the first lens element is f1, a focal length of the second lens element is f2, a focal length of the fourth lens element is f4, an axial distance between the outer-side surface of the first lens element and an inner-side conjugate surface of the image lens assembly is TL, an Abbe number of the third lens element is V3, an Abbe number of the fifth lens element is V5, and the following conditions are satisfied:

$0.40 < Fno < 2.20;$ $1.20 < |f/f1|/(|f/f2|+|f/f4|) < 15.00;$ $3.00 < TL/f < 10.00;$ and $30.0 < V3+V5 < 70.0.$ 2. The image lens assembly of claim 1, wherein the first lens element has negative refractive power;
wherein a central thickness of the first lens element is CT1, a central thickness of the second lens element is CT2, and the following condition is satisfied:

$0.40 < CT1/CT2 < 2.00.$

3. The image lens assembly of claim 1, wherein a curvature radius of the outer-side surface of the third lens element is R5, a curvature radius of the inner-side surface of the third lens element is R6, and the following condition is satisfied:

$-30.00 < R5/R6 < 0.50.$

4. The image lens assembly of claim 1, wherein the focal length of the image lens assembly is f, a curvature radius of the inner-side surface of the fifth lens element is R10, and the following condition is satisfied:

$|f/R10| < 0.80.$

5. The image lens assembly of claim 1, wherein the axial distance between the outer-side surface of the first lens element and the inner-side conjugate surface of the image lens assembly is TL, a maximum effective radius of the inner-side conjugate surface of the image lens assembly is YI, and the following condition is satisfied:

$3.20 < TL/YI < 7.00.$

6. The image lens assembly of claim 1, wherein half of a maximum field of view of the image lens assembly is HFOV, and the following condition is satisfied:

46.0 [deg.]<HFOV<120.0 [deg.].

7. The image lens assembly of claim 1, wherein a refractive index of the fourth lens element is N4, and the following condition is satisfied:

1.52<N4<1.60.

8. The image lens assembly of claim 1, further comprising an aperture stop located between the first lens element and the third lens element;
wherein a maximum effective radius of the outer-side surface of the first lens element is Y11, a maximum effective radius of the aperture stop is Ystop, and the following condition is satisfied:

2.80<Y11/Ystop<7.00.

9. The image lens assembly of claim 1, wherein at least one lens element of the image lens assembly comprises a plastic material.

10. The image lens assembly of claim 1, wherein the image lens assembly is operated within infrared light having a wavelength ranging from 750 nanometers to 1500 nanometers.

11. An image capturing unit, comprising:
the image lens assembly of claim 1, configured to receive light reflected off a detected object and to image the received light onto the inner-side conjugate surface.

12. An electronic device, comprising:
the image capturing unit of claim 11.

13. An image lens assembly comprising five lens elements, the five lens elements being, in order from an outer side to an inner side along an optical path, a first lens element, a second lens element, a third lens element, a fourth lens element and a fifth lens element, and each of the five lens elements having an outer-side surface facing toward the outer side and an inner-side surface facing toward the inner side;
wherein a total number of lens elements of the image lens assembly is five, the first lens element has negative refractive power, the outer-side surface of the first lens element is concave in a paraxial region thereof, the outer-side surface of the first lens element has at least one inflection point, and the outer-side surface of the third lens element is convex in a paraxial region thereof;
wherein an f-number of the image lens assembly is Fno, a focal length of the image lens assembly is f, a focal length of the second lens element is f2, a curvature radius of the outer-side surface of the first lens element is R1, an axial distance between the first lens element and the second lens element is T12, a central thickness of the third lens element is CT3, and the following conditions are satisfied:

0.80<Fno<2.00;

−0.80<f/f2<0.08;

−2.00<f/R1<−0.12; and 1.25<(T12+CT3)/f<3.00.

14. The image lens assembly of claim 13, wherein the outer-side surface of the fifth lens element is convex in a paraxial region thereof;

wherein an Abbe number of the fourth lens element is V4, an Abbe number of the fifth lens element is V5, and the following condition is satisfied:

1.10<V4/V5<5.00.

15. The image lens assembly of claim 13, further comprising an aperture stop, wherein an axial distance between the aperture stop and an inner-side conjugate surface of the image lens assembly is SL, an axial distance between the outer-side surface of the first lens element and the inner-side conjugate surface of the image lens assembly is TL, and the following condition is satisfied:

0.45<SL/TL<0.85.

16. The image lens assembly of claim 13, wherein an entrance pupil diameter of the image lens assembly is EPD, an axial distance between the inner-side surface of the fifth lens element and an inner-side conjugate surface of the image lens assembly is BL, and the following condition is satisfied:

0.30<EPD/BL<1.80.

17. The image lens assembly of claim 13, wherein a curvature radius of the inner-side surface of the fourth lens element is R8, a curvature radius of the outer-side surface of the fifth lens element is R9, and the following condition is satisfied:

−5.00<(R8+R9)/(R8−R9)<5.00.

18. The image lens assembly of claim 13, wherein a sum of axial distances between each of all adjacent lens elements of the image lens assembly is EAT, a central thickness of the second lens element is CT2, and the following condition is satisfied:

1.20<ΣAT/CT2<6.00.

19. The image lens assembly of claim 13, wherein a maximum value among central thicknesses of all lens elements of the image lens assembly is max (CT), a minimum value among central thicknesses of all lens elements of the image lens assembly is min (CT), and the following condition is satisfied:

1.00<max (CT)/min (CT)<4.00.

20. The image lens assembly of claim 13, wherein the outer-side surface of the first lens element has at least one critical point in an off-axis region thereof;
wherein a vertical distance between a critical point located farthest away from an optical axis on the outer-side surface of the first lens element and the optical axis is Yc11, a maximum effective radius of the outer-side surface of the first lens element is Y11, and the following condition is satisfied:

0.30<Yc11/Y11<0.80.

21. The image lens assembly of claim 13, wherein a distance in parallel with an optical axis between a maximum effective radius position of the outer-side surface of the first lens element and a maximum effective radius position of the inner-side surface of the first lens element is ET1, a central thickness of the first lens element is CT1, and the following condition is satisfied:

1.10<ET1/CT1<2.00.

22. An image lens assembly comprising five lens elements, the five lens elements being, in order from an outer side to an inner side along an optical path, a first lens element, a second lens element, a third lens element, a fourth lens element and a fifth lens element, and each of the five lens elements having an outer-side surface facing toward the outer side and an inner-side surface facing toward the inner side;

wherein a total number of lens elements of the image lens assembly is five, the first lens element has negative refractive power, the outer-side surface of the first lens element is concave in a paraxial region thereof, the outer-side surface of the first lens element has at least one inflection point, the inner-side surface of the third lens element is convex in a paraxial region thereof, and the outer-side surface of the fifth lens element is convex in a paraxial region thereof;

wherein an f-number of the image lens assembly is Fno, an axial distance between the outer-side surface of the first lens element and an inner-side conjugate surface of the image lens assembly is TL, a maximum effective radius of the inner-side conjugate surface of the image lens assembly is YI, and the following conditions are satisfied:

$0.40 < Fno < 2.20$; and $3.20 < TL/YI < 6.50$;

wherein a focal length of the image lens assembly is f, a focal length of the first lens element is f1, a focal length of the second lens element is f2, a focal length of the third lens element is f3, a focal length of the fourth lens element is f4, a focal length of the fifth lens element is f5, a focal length of the i-th lens element is fi, and at least two lens elements of the image lens assembly satisfy the following condition:

$|f/fi| < 0.19$, wherein $i=1,2,3,4$ or 5;

wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the i-th lens element is Vi, and at least three lens elements of the image lens assembly satisfy the following condition:

$15.0 < Vi < 50.0$, wherein $i=1,2,3,4$ or 5.

23. The image lens assembly of claim 22, wherein half of a maximum field of view of the image lens assembly is HFOV, and the following condition is satisfied:

$46.0 [deg.] < HFOV < 120.0 [deg.]$.

24. The image lens assembly of claim 22, wherein the axial distance between the outer-side surface of the first lens element and the inner-side conjugate surface of the image lens assembly is TL, the focal length of the image lens assembly is f, and the following condition is satisfied:

$4.00 < TL/f < 9.00$.

25. The image lens assembly of claim 22, wherein a central thickness of the second lens element is CT2, a central thickness of the third lens element is CT3, and the following condition is satisfied:

$0.50 < CT2/CT3 < 2.40$.

26. The image lens assembly of claim 22, wherein a curvature radius of the outer-side surface of the fourth lens element is R7, a curvature radius of the inner-side surface of the fourth lens element is R8, and the following condition is satisfied:

$-1.00 < R7/R8 < 4.00$.

27. The image lens assembly of claim 22, wherein a composite focal length of the first lens element and the second lens element is f12, a composite focal length of the fourth lens element and the fifth lens element is f45, and the following condition is satisfied:

$-3.00 < f12/f45 < 0.30$.

28. The image lens assembly of claim 22, wherein a curvature radius of the outer-side surface of the second lens element is R3, a curvature radius of the inner-side surface of the third lens element is R6, and the following condition is satisfied:

$0.00 < (R3+R6)/(R3-R6) < 5.00$.

29. The image lens assembly of claim 22, wherein a maximum value of axial distances between each of all adjacent lens elements of the image lens assembly is max (AT), a minimum value of axial distances between each of all adjacent lens elements of the image lens assembly is min (AT), and the following condition is satisfied:

$1.00 < \max (AT)/\min (AT) < 20.00$.

* * * * *